(12) United States Patent
Cherna et al.

(10) Patent No.: US 9,159,144 B2
(45) Date of Patent: Oct. 13, 2015

(54) COLOR ADJUSTORS FOR COLOR SEGMENTS

(71) Applicant: Apple Inc., Cupertino, CA (US)

(72) Inventors: Timothy D. Cherna, San Francisco, CA (US); Randy Ubillos, Los Altos, CA (US); Garrett M. Johnson, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 175 days.

(21) Appl. No.: 13/629,399

(22) Filed: Sep. 27, 2012

(65) Prior Publication Data

US 2013/0235067 A1 Sep. 12, 2013

Related U.S. Application Data

(60) Provisional application No. 61/607,525, filed on Mar. 6, 2012, provisional application No. 61/607,550, filed on Mar. 6, 2012, provisional application No. 61/607,554, filed on Mar. 6, 2012, provisional application No. 61/607,569, filed on Mar. 6, 2012, provisional application No. 61/607,574, filed on Mar. 6, 2012.

(51) Int. Cl.
  *G06T 11/00* (2006.01)
  *G09G 5/02* (2006.01)

(52) U.S. Cl.
  CPC ............ *G06T 11/001* (2013.01); *G09G 5/026* (2013.01); *G09G 2320/0666* (2013.01); *G09G 2354/00* (2013.01)

(58) Field of Classification Search
  CPC ... G09G 5/02; G09G 5/06; G09G 2320/0606; G09G 2320/0666; G09G 2354/00; H04N 1/60; G06T 7/0081; G06T 7/408; G06K 9/4652
  See application file for complete search history.

(56) References Cited

U.S. PATENT DOCUMENTS

| | | | |
|---|---|---|---|
| 7,034,881 | B1 | 4/2006 | Hyodo et al. |
| 7,489,305 | B2 | 2/2009 | Salisbury et al. |
| 7,598,964 | B2 | 10/2009 | Olson |
| 7,636,108 | B2 | 12/2009 | Suzuki et al. |

(Continued)

FOREIGN PATENT DOCUMENTS

| | | |
|---|---|---|
| KR | 2009/0116435 | 11/2009 |
| KR | 2011/0042635 | 4/2011 |

(Continued)

OTHER PUBLICATIONS

Author Unknown, "How to Manage and Work with Digital Images, Using FastStone Image Viewer Version 4.5," FastStone Soft, Jun. 10, 2011, pp. 1-95.

(Continued)

*Primary Examiner* — Antonio A Caschera
(74) *Attorney, Agent, or Firm* — Adeli LLP

(57) ABSTRACT

A non-transitory machine readable medium that has a computer program for adjusting color values of an image represented in a color space. The image includes a set of pixels. Each pixel has a set of color values. The computer program receives a user input on a user interface (UI) item for adjusting color values of an image that are associated with a type of content. The computer program identifies a subset of pixels having color values that fall within a range of color values associated with the type of content. The computer program performs a color adjustment operation on the identified subset of pixels.

24 Claims, 50 Drawing Sheets

(56) References Cited

U.S. PATENT DOCUMENTS

| | | | |
|---|---|---|---|
| 7,636,485 B2 * | 12/2009 | Simon et al. ................ | 382/254 |
| 7,783,983 B1 | 8/2010 | Mayers et al. | |
| 7,907,776 B2 * | 3/2011 | Ubillos ........................ | 382/167 |
| 7,954,067 B2 | 5/2011 | Breglio | |
| 2003/0103057 A1 | 6/2003 | Graves et al. | |
| 2008/0056564 A1 | 3/2008 | Lindbloom | |
| 2008/0225058 A1 | 9/2008 | Hertzfeld et al. | |
| 2009/0204913 A1 | 8/2009 | Kawano et al. | |
| 2009/0256947 A1 | 10/2009 | Ciurea et al. | |
| 2010/0020221 A1 | 1/2010 | Tupman et al. | |
| 2011/0182511 A1 | 7/2011 | Chien et al. | |
| 2011/0219329 A1 | 9/2011 | Breglio | |
| 2011/0292237 A1 | 12/2011 | Imai | |
| 2012/0019687 A1 | 1/2012 | Razavi et al. | |
| 2012/0036480 A1 | 2/2012 | Warner et al. | |

FOREIGN PATENT DOCUMENTS

| | | |
|---|---|---|
| KR | 2011/0076849 | 7/2011 |
| KR | 2012/0010525 | 2/2012 |
| WO | WO 2007/145654 | 12/2007 |
| WO | PCT/US2013/020703 | 1/2013 |
| WO | WO 2013/133905 | 9/2013 |

OTHER PUBLICATIONS

Dodgson, Neil A., et al., "Contrast Brushes: Interactive Image Enhancement by Direct Manipulation," Computational Aesthetics in Graphics, Visualization, and Imaging, Month Unknown, 2009, 8 pages, The Eurographics Association.

Ho, Kevin I-J., et al., "Automatic Image Processing System for Beautifying Human Faces," Color Science and Imaging Technologies—Proceedings of SPIE, Month Unknown, 2002, pp. 23-32, vol. 4922.

O'Neil, Steve, "Using Adobe Photoshop," Chapter 7—Image Adjustments, Month Unknown, 2006, pp. 1-12.

International Search Report and Written Opinion for PCT/US2013/020703, Feb. 27, 2013, Apple Inc.

Author Unknown, "Using Adobe Photoshop CS4," Jan. 10, 2010, 707 pages, Adobe Systems Incorporated, San Jose, California, USA.

* cited by examiner

COLOR ADJUSTORS FOR COLOR SEGMENTS

CLAIM OF BENEFIT TO PRIOR APPLICATIONS

This application claims benefit to U.S. Provisional Patent Application 61/607,525, filed Mar. 6, 2012; U.S. Provisional Patent Application 61/607,550, filed Mar. 6, 2012; U.S. Provisional Patent Application 61/607,554, filed Mar. 6, 2012; U.S. Provisional Patent Application 61/607,569, filed Mar. 6, 2012; U.S. Provisional Patent Application 61/607,574, filed Mar. 6, 2012; and U.S. Provisional Patent Application 61/741,768, filed May 15, 2012. United States Provisional Patent Applications 61/607,525, 61/607,550, 61/607,554, 61/607,569, 61/607,574; and 61/741,768 are incorporated herein by reference.

BACKGROUND

Digital graphic design and image editing applications (hereafter collectively referred to as image editing applications) provide graphical designers, media artists, and other users with the necessary tools to view and edit an image. Examples of such applications include iPhoto®, Aperture®, and Final Cut Pro®, all sold by Apple, Inc. These applications give users the ability to edit images in a variety of manners. For example, some applications provide different range sliders for adjusting different color values of an image or in a video.

Many image editing applications, however, do not provide intuitive color adjustment controls. For example, the user is required to have extensive knowledge about color editing in order to effectively use most of the existing color adjustment tools. Furthermore, the controls for adjusting different aspects of the color values of an image are dispersed in different locations of the user interface. These deficiencies cause unnecessary inconvenience in editing an image.

BRIEF SUMMARY

Embodiments of several novel user interface (UI) tools for editing an image in an image editing application are described. In some embodiments, the image editing application provides a set of UI controls for adjusting color values of only a portion of an image that is related to a type of content (e.g., sky, foliage, etc.) that is associated with a color range. When an input is received through a UI control for adjusting color values of a type of content on an image, the application automatically identifies a set of pixels in the image that are associated with the type of content. The application then adjusts only the color values of the identified set of pixels based on the user input.

In some embodiments, each UI control is for adjusting color values relate to a different type of content in the image. The application of some embodiments defines a range of color values within a color space for each type of content. When an input is received through a particular UI control, the application searches through the pixels in the image and identifies a set of pixels with color values that falls within the range of color values that was defined for the type of content that corresponds to the particular UI control.

An image includes pixels with color values that are defined in a color space. In some embodiments, the color values of the image are defined in a color space that is different from the particular color space in which the ranges of color values associated with different types of contents are defined. In these embodiments, the application converts the color values of the image from their native color space to the particular color space in which the range of color values is defined before identifying the set of pixels.

In some embodiments, each color adjustment includes a range of adjustment values for specifying different extents of the adjustment to apply to the image. In these embodiments, the UI control also provides a means for the user to specify an adjustment value to control the extent of adjustment to apply to the image. Different embodiments use different techniques to implement the set of UI controls. For instance, the application of some embodiments implements the set of UI controls as a set of range sliders. In these embodiments, the user can specify different adjustment values by selecting different positions on the range slider.

In some embodiments, the application only performs one type of adjustment (e.g., a saturation adjustment) to the color values of the image in response to the user input on a particular UI control. However, the application of some other embodiments performs more than one type of adjustment to the color values of the image in response to a single user input on a particular UI control. For example, in response to the user input, the application of some embodiments may perform a saturation adjustment, a contrast adjustment, and a brightness adjustment to the color values of the image. In these embodiments, the application uses the single user input to determine an adjustment value for each adjustment operation and applies these adjustment operations to the image.

Some embodiments provide another novel UI for editing an image in an image editing application. In these embodiments, the application provides an image editing tool that allows a user to select a location on an image and displays different UI controls that are associated with different image editing operations for applying to the image when different types of contents are detected at the selected location on the image. In these embodiments, a user selects a location on the image, the image editing tool of the application retrieves color values of the pixels from the image that correspond to the selected location on the image. The color-editing tool then performs a set of analyses on the pixel values to detect whether the selected location represents a particular type of content. Based on the detected type of content, the color-editing tool determines a set of image editing operations and displays a set of UI controls that are associated with the determined image editing operations. In some embodiments, the UI controls are overlaid upon the image.

Different embodiments perform different analyses on the retrieved color values of the image. In some embodiments, the application performs a set of analyses for detecting whether the selected location of the image represents a pre-defined type of content. In these embodiments, the application has defined different ranges of color values for different types of content. The application then determines whether the retrieved color values fall within any one of the ranges of color values. When the retrieved color values fall within a particular range of color values, the application associates the retrieved color values, as well as the selected location, with the corresponding type of content. The application then provides a set of overlaid UI controls based on the detected type of content.

In some embodiments, the set of UI controls are overlaid upon the image at or near the selected location. In some embodiments, the overlaid UI controls are one of opaque or transparent. The user may manipulate these UI controls by providing inputs on the image. In some of these embodiments, the UI controls are direction dependent UI controls, through which the user may select a particular image editing operation by providing a particular directional input. When a user provides a directional input on the image, the application associates the input to one of the UI controls based on the direction of the input, and applies the corresponding adjustment to the image.

In some embodiments, each image editing operation that can be performed on the image through the UI control overlay includes a range of adjustment values for specifying different extents of editing to be performed on the image. In these embodiments, the application also identifies a magnitude based on the directional input provided by the user. The application then computes an adjustment value for the image editing operation based on the identified magnitude of the input, and performs the image editing operation with the computed adjustment value on the image.

In addition to the content dependent UI controls, the application of some embodiments also provides a novel UI for adjusting the color balance of an image. In some embodiments, the application provides a color balance UI control that allows a user to select a location on the image. The application then retrieves the color values of a pixel that corresponds to the selected location, and determines a color adjustment that would change the color values of the pixel to an established baseline color (e.g., a gray color, an ideal skin color, etc.). Based on this color adjustment, the application generates a color space transform that maps each color in the image to a different color. The application then applies the color space transform to all the pixels in the image.

Different embodiments provide different baseline colors for the color balancing operation. In some embodiments where a gray color is established as the baseline color, the user can adjust the color balance of an image through the color balance UI by selecting a location in the image that displays an object that appears as gray. In other embodiments, the application can establish an ideal skin color as the baseline color. In these embodiments, the user adjusts the color balance of an image through the color balance UI by selecting a location in the image that displays a person's face.

In some embodiments, the application provides a color balance UI control that is overlaid on the image for adjusting the color balance of an image. In some of these embodiments, the color balance UI control is movable on the image and allows the user to specify a location on the image by moving the color balance UI control to a desired location.

In some embodiments, the color balance UI control provides a zooming capability to allow the user to precisely select a location for the white balance operation. In these embodiments, the color balance UI control includes a closed boundary. The application zooms in (i.e., magnifies) the portion of the image within the closed boundary of the color balance UI control. As the image within the closed boundary of the color balance UI control appears to be larger, the user can be more precise in picking a location on the image.

In addition to the zooming capability, the color balance UI control can also provide a preview of the edited image for the user. In some embodiments, the application displays the edited version of the portion of the image that is outside of the closed boundary of the color balance UI control while displaying the unedited version of the portion of the image that is inside the closed boundary.

The preceding Summary is intended to serve as a brief introduction to some embodiments described herein. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features described here are set forth in the appended claims. However, for purposes of explanation, several embodiments are set forth in the following figures.

DETAILED DESCRIPTION

Figure 1:
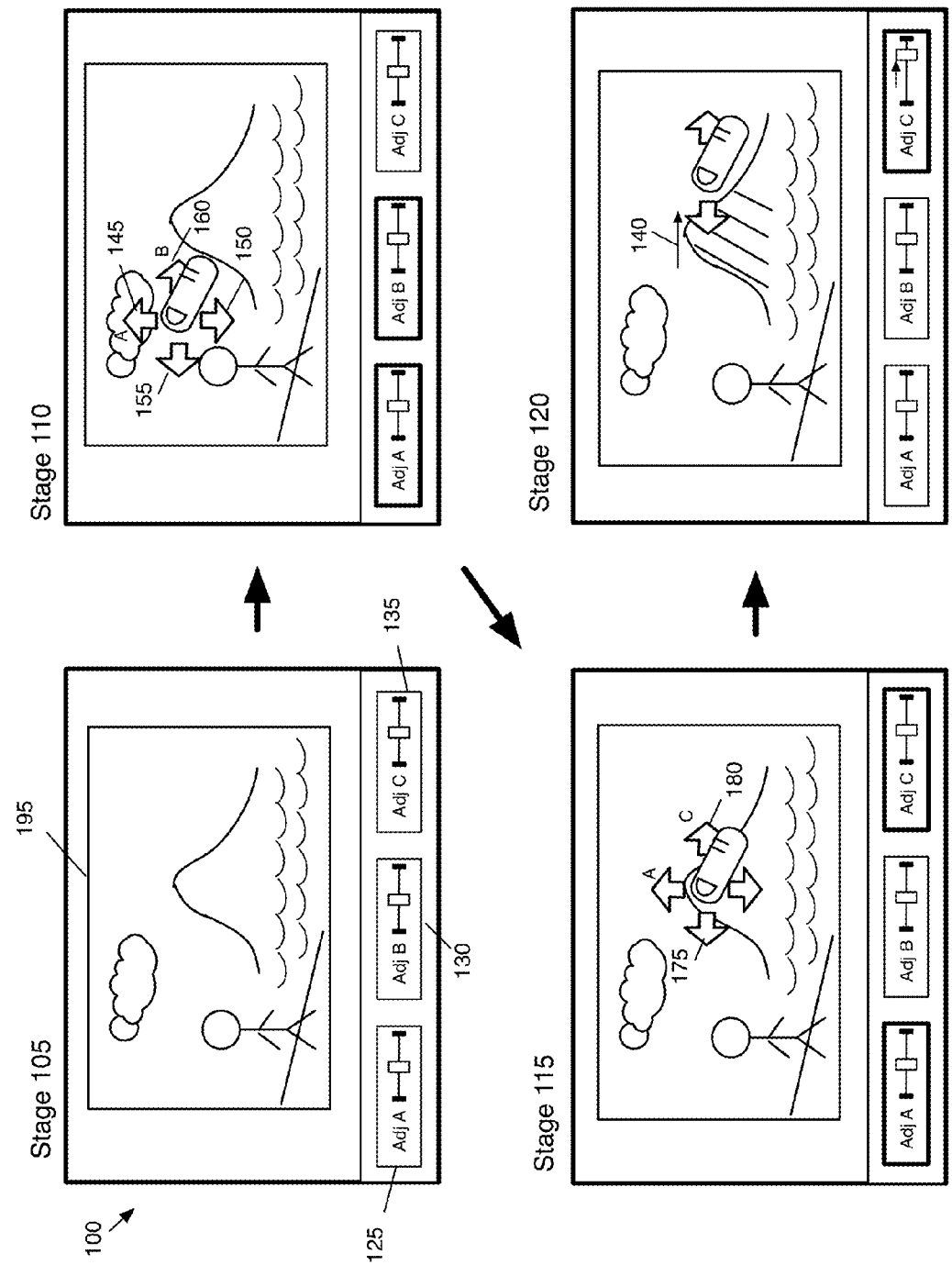
FIG. 1 illustrates an example of providing different overlaid UI controls based on different location selected on an image.

In the following detailed description, numerous details, examples, and embodiments of image editing tool and image editing application are set forth and described. However, it will be clear and apparent to one skilled in the art that the invention is not limited to the embodiments set forth and that the invention may be practiced without some of the specific details and examples discussed.

Embodiments of several novel user interface (UI) tools for editing an image in an image editing application are described. In some embodiments, the image editing application provides a set of UI controls for adjusting color values of only a portion of an image that is related to a type of content (e.g., sky, foliage, etc.) that is associated with a color range. When an input is received through a UI control for adjusting color values of a type of content on an image, the application automatically identifies a set of pixels in the image that are associated with the type of content. The application then adjusts only the color values of the identified set of pixels based on the user input.

In some embodiments, the set of UI controls includes a UI control for adjusting color values of only the sky colors in an image. In these embodiments, the application first identifies a set of pixels in the image with color values that fall within a pre-defined range of sky color values. The application then applies a color adjustment to only the identified set of pixels. In addition to adjusting color values of sky colors, the set of UI controls in some embodiments also include a UI control for adjusting color values of only the foliage colors in the image. Similarly, the application identifies a set of pixels in the image with color values that fall within a pre-defined range of foliage color values and applies a color adjustment to only the identified set of pixels. The color adjustment operations for adjusting the blue sky colors and foliage colors will be described in more details below in Section I.

In addition, the image editing application of some embodiments also provides an image editing tool that allows a user to select a location on an image and displays different UI controls that are associated with different image editing operations for applying to the image when different types of contents are detected from the selected location on the image. In these embodiments, a user selects a location on the image, the image editing tool of the application retrieves color values of the pixels from the image that correspond to the selected location on the image. The application then performs a set of analyses on the pixel values to detect whether the selected location represent a particular type of content. Based on the detected type of content, the color-editing tool determines a set of image editing operations and displays a set of UI controls that are associated with the determined image editing operations. Different embodiments that provide content dependent, on-image UI controls will be described in more details below in Section II.

FIG. 1 illustrates an example GUI 100 of an image editing application of some embodiments that provides a set of UI controls for adjusting color values of only a portion of an image. Specifically, FIG. 1 illustrates the operation of activating and manipulating different sets of UI controls at four different stages 105, 110, 115, and 120. Each of these stages will be described in more detail below.

As shown in FIG. 1, the GUI 100 includes an image 195 and a set of color adjustment UI controls 125-135. Each of the color adjustment UI controls is for initiating a different color adjustment for a different portion of the image. For example, the UI control 125 is for applying "Adjustment A" to the entire image, the UI control 130 is for applying "Adjustment B" to the sky area of the image, and the UI control 135 is for applying "Adjustment C" to the foliage area of the image.

Different embodiments use different techniques to implement the set of UI controls. In this example, the application implements the set of UI controls as a set of range sliders. In these embodiments, the user may initiate the different adjustment operations to the image by selecting and manipulating the different UI controls 125-135. In addition to the range sliders, the GUI 100 also allows the user to initiate the adjustment operations by activating a set of overlaid UI controls (also referred to as on-image UI controls) that correspond to the set of UI controls 125-135.

The second stage 110 illustrates the GUI 100 after a user has activated a set of overlaid UI controls. In some embodiments, the user may activate a set of overlaid UI controls by selecting a location on the image. In these embodiments, the application retrieves color values of the pixels that correspond to the selected location, and associates the color values with one of the pre-defined content. The application then provides a set of overlaid UI controls that are related to the associated type of content. As shown, the user has selected a location on the image 195 that displays the sky. The selection of the location on the image 195 may be performed by performing a gesture at a location on a device having a touch or near touch sensitive screen that displays the image, or by placing a cursor at the location of the image and providing an input (e.g., clicking on the cursor controlling device, pressing a hot key, etc.). In one embodiment, a user may select a location by tapping or placing a finger at the location of the image. In other embodiments, other gestures may be performed to select a location. As mentioned above, after the user has selected a location on the image, the image editing application of some embodiments performs at least one analysis to associate the selected location with a pre-defined type of content. Different embodiments use different techniques to determine a type of content that is associated with the selected location. The application of some embodiments first defines different ranges of color values to be associated with different types of contents. The application then determines whether the color values of a set of pixels that corresponds to the selected location in the image fall within a range of color values associated with a particular type of content, and displays a set of on-image UI controls that is associated with the particular type of content. In this example, the application determines that the selected location is associated with a blue sky. Thus, the application provides a set of on-image UI controls 155 and 160 (displayed as two directional arrows along the horizontal axis) that corresponds to UI control 140 for performing "Adjustment B" to the sky area of the image.

The application also provides a set of overlaid UI controls 145 and 150 (displayed as two directional arrows along the vertical axis) that correspond to UI control 125 for performing "Adjustment A" to the entire image. The set of overlaid UI controls 145 and 150 are content independent. That is, the application provides this set of overlaid UI controls 145 and 150 independent of the location selected on the image. In some embodiments, the application also highlights the UI controls 125 and 130 to indicate that the UI controls 125 and 130 are activated. (The border of a UI control is boldened in order to indicate that the UI controls are highlighted.) Although not shown in this figure, the user in this second stage 110 may select a particular color adjustment (i.e., "Adjustment A" or "Adjustment B") by providing a directional input on the image. It should be understood that Adjustment A could conversely be performed in a vertical direction and Adjustment B could be performed in a horizontal direction.

The third stage 115 illustrates the GUI 100 after a user has selected a different location on the image 195. The selection of the location on the image 195 may be performed by performing a gesture at a location on the device having a touch or near touch sensitive screen that displays the image, or by placing a cursor at the location of the image and providing an input (e.g., clicking on the cursor controlling device, pressing a hot key, etc.). In one embodiment, a user may select a location by tapping or placing a finger at the location of the image. In other embodiments, other gestures may be performed to select a location. As shown, the user has selected a location on the image that shows a mountain. Based on the selection of this new location, the application displays a different set of overlaid UI controls 175 and 180 (displayed as two directional arrows along the horizontal axis) that corresponds to UI control 135 for performing "Adjustment C" to the foliage area of the image. The application also highlights the UI control 135 to indicate that the UI control 130 is activated. In some embodiments, the UI control 135 is highlighted by having a thicker border on the shape that enclosed the UI control. In other embodiments, the UI control 135 is highlighted by being displayed with brighter colors than the other UI controls that are displayed in the GUI. Similar to the second stage 110, the application also provides the set of overlaid UI controls 145 and 150 that corresponds to UI control 125 for performing "Adjustment A" to the image, as this set of overlaid UI controls are content independent.

The fourth stage 120 illustrates the GUI 100 after a user has initiated a color adjustment on the image by providing a directional input. The directional input can be provided by dragging the user's finger on a device having a touch or near touch sensitive screen or dragging a cursor along a substantially horizontal direction. In this example, the user provides a directional input by dragging the user's finger to the right of the image, as indicated by the arrow 140. The application associates the directional input with the on-image UI control 180 for performing adjustment C on the image 195. As shown, the foliage area of the image 195 (e.g., the area that displays the mountain) has been adjusted, as indicated by the diagonal lines across that portion of the image 195. The fourth stage 120 also illustrates that once the application has associated the directional input with one set of the on-image UI controls, the inactivated on-image UI controls 145 and 150 are removed from display and the corresponding UI control 125 is no longer highlighted. In some embodiments, the UI controls 145 and 150 fade away. The fourth stage 120 also illustrates that when the user moves the finger to a different location, the activated overlaid UI controls follow the finger. In other words, the displayed overlaid UI controls are animated so as to move across the displayed image while the image remains stationary so as to remain substantially under the user's finger as though attached to the finger. Thus the on-image UI controls are always around the location of the finger.

In addition to the content dependent UI controls, the application of some embodiments also provides a novel UI for adjusting the color balance of an image. Color balancing is a color adjustment operation for matching the colors in the image with the colors of the sceneries and objects at the moment they were captured in the image. In some embodiments, the application provides a color balance UI control that allows a user to select a location on the image. The application then retrieves the color values of a pixel that corresponds to the selected location, and determines a color adjustment that would change the color values of the pixel to an established baseline color (e.g., a gray color, an ideal skin color, etc.). Based on this color adjustment, the application generates a color space transform that maps each color in the image to a different color. The application then applies the color space transform to all the pixels in the image.

Figure 2:
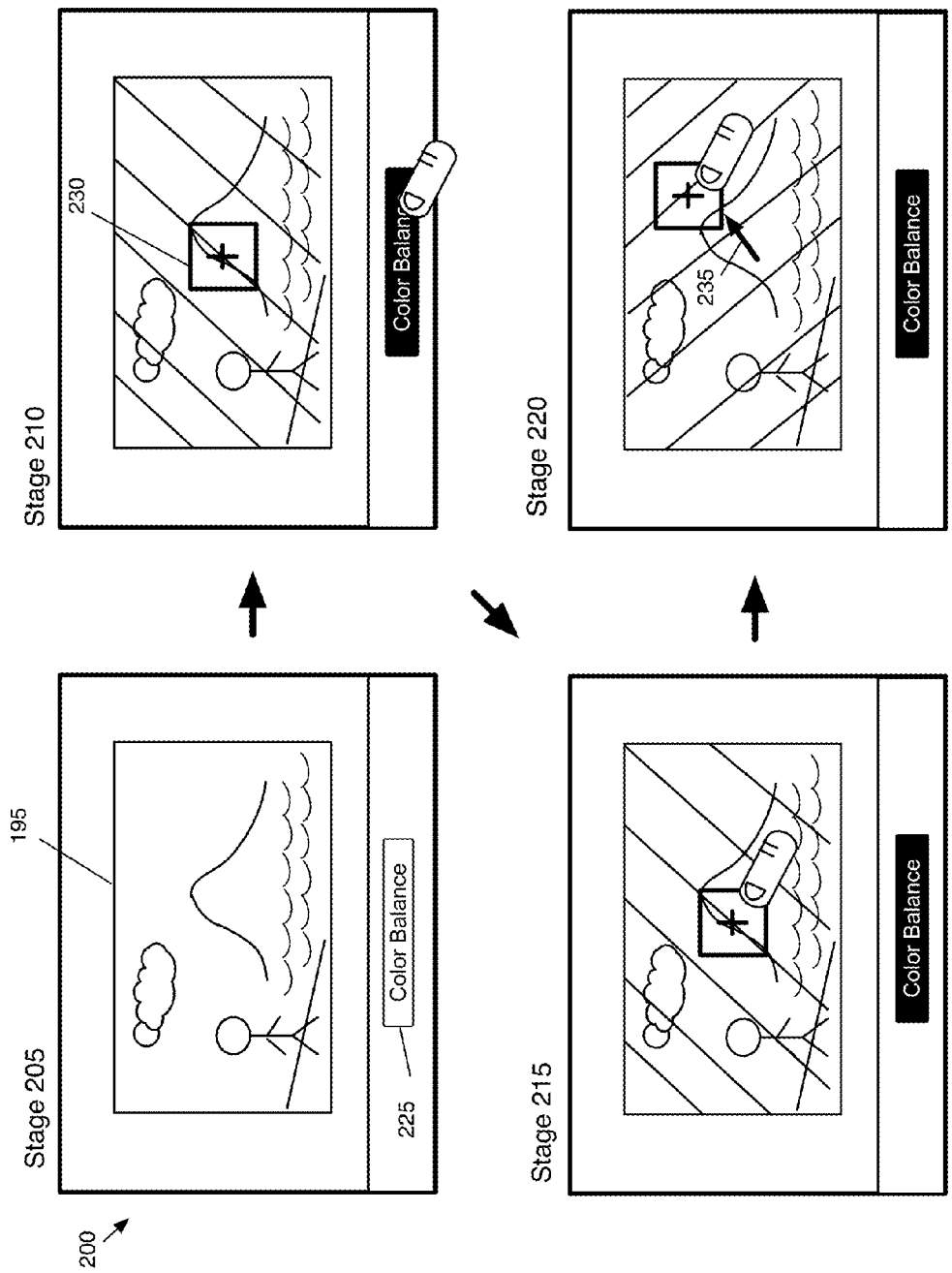
FIG. 2 illustrates an example of adjusting color balance of an image using a custom color balance UI control.

FIG. 2 illustrates a GUI 200 of an image editing application that provides a color balance UI control for adjusting the color balance of an image. Specifically, FIG. 2 illustrates the color balancing operation at four different stages 205, 210, 215, and 220. Each of these stages will be described in more detail below.

As shown in the first stage 205, the GUI 200 includes an image 195 and a selectable UI item 225 for activating a color balancing UI control. The second stage 210 illustrates the GUI 200 after the user has selected the selectable UI item 225. The selection of the selectable UI item 225 may be performed by performing a gesture at a location on a device having a touch or near touch sensitive screen that displays the selectable UI item 225, or by placing a cursor at the selectable UI item 225 and providing an input (e.g., clicking on the cursor controlling device, pressing a hot key, etc.). In one embodiment, a user may select the selectable UI item 225 by tapping or placing a finger at the selectable UI item 225. In other embodiments, other gestures may be performed to select the selectable UI item 225. As shown, the user has selected the selectable UI item 225 by tapping or placing a finger on the selectable UI item 225.

In some embodiments, the application provides a color balance UI control that is displayed (e.g., overlaid upon) on the image for adjusting the color balance of the image. In some of these embodiments, the color balance UI control is movable on the image and allows the user to specify a location on the image by moving (or dragging) the color balance UI control to a desired location.

As shown in this second stage 210, as a result of the selection of the selectable UI item 225, a color balance UI control 230 appears on the image. In this example, the color balance UI control 230 has a shape of a square with a cross-hair in the middle of the control. In other embodiments, the color balance UI control may be in any other shapes. A non-inclusive list of these other shapes includes a triangle, an ellipse, a rectangle, or the like. The shape may also be an irregular shape such as a hand, a flower, or the like. Additionally, the cross-hair may or may not be in the middle. Alternatively, a different object other than the cross-hair may be displayed in the shape such as a circle, a square, a single dot, or some other image used to indicate a small area within the image 195.

The cross-hair of the color balance UI control 230 allows the user to specify a location on the image for adjusting the color balance of the image 195. As mentioned above, once the user has specified a location for the color balance operation, the application retrieves the color values of at least one pixel that corresponds to the selected location, and determines a color adjustment that would change the color values of the pixel to an established baseline color (e.g., a gray color, an ideal skin color, etc.). Based on this color adjustment, the application generates a color space transform that maps each color in the image to a different color. The application then applies the color space transform to all the pixels in the image. As shown in this second stage 210, a color balance operation based on the selected location has been performed on the image 195, as indicated by the 45 degree diagonal lines across the image 195.

As mentioned before, the color balance UI control 230 of some embodiments is movable within the image 195 to allow the user to select a different location for the color balance operation. In these embodiments, the user can relocate the color balance UI control 230 by performing a gesture (e.g., placing or tapping the user's finger) on the color balance UI control 230 and dragging the finger to a different location. The third stage 215 is a transient stage that illustrates the GUI 200 after the user has selected the color balance UI control 230 but before moving the color balance UI control 230 to a different location.

The fourth stage 220 illustrates the GUI 200 after the user has moved the color balance UI control 230 to a different location. As shown, the user has moved the color balance UI control 230 toward the upper right corner of the image by dragging the user's finger toward that direction, as indicated by the arrow 235. As a result of moving the color balance UI control 230 to a new location, the application re-adjusts the color balance of the image. Specifically, the application retrieves the color values of the at least one pixel that corresponds to the new location selected by the user through the color balance UI control 230. The application then determines a color adjustment that changes the colors of the selected location to the baseline color. Based on this color adjustment, the application generates a color space transform that maps each color in the image 195 to a different color. The application then applies the color space transform to all the pixels in the image 195. As shown in this fourth stage 220, a color balance operation based on the newly selected location has been performed on the image 195, as indicated by the 135 degree diagonal lines across the image 195.

Several more detailed embodiments of the invention are provided below. Many of these examples refer to a slider that is part of an image editing application. This application in some embodiments is a standalone application that executes on top of the operating system of a device, while in other embodiments it is part of the operating system. Also, in many of the examples below (such as those illustrated in FIGS. 3, 4, 6, 7, 9, 14, 15, 20, 21, 22, 23, 24, 31, 32, 33, 34, 35, 37, 39, 41 and 42), the device on which the application executes has a touch screen through which a user can interact with the image editing application. However, one of ordinary skill in the art will realize that cursor controllers or other input devices can be used to interact with the sliders and applications shown in these examples for other embodiments that execute on devices with cursors and cursor controllers or other input mechanisms (e.g., voice control).

Several more detailed embodiments of the invention are described in the sections below. Specifically, Section I describes different UI controls for adjusting color values of only a portion of an image that is associated with a detected type of content. Section II describes details of different embodiments that provide on-image UI controls based on a detected type of content from a selection location on the image. Section III describes providing a set of color balance UI controls for adjusting the color balance of an image. Finally, Section VI describes an electronic system that implements some embodiments of the invention.

I. Color Controls

The image editing application of some embodiments provides a set of UI controls for adjusting color values of only a portion of an image that is associated with a type of content. In some embodiments, each UI control is for adjusting color values related to a different type of content in the image. When an input is received through a particular UI control, the application automatically identifies a set of pixels in the image that are related to the type of content that is controlled by the particular UI control. The application then adjusts only the color values of the identified set of pixels based on the user input.

In some embodiments, the set of UI controls includes different UI controls for adjusting color values that are associated with different types of contents. For example, one UI control is for adjusting color values that are associated with skin-tone colors, another UI control is for adjusting color values that are associated with sky colors, and yet another UI control is for adjusting color values that are associated with foliage colors.

Figure 3:
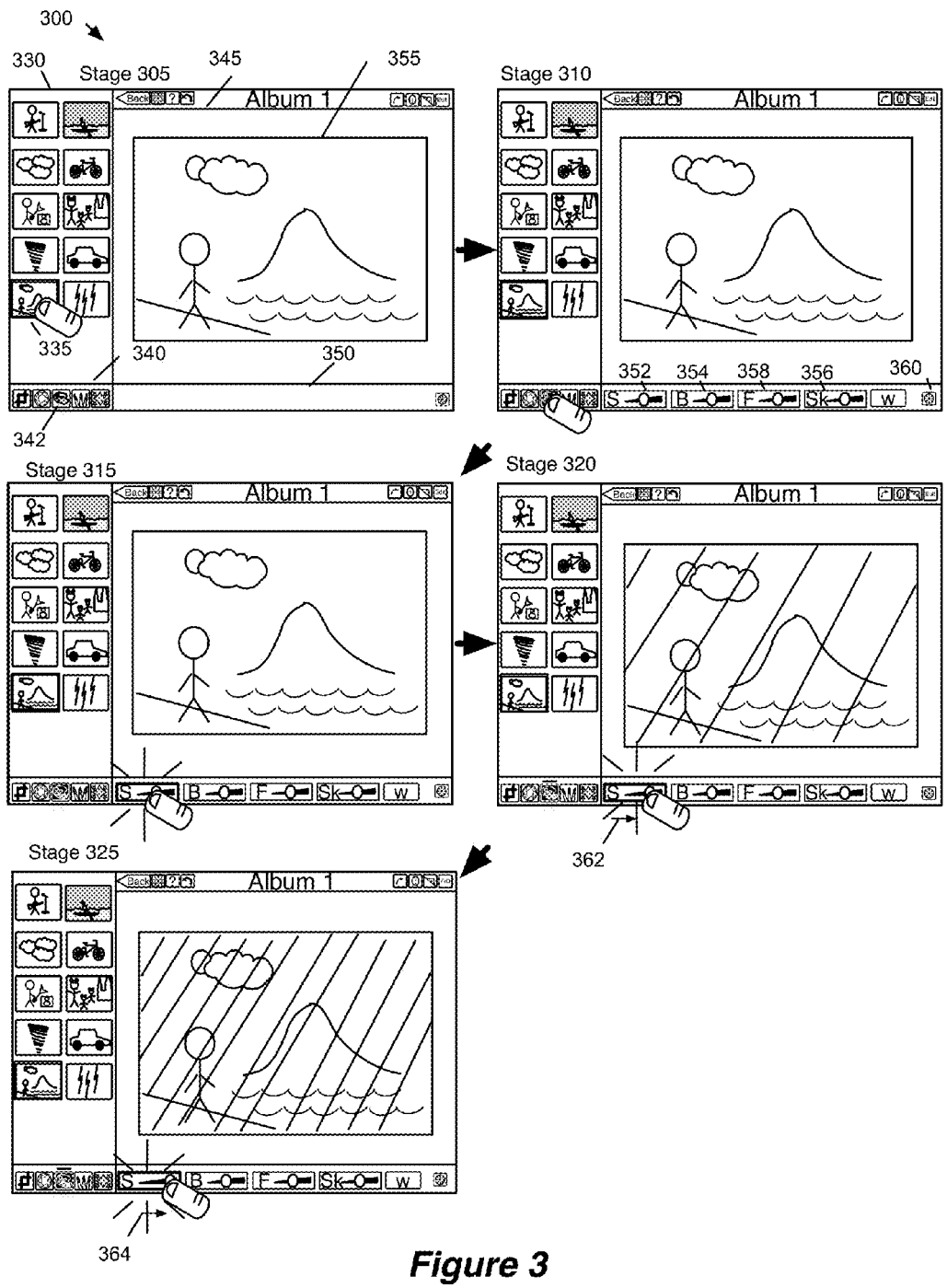
FIG. 3 illustrates an example of adjusting the saturation of an image through the GUI of an image editing application of some embodiments.

FIG. 3 illustrates an example GUI 300 of an image editing application of some embodiments that provides a set of UI controls for adjusting color values of only a portion of an image that is associated with a type of content at five different stages 305, 310, 315, 320, and 325. Each of these stages will be described in more detail below.

As shown in FIG. 3, the GUI 300 includes a thumbnail display area 330, a tool bar 340, an image display area 345, and a UI control display area 350. The thumbnail display area 330 displays a set of thumbnails of images in an album for a user to browse and select. A thumbnail of an image is a reduce-sized version of the image with a reduced resolution. A user can select one or more of the images to be displayed in the image display area 345 by selecting the images' corresponding thumbnails in the thumbnail display area 330.

The tool bar 340 displays a set of selectable UI items that are associated with different types of image adjustment controls. The set of selectable UI items includes a selectable UI item that is associated with a set of image cropping tools, a selectable UI item that is associated with a set of exposure adjustment tools, and a selectable UI item 342 that is associated with a set of color adjustment tools. When a user selects one of these selectable UI items, a set of UI controls that is associated with the selected UI item will be displayed in the UI control display area 350.

The image editing operation will now be described by reference to the state of the GUI 300 during the five stages 305, 310, 315, 320, 325. The first stage 305 illustrates the GUI 300 of the image editing application after a user has selected the image 355 from the album "Album 1" to be displayed in the image display area 345. The selection of an image to be displayed in the image display area 345 can be performed by performing a gesture (e.g., placing, pointing, or tapping a finger) at a location on a device having a touch or near touch sensitive screen that displays the thumbnail of the image, or by placing a cursor at the thumbnail of the image and providing an input (e.g., clicking on the cursor controlling device, pressing a hot key, etc.). As shown, the user has selected the image 355 to be displayed in the image display area 345 by tapping a finger on the thumbnail 335. The selection is also indicated by the highlighting of the thumbnail 335 in the thumbnail display area 330. As a result of the selection, the image 355 is displayed in the image display area 345. The image 355 is a photo of a person standing next to a sea with a mountain in the background.

The second stage 310 illustrates the GUI 300 after the user has selected one of the selectable UI items in the tool bar 340. The selection of the selectable UI item 342 may be performed by performing a gesture (e.g., placing, point, or tapping one or more fingers) at a location on a device having a touch or near touch sensitive screen that displays the selectable UI item 342, or by placing a cursor at the selectable UI item 342 and providing an input (e.g., clicking on the cursor controlling device, pressing a hot key, etc.). As shown, the user has selected the selectable UI item 342 by tapping a finger on the selectable UI item 342, as indicated by the highlight of the selectable UI item 342.

As a result of selecting the selectable UI item 342, a set of color adjustment UI controls 352-358 is displayed in the UI control display area 350. Different embodiments provide different types of range related UI controls (e.g., dials, buttons, number fields, and the like) for adjusting colors of an image. In this example, the color adjustment UI controls are range sliders. A user can initiate different color adjustments to the image by sliding the knob of any one of the UI controls to a different position along the range slider. The sliders may provide a visual indication as the knob is slid along the slider.

Each of the color adjustment UI controls 352-358 is for initiating different types of color adjustments for the image. For example, color adjustment UI control 352 is for initiating a saturation adjustment to the image. Color adjustment UI control 354 is for initiating a sky adjustment to the image, which adjusts only color values that fall within a range of color values defined for sky colors. Color adjustment UI control 356 is for initiating a foliage adjustment to the image, which adjusts only color values that fall within a range of color values defined for foliage colors. Color adjustment UI control 358 is for initiating a skin-tone adjustment to the image, which only adjusts color values that fall within a range of color values defined for skin-tone colors. In addition to the color adjustment UI controls 352-358, the GUI 300 also displays a selectable UI item 360 for invoking a setting menu.

The third stage 315 illustrates the GUI 300 after the user has selected the color adjustment UI control 352 for initiating a saturation adjustment to the image 355, as indicated by the highlighting of the color adjustment UI control 352. The selection of the color adjustment UI control 352 may be performed by performing a gesture (e.g., placing, pointing, or tapping a finger) at a location on a device having a touch or near touch sensitive screen that displays the color adjustment UI control 352, or by placing a cursor at the color adjustment UI control 352 and providing an input (e.g., clicking on the cursor controlling device, pressing a hot key, etc.).

The fourth stage 320 illustrates the GUI 300 after the user has begun adjusting the saturation of the image 355 by moving the knob of the UI control 352 to the right, as indicated by the arrow 362. In some embodiments, the user can move the knob of the UI control 352 by performing a gesture (e.g., dragging the user's finger to a different location). As a result of the finger movement, the saturation of the colors in the image 355 has been increased, as indicated by the diagonal lines across the image 355. In some embodiments, the application adjusts the saturation of the image's colors by adjusting the intensity of the colors in the image. In these embodiments, the application determines an algorithm or mathematical equation for adjusting the color values of the image based on the user's input on the color adjustment UI control 352. The application then applies the algorithm or mathematical equation to all the pixel values of the image. In some embodiments, the application converts the color values of the image from the color space (e.g., an RGB color space) that defines the color values of the image to a color space that includes a luminance channel (e.g., a YCrCb color space, a YIQ color space, an IPT color space, etc.). The chrominance color channels (i.e., the channels other than the luminance channel) can be represented in a polar coordinate system (e.g., a radius value and a degree), in which the radius value represents the saturation of a color, and the degree represents the different color shades. Once the color values of the image are converted to this new color space, the application can adjust the saturation of the image by adjusting the radius value of each color in the image.

Additionally, the GUI 300 also displays a bar on top of the selectable UI item 342 when a color adjustment has been performed on the image. The bar on top of the selectable UI item 342 will remain visible to indicate what type of adjustments the user has performed on the image. As shown, a bar has appeared on top of the selectable UI item 342 at the fourth stage 320 after the user has made saturation adjustments to the image 355.

The fifth stage 325 illustrates the GUI 300 after the user has further adjusted the saturation of the image 355 by moving the knob of the UI control 352 further to the right, as indicated by the arrow 364. As shown, the colors in the image 355 in this stage 325 are shown to be even more saturated than the colors in the image in the fourth stage 320, as indicated by the higher density of the diagonal lines across the image 355.

FIG. 3 illustrates an example of adjusting the saturation of the entire image through the saturation UI control 352. The image editing application of some embodiments also provides a color adjustment UI control that adjusts the saturation of only a portion of an image. For example, the application may provide a saturation adjustment UI control that adjusts the saturation of the image while preserving the skin-tone colors (i.e., adjusts the saturation of all colors in the image other than skin-tone colors), which is known as a vibrancy adjustment.

Figure 4:
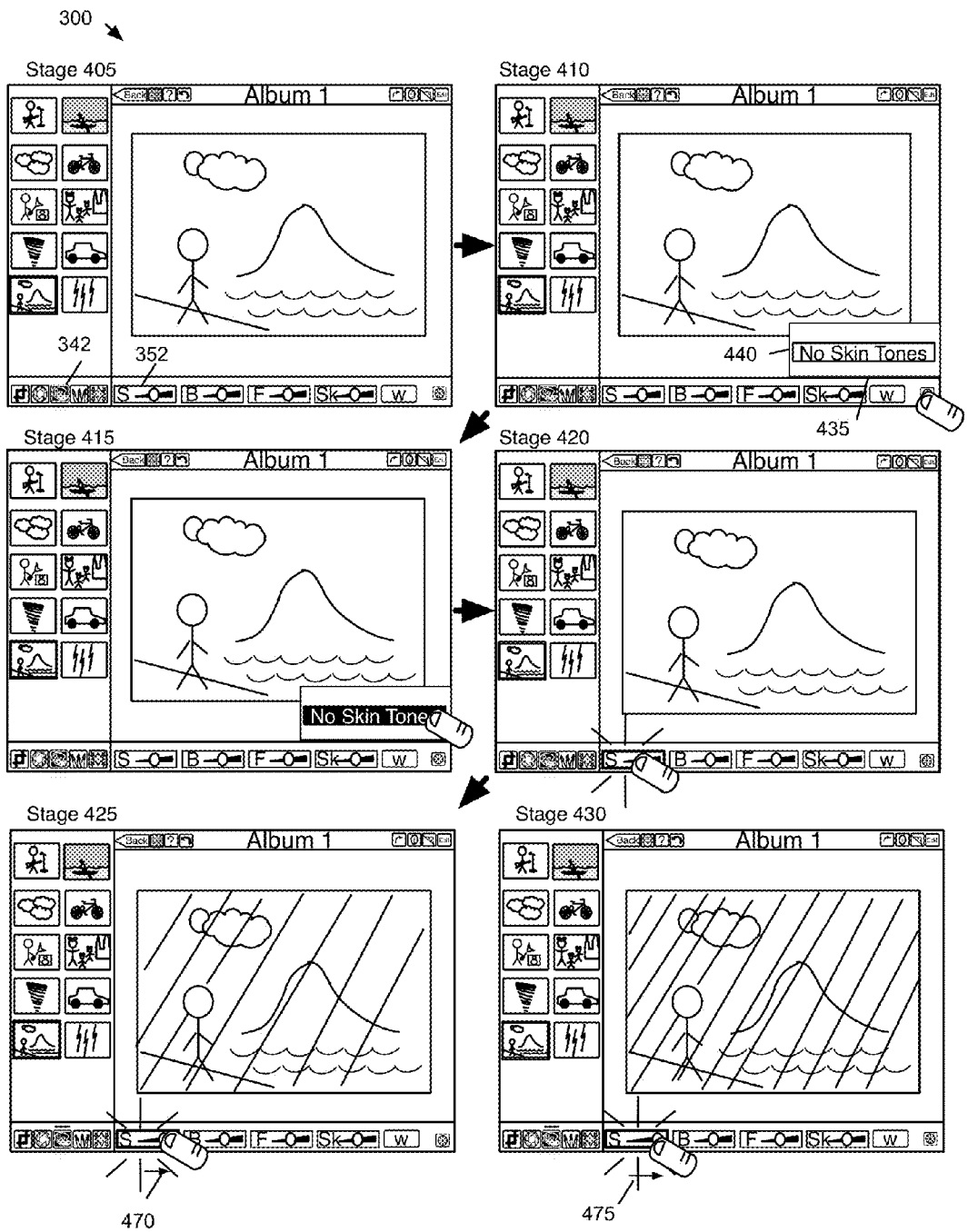
FIG. 4 illustrates another example of adjusting the saturation of an image through the GUI of an image editing application of some embodiments.

Different embodiments provide different techniques in providing a UI control for adjusting the vibrancy of the colors in an image. In one approach, the application allows the user to toggle between the saturation adjustment and vibrancy adjustment by modifying a setting of the application. FIG. 4 illustrates an example of such an approach. Specifically, FIG. 4 illustrates an example of invoking and manipulating vibrancy UI control at six different stages 405, 410, 415, 420, 425, and 430.

The first stage 405 is identical to the second stage 310 of FIG. 3. As shown, the user has selected the selectable UI item 342 for adjusting colors of the image 355. The second stage 410 illustrates the GUI 300 after the user has selected the selectable UI item 360 for bringing up an application setting pop-up menu, as indicated by the highlighting of the selectable UI item 360. The selection of the selectable UI item 360 may be performed by performing a gesture (e.g., placing, pointing, or tapping a finger) at a location on a device having a touch or near touch sensitive screen that displays the selectable UI item 360, or by placing a cursor at the selectable UI item 360 and providing an input (e.g., clicking on the cursor controlling device, pressing a hot key, etc.). As shown, the selection of the selectable UI item 360 causes a pop-up menu 435 to be displayed on top of the UI control display area 350. The pop-up menu 435 includes several selectable items for modifying the application's setting, such as selectable item 440 that is labeled "No Skin Tones" for toggling the setting of the saturation UI control 352.

The third stage 415 illustrates the GUI 300 after the user has selected the selectable item 440 that is labeled "No Skin Tones", as indicated by the highlighting of the selectable item 440. The selection of the selectable item 440 may be performed by performing a gesture (e.g., placing, pointing, or tapping a finger) at a location on a device having a touch or near touch sensitive screen that displays the selectable item 440, or by placing a cursor at the selectable item 440 and providing an input (e.g., clicking on the cursor controlling device, pressing a hot key, etc.). As a result of the selection, the saturation UI control 352 is now for controlling a vibrancy adjustment to the image. As mentioned before, the vibrancy adjustment only adjusts the saturation of the colors in the image 355 while preserving the skin-tone colors.

The fourth stage 420 illustrates the GUI 300 after the user has selected the saturation UI control 352, as indicated by the highlighting of the saturation UI control 352. The selection of the saturation UI control 352 may be performed by performing a gesture (e.g., placing, pointing, or tapping a finger) at a location on a device having a touch or near touch sensitive screen that displays the saturation UI control 352, or by placing a cursor at the saturation UI control 352 and providing an input (e.g., clicking on the cursor controlling device, pressing a hot key, etc.).

The fifth stage 425 illustrates the GUI 300 after the user has begun to increase the vibrancy of the image by moving the knob of the saturation UI control 352 to the right, as indicated by the arrow 470. In some embodiments, the user can move the knob of the saturation UI control 352 by dragging the user's finger (or dragging a cursor) to a different location along the range slider. As a result of the finger movement, the saturation of the colors (other than the skin tone colors) in the image 355 has been increased, as indicated by the diagonal lines across the image 355 while the area of the person's face in the image 355 remains unaffected. In some embodiments, the application adjusts the saturation of the image's colors by adjusting the chrominance values of the image's pixels. In these embodiments, the application determines an algorithm or mathematical equation for adjusting the pixel values of the image based on the user's input on the saturation UI control 352. The application then applies the algorithm or mathematical equation to all the color values of the image that have been identified as skin-tone colors.

Additionally, the GUI 300 also displays a bar on top of the selectable UI item 342 when a color adjustment has been performed on the image. The bar on top of the selectable UI item 342 will remain visible to indicate what type of adjustments the user has performed on the image. As shown, a bar has appeared on top of the selectable UI item 342 at the fourth stage 320 after the user has made saturation adjustments to the image 355.

The sixth stage 430 illustrates the GUI 300 after the user has further increased the vibrancy of the image by moving the knob of the saturation UI control 352 further to the right, as indicated by the arrow 475. As shown, the colors of the image 355 in this stage 430 are shown to be even more saturated than the colors in the image in the fifth stage 425, as indicated by the higher density of the diagonal lines across the image 355, while the area of the person's face in the image 355 remains unaffected.

In some embodiments, the application selects a default setting for the saturation UI control 352 based on the content of the image. For example, the application of some embodiments performs a face detection algorithm to the image and then determines a setting for the saturation UI control 352 based on whether a face is detected on the image.

Figure 5:
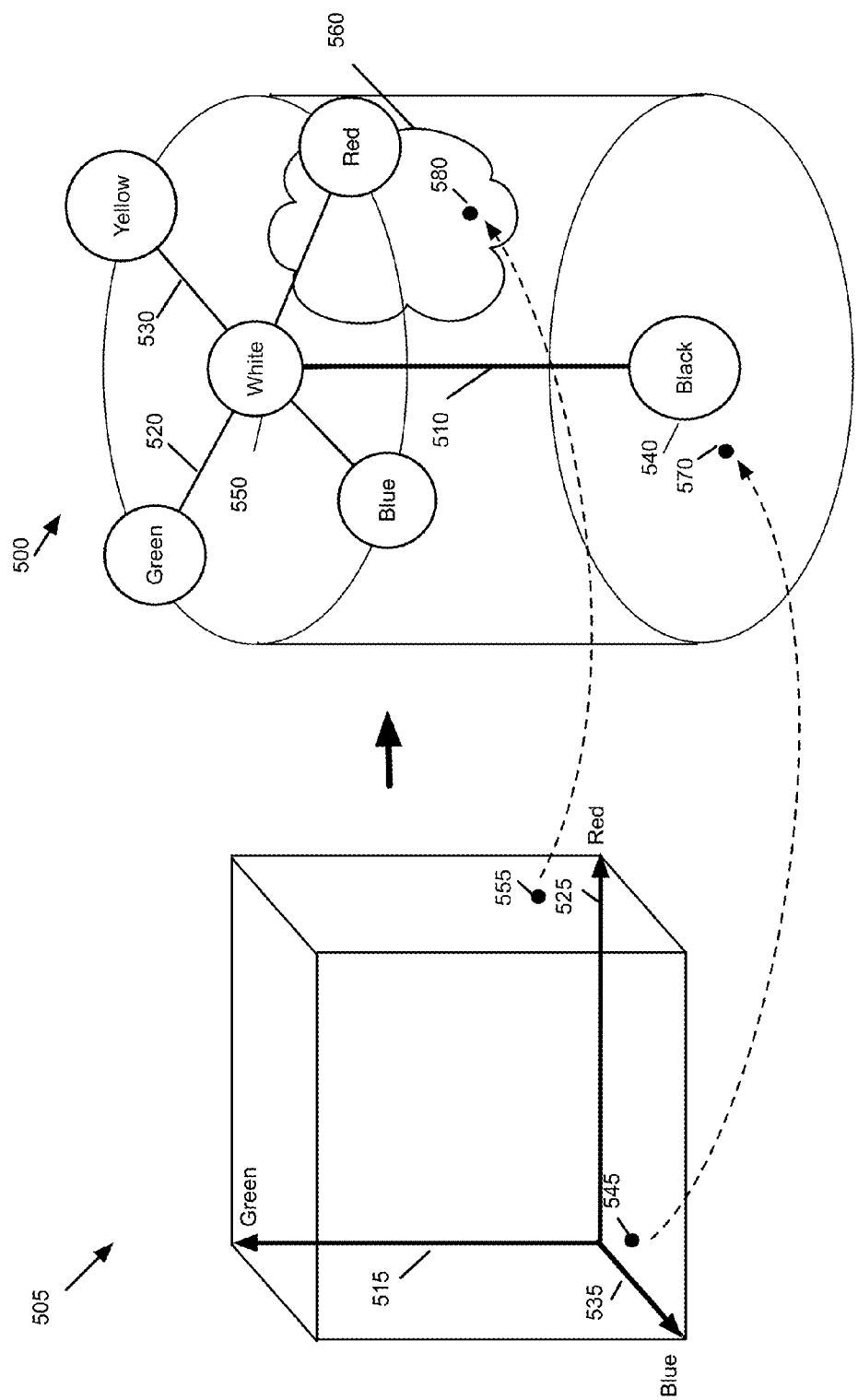
FIG. 5 illustrates an example of identifying a set of pixels with color values that fall within a range of color values defined for skin-tone colors.

Different embodiments use different techniques to identify skin-tone colors. For instance, the image editing application of some embodiments defines skin-tone colors as a range of color values within an opponent color space. An opponent color space is a color space that relies on three opponent color channels (e.g., white/black channel, red/green channel, and yellow/blue channel), generically known as a YCC color space. Some examples of the opponent color space include a YIQ color space, a YcbCr color space, and an IPT color space. In the descriptions that follow, the color space that is used to define the ranges of color values for different types of content will be described as a YCC color space. However, one of ordinary skill in the art should know that the YCC color space can be one of any of the color spaces mentioned above. In some of these embodiments, the color space that is used for defining the range of skin-tone colors is different from the color space (e.g., an RGB color space) in which the color values of the image are defined. In these embodiments, the application of some embodiments first converts the image from a native color space (e.g., the RGB color space) in which the color values of the image are defined to the YCC color space that is used to define the range for skin-tone colors. The application then identifies pixels of the image with color values that fall within the range of color values in the converted color space that is defined for skin-tone colors. FIG. 5 illustrates an example conversion from an RGB color space 505 to a YCC color space 500.

As shown in FIG. 5, the RGB color space 505 is defined along three axes, an axis 525 that represents a range of red component values, an axis 515 that represents a range of green component values, and an axis 535 that represents a range of blue component values. As such, every color of the image 355 can be represented by a location within the RGB color space 505.

FIG. 5 also presents a YCC color space 500 used in conjunction with some embodiments to define skin-tone colors. As shown, the YCC color space is defined along three axes: an axis 520 that represents a range of red and green color values, an axis 530 that represents a range of blue and yellow color values, and a vertical axis 510 that represents a range of different shades of grays (i.e., a range of luminance values), where the bottom location 540 represents a black color and a top location 550 represents a white color. The lighter the color is, lighter the further the color appears from the bottom of this color space cylinder 500.

With reference to the saturation of a color, the more saturated a color is, the further the color appears from the center of the cylinder. The center represents the gray scale where the lowest point 540 contains no color (i.e., black), the highest point 550 represents the presence of all colors at their maximum intensity (i.e., white), and all other points along a vertical line connecting the highest point to the lowest point represent different shades of gray. Each shade of gray represents an equal presence of all colors, though the darker the gray is, the lesser the intensity of the colors is. And the lighter the gray is, the greater the intensity of the colors is.

In some embodiments, skin-tone colors are defined within an area of the YCC color space cylinder 500 between reddish and yellowish hues, with a particular saturation range and a particular intensity range, such as the area 560. Some embodiments also broadly define skin tones to cover skin tone ranges associated with different races and/or ethnicities. Such a broad definition removes the need for users to manually define skin tones. It should be apparent to one of ordinary skill in the art that some embodiments provide a threshold parameter to increase or reduce the range of skin tones recognized by the application.

The application of some embodiments converts an image from the RGB color space 505 to the YCC color space 500 by mapping each color in the RGB color space 505 to another color in the YCC color space 500. For example, color 545 in the RGB color space 505 is mapped to color 570 in the YCC color space 500 and color 555 in the RGB color space 505 is mapped to color 580 in the YCC color space 500. By converting the image from the RGB color space to the YCC color space, the application is able to identify colors that fall within the defined skin-tone color area 560 (e.g., color 555) and colors that do not fall within the defined skin-tone color region 560 (e.g., color 545).

FIG. 4 illustrates an example operation of adjusting the saturation of an image. Instead of adjusting the saturation of an image, some embodiments provide a skin-tone UI control that allows the user to adjust the color temperature of an image. A color temperature is a characteristic of visible light that reflects off of the objects in the image. A warmer light that is hitting the objects in the image creates a warmer color tone (i.e., more red and yellow) to the colors of the objects in the image while a cooler light that is hitting the objects in the image creates a cooler color tone (i.e., more blue and cyan) to the colors of the objects in the image. Thus, adjusting the color temperature of an image means adding more red/yellow or adding more cyan/blue to the image.

Figure 6:
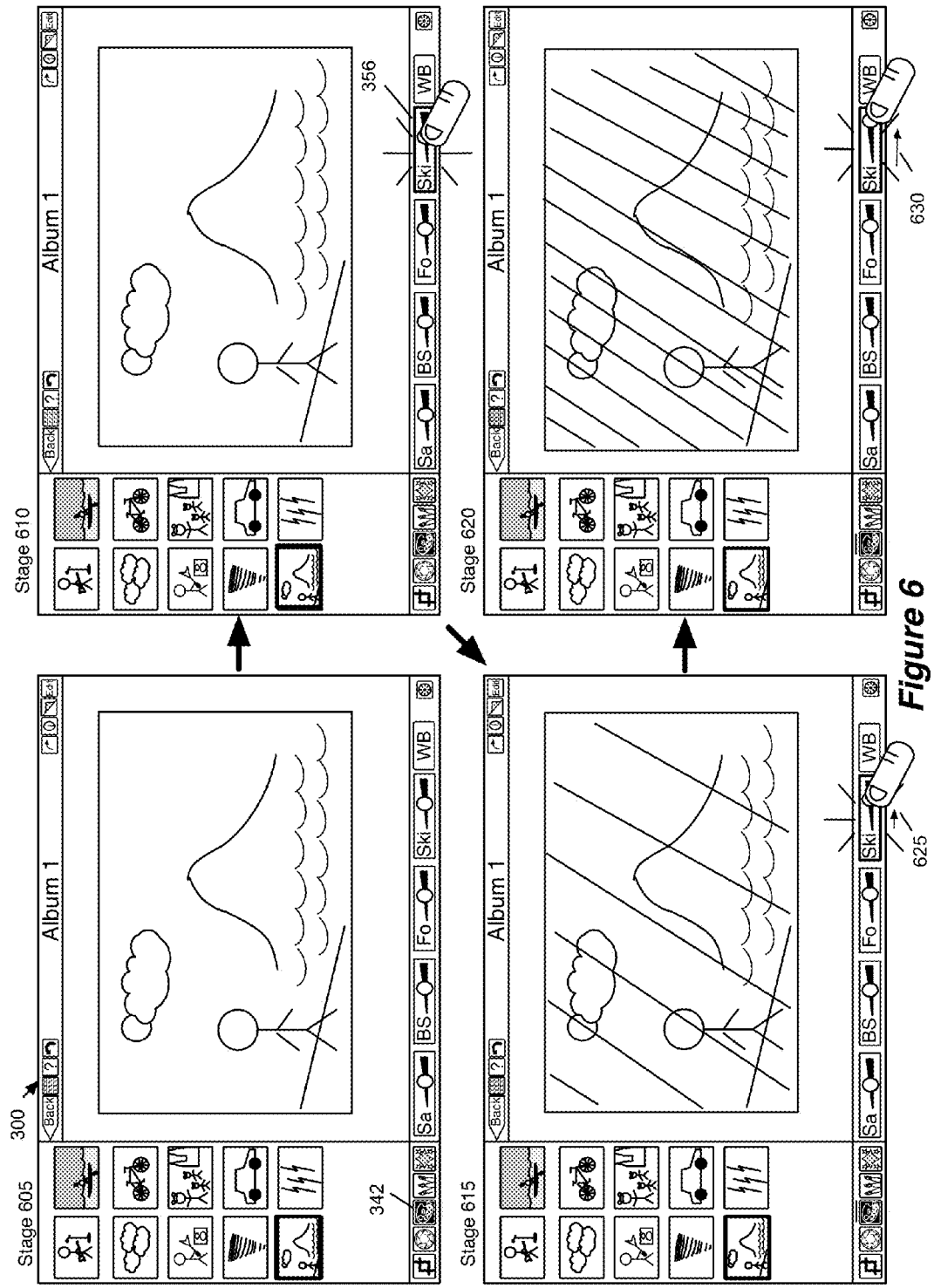
FIG. 6 illustrates an example of adjusting the color temperature of an image based on the skin-tone colors on an image.

FIG. 6 illustrates such an example. Specifically, FIG. 6 illustrates the operation of improving the skin-tone colors by adjusting the color temperature of an image by manipulating a skin-tone UI control at four different stages 605, 610, 615, and 620.

The first stage 605 is identical to the second stage 310 of FIG. 3. As shown, the user has selected the selectable UI item 342 from the tool bar 340 for adjusting colors of the image 355. The second stage 610 illustrates the GUI 300 after the user has selected the skin-tone UI control 356, as indicated by the highlighting of the skin-tone UI control 356. The selection of the skin-tone UI control 356 may be performed by performing a gesture (e.g., placing, pointing, or tapping a finger) at a location on a device having a touch or near touch sensitive screen that displays the skin-tone UI control 356, or by placing a cursor at the skin-tone UI control 356 and providing an input (e.g., clicking on the cursor controlling device, pressing a hot key, etc.).

The third stage 615 illustrates the GUI 300 after the user has begun to adjust the skin-tone colors of the image by moving the knob of the skin-tone UI control 356 to the right, as indicated by the arrow 625. In some embodiments, the user can move the knob of the skin-tone UI control 356 by dragging the user's finger (or dragging a cursor) to a different location. As a result of the finger movement, the color values in the image 355 have been adjusted, as indicated by the diagonal lines across the image 355. In some embodiments, the application adjusts the color temperature of the image in order to make the skin-tone colors more pleasing. In some of these embodiments, the application uses the same defined range of skin-tone colors that was described above by reference to FIG. 5, and adjusts the color values of the image to make colors in the image that fall within the defined range of skin-tone colors more pleasing.

In some embodiments, the application determines an algorithm or mathematical equation for adjusting the color values of the image based on the user's input on the skin-tone UI control 356. The application then applies the algorithm or mathematical equation to all the pixels of the image. In some embodiments, the application first converts the color values of the image to a different color space (e.g., a YCC color space) before applying the adjustments to the color values. As mentioned above, a YCC color space is defined along a black/white color component, a red/green color component, and a yellow/blue color component. The conversion from the RGB color space to the YIQ color space can be performed by first applying a gamma of approximately ¼ on the color values in the RGB color space and then applying a three by three matrix to convert the color values to the YIQ color space. In these embodiments, the application adjust the color temperature of the image in the YIQ color space by adjusting only the values along the red/green color component and the yellow/blue color component without changing the values along the white/black component. In some embodiments, the application adjusts the color temperature of the image in the YIQ color space because applying adjustments in the YIQ color space instead of the original color space of the color values of the image (e.g., the RGB color space) creates a more visibly pleasing results. Moreover, the application in these embodiments converts the color values of the image back to the original color space after the adjustment is complete.

Additionally, the GUI 300 also displays a bar on top of the selectable UI item 342 when a color adjustment has been performed on the image. The bar on top of the selectable UI item 342 will remain visible to indicate what type of adjustments the user has performed on the image. As shown, a bar has appeared on top of the selectable UI item 342 at the third stage 615 after the user has made skin-tone adjustments to the image 355.

The fourth stage 620 illustrates the GUI 300 after the user has further adjusted the skin-tone colors of the image by moving the knob of the skin-tone UI control 356 further to the right, as indicated by the arrow 630. As shown, the colors of the image 355 in this stage 620 are shown to be even more adjusted than the colors in the image in the third stage 615, as indicated by the higher density of the diagonal lines across the image 355.

In the above example illustrated by FIG. 6, the application of some embodiments adjusts the color temperature of the entire image in response to a user's input on the skin-tone UI control 356. Alternatively, the application of other embodiments adjusts the color temperature of only the skin-tone colors in the image. In these embodiments, the application uses the same technique as described above to identify pixels in the image with color values that fall within a pre-defined range of color values that is associated with skin-tone colors. The application then only adjusts the color temperature of the identified pixels within the image. The effect is the opposite of what the vibrancy adjustment does to the image, as shown in FIG. 4.

Figure 7:
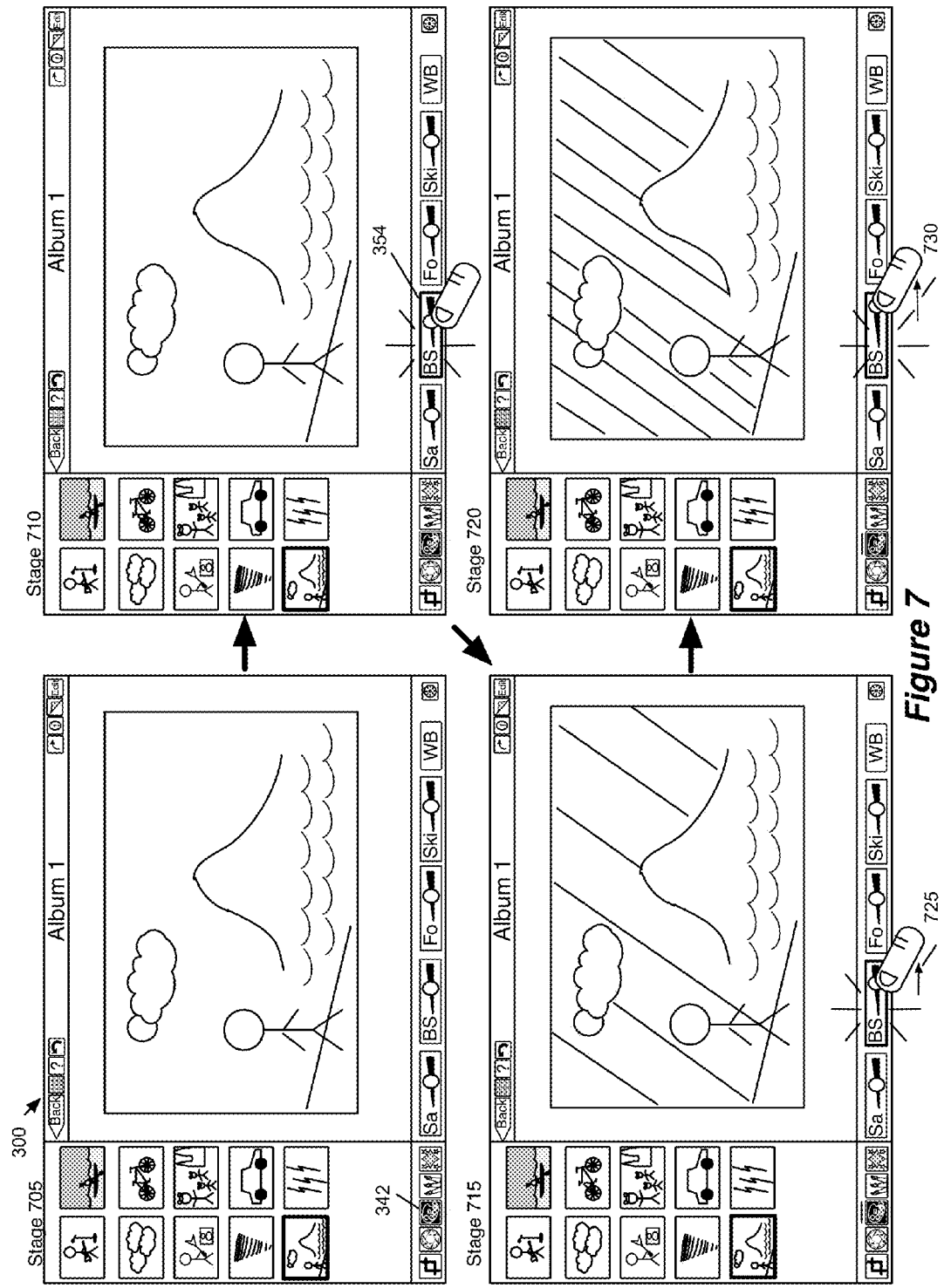
FIG. 7 illustrates an example of adjusting only a portion of the image that represents a sky through the GUI of an image editing application of some embodiments.

As mentioned above, the image editing application of some embodiments also provides a UI control for adjusting only a portion of the image (e.g., the sky colors or the foliage colors of the image). FIG. 7 illustrates an example operation of adjusting or enhancing the sky colors of an image without affecting the remaining colors of the image at four different stages 705, 710, 715, and 720.

The first stage 705 is identical to the second stage 310 of FIG. 3. As shown, the user has selected the selectable UI item 342 for adjusting colors of the image 355. The second stage 710 illustrates the GUI 300 after the user has selected the sky UI control 354, as indicated by the highlighting of the sky UI control 354. The selection of the sky UI control 354 may be performed by performing a gesture (e.g., placing, pointing, or tapping a finger) at a location on a device having a touch or near touch sensitive screen that displays the sky UI control 354, or by placing a cursor at the sky UI control 354 and providing an input (e.g., clicking on the cursor controlling device, pressing a hot key, etc.).

The third stage 715 illustrates the GUI 300 after the user has begun to enhance the sky colors of the image by moving the knob of the sky UI control 354 to the right, as indicated by the arrow 725. In some embodiments, the user can move the knob of the sky UI control 354 by dragging the user's finger (or dragging a cursor) to a different location. As a result of the finger movement, the sky colors in the image 355 have been enhanced, as indicated by the diagonal lines across the area of the sky in the image 355 while the rest of the image 355 remains unaffected. In some embodiments, the application enhances the sky colors by adjusting the saturation of the sky colors. In these embodiments, the application determines an algorithm or mathematical equation for adjusting the color values of the image based on the user's input on the sky UI control 354. The application then applies the algorithm or mathematical equation to the pixels of the image that have been identified as having sky colors. Instead of or in addition to adjusting the saturation, the application of some other embodiments also adjusts the brightness and contrast of the sky colors in the image to bring an overall enhancement to the sky colors in the image. In these embodiments, the application uses the single adjustment (which specifies a single adjustment value) provided by the user's movement of the knob of the sky UI control 354 to determine adjustments for saturation, contrast, and brightness to the pixels of the image that have been identified as having sky colors.

For example, when the sky UI control allows the user to specify an adjustment value between −0.5 to 0.5, the application of some embodiments determines a contrast adjustment value (i.e., a gain value) to be a value of 1 or a value of the adjustment value plus 1, whichever is larger. The application also determines a brightness adjustment value (i.e., a gamma) to be the absolute value of the adjustment value plus 1. The application then applies these two adjustments to the image in the RGB color space. The formula for computing the color values of each pixel using the contrast and gamma is: $R = gain * (colorvalue)^{gamma}$, whereas parameter "gain" represents the contrast adjustment value, parameter "colorvalue" represents the color value (i.e., red channel value, green channel value, or blue channel value) of each pixel in the image, and parameter gamma represents the brightness adjustment value.

To adjust the saturation of the image, the application of some embodiments uses this formula to compute the color values of each pixel: $R = colorvalue + (colorvalue - ave) * (gamma - 1) * 0.5$, whereas parameter color value represents the color value (i.e., red channel value, green channel value, or blue channel value) of each pixel in the image, parameter "avg" represents the average of the three color component values for each pixel (e.g., dividing the sum of (red channel value, green channel value, blue channel value by three), and parameter "gamma" represents the brightness adjustment value.

Additionally, the GUI 300 also displays a bar on top of the selectable UI item 342 when a color adjustment has been performed on the image. The bar on top of the selectable UI item 342 will remain visible to indicate what type of adjustments the user has performed on the image. As shown, a bar has appeared on top of the selectable UI item 342 at the third stage 715 after the user has made sky adjustments to the image 355.

The fourth stage 720 illustrates the GUI 300 after the user has further enhanced the sky colors of the image by moving the knob of the sky UI control 354 further to the right, as indicated by the arrow 730. As shown, the sky colors of the image 355 in this stage 720 are shown to be even more enhanced than the sky colors in the image in the third stage 715, as indicated by the higher density of the diagonal lines across the area of the sky in the image 355, while the rest of the image 355 remains unaffected.

Figure 8:
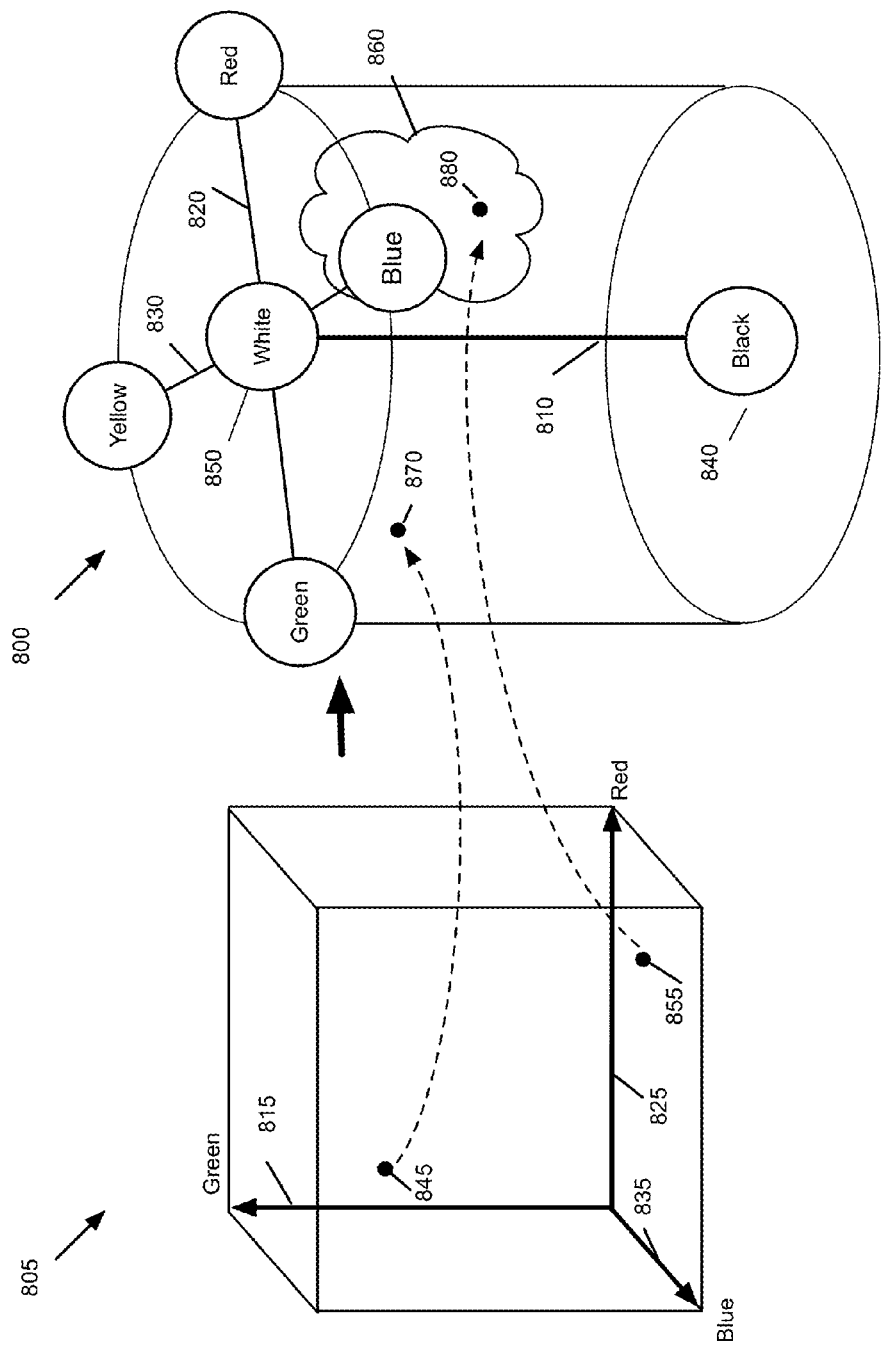
FIG. 8 illustrates an example of identifying a set of pixels with color values that fall within a range of color values defined for sky colors.

Different embodiments use different techniques to identify sky colors. For instance, the image editing application of some embodiments defines sky colors as a range of color values within an opponent color space. An opponent color space is a color space that relies on three opponent color channels (e.g., white/black channel, red/green channel, and yellow/blue channel), generically known as a YCC color space. Some examples of the opponent color space include a YIQ color space, a YcbCr color space, and an IPT color space. In some embodiments, an opponent color space is preferable for defining sky colors because of its uniform perceptual behavior, especially in the blue regions. In the descriptions that follow, the color space that is used to define the ranges of color values for different types of content will be described as a YCC color space. However, one of ordinary skill in the art should know that the YCC color space can be one of any of the color spaces mentioned above. In some of these embodiments, the color space that is used for defining the range of sky colors is different from the color space (e.g., an RGB color space) in which the color values of the image are defined. In these embodiments, the application of some embodiments first converts the image from a native color space (e.g., the RGB color space), in which the color values of the image are defined, to the YCC color space that is used to define the range of sky colors. The application then identifies pixels of the image with color values that fall within the range defined for sky colors in the new color space. FIG. 8 illustrates an example conversion from an RGB color space 805 to a YCC color space 800.

As shown in FIG. 8, the RGB color space 805 is defined along three axes, an axis 825 that represents a range of red component values, an axis 815 that represents a range of green component values, and an axis 835 that represents a range of blue component values. As such, every color of the image 355 can be represented by a location within the RGB color space 805.

FIG. 8 also presents a YCC color space 800 used in conjunction with some embodiments to define sky colors. As shown, the YCC color space is defined along three axes: an axis 820 that represents a range of red and green color values, an axis 830 that represents a range of blue and yellow color values, and a vertical axis 810 that represents a range of different shades of grays (i.e., a range of luminance values), where the bottom location 840 represents a black color and a top location 850 represents a white color. A color is lighter the further the color appears from the bottom of this color space cylinder 800.

In some embodiments, sky colors are defined within an area of the YCC color space cylinder 800 around the blue, red, and yellow regions, with a particular black/white range, such as the area 860. As such, this range of sky color values include colors of the blue sky, clouds, sunrise, and sunset. It should be apparent to one of ordinary skill in the art that some embodiments provide a threshold parameter to increase or reduce the range of sky colors recognized by the application.

The application of some embodiments converts an image from the RGB color space 805 to the YCC color space 800 by mapping each color in the RGB color space 805 to another color in the YCC color space 800. For example, color 845 in the RGB color space 805 is mapped to color 870 in the YCC color space 800 and color 855 in the RGB color space 805 is mapped to color 880 in the YCC color space 800. By converting the image from the RGB color space to the YCC color space, the application is able to identify colors that fall within the defined sky color region 860 (e.g., color 855) and colors that do not fall within the defined sky color region 860 (e.g., color 845).

Figure 9:
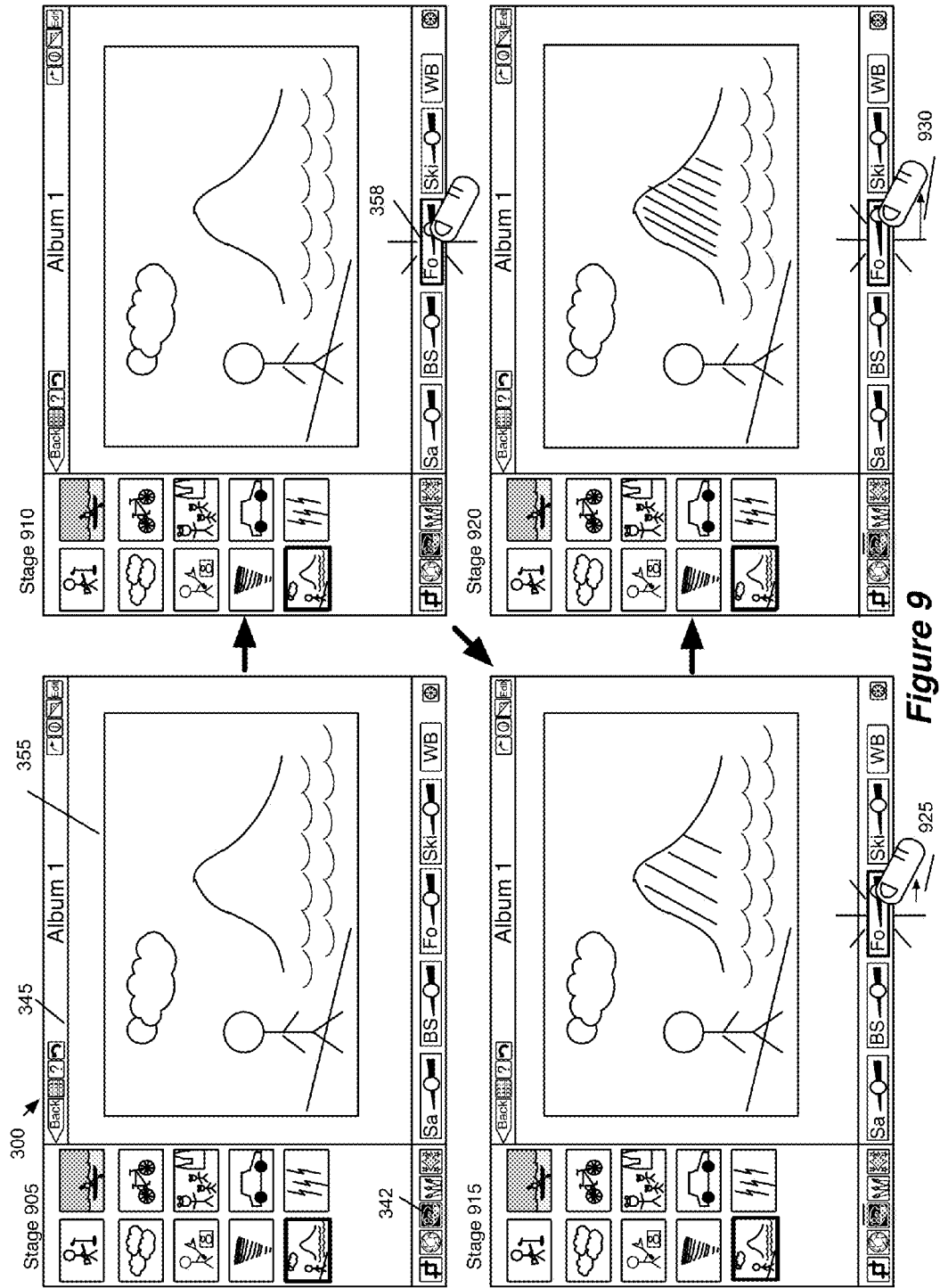
FIG. 9 illustrates an example of adjusting only a portion of the image that represents foliage through the GUI of an image editing application of some embodiments.

In addition to adjusting only the skin-tone or blue sky colors of an image, the image editing application of some embodiments also provide a UI control for adjusting only the foliage (i.e., greenery) colors in an image. FIG. 9 illustrates an example operation of adjusting or enhancing the foliage colors of an image without affecting the remaining colors of the image at four different stages 905, 910, 915, and 920.

The first stage 905 is identical to the second stage 310 of FIG. 3. As shown, the user has selected the selectable UI item 342 for adjusting colors of the image 355. The second stage 910 illustrates the GUI 300 after the user has selected the foliage UI control 358, as indicated by the highlighting of the foliage UI control 358. The selection of the foliage UI control 358 may be performed by tapping a finger at a location on a touch screen device that displays the foliage UI control 358, or by placing a cursor at the foliage UI control 358 and providing an input (e.g., clicking on the cursor controlling device, pressing a hot key, etc.).

The third stage 915 illustrates the GUI 300 after the user has begun to enhance the foliage colors of the image by moving the knob of the foliage UI control 358 to the right, as indicated by the arrow 925. In some embodiments, the user can move the knob of the foliage UI control 358 by dragging the user's finger (or dragging a cursor) to a different location. As a result of the finger movement, the foliage colors in the image 355 (e.g., the colors of the mountain in the background of the image 355) have been enhanced, as indicated by the diagonal lines across the area of the mountain in the image 355 while the rest of the image 355 remains unaffected. In some embodiments, the application enhances the foliage colors by adjusting the saturation, contrast, and brightness of the foliage colors. In these embodiments, the application uses the single adjustment provided by the user's movement of the knob of the foliage UI control 358 to determine adjustments for saturation, contrast, and brightness to the pixels of the image that have been identified as having foliage colors. Similar to the sky adjustment, the application determines an algorithm or mathematical equation for adjusting the color values of the image based on the user's input on the foliage UI control 358. The application then applies the algorithm or mathematical equation to the pixels of the image that have been identified as having foliage colors. In addition to adjusting the saturation, contrast, and brightness of the foliage colors in the image, the application of some embodiments also shifts the overall color of the foliage, such as moving brownish colors of dead grass towards a purer green color.

Additionally, the GUI 300 also displays a bar on top of the selectable UI item 342 when a color adjustment has been performed on the image. The bar on top of the selectable UI item 342 will remain visible to indicate what type of adjustments the user has performed on the image. As shown, a bar has appeared on top of the selectable UI item 342 at the third stage 915 after the user has made foliage adjustments to the image 355.

The fourth stage 920 illustrates the GUI 300 after the user has further enhanced the foliage colors of the image by moving the knob of the foliage UI control 358 further to the right, as indicated by the arrow 930. As shown, the foliage colors of the image 355 in this stage 920 are shown to be even more enhanced than the foliage colors in the image in the third stage 915, as indicated by the higher density of the diagonal lines across the area of the mountain in the image 355, while the rest of the image 355 remains unaffected.

Figure 10:
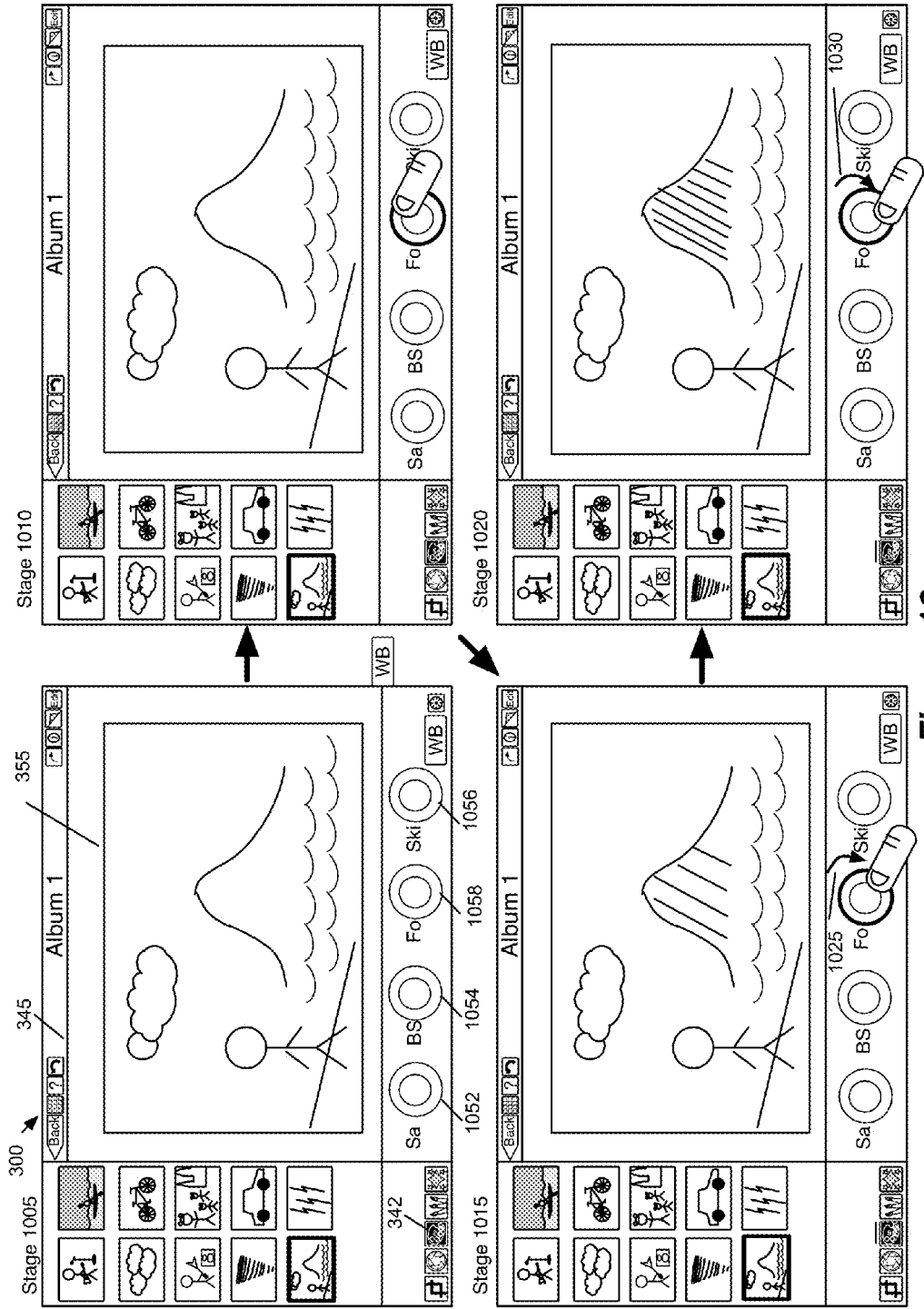
FIG. 10 illustrates another example of adjusting only a portion of the image that represents foliage through the GUI of an image editing application of some embodiments.

In the examples illustrated above by reference to FIGS. 3, 4, 6, 7, and 9, the UI controls are implemented as range sliders, in which a user provides an input by sliding a knob along a straight slider. As mentioned before, different embodiments use different types of UI controls for adjusting color values on the image. In some embodiments, the range sliders can be in different shapes or geometries where the user can move the knob anywhere within the region of the slider. In other embodiments, the application implements the UI controls as dials. FIG. 10 illustrates an example of operation of adjusting or enhancing the foliage colors of an image using a dial UI control at four different stages 1005, 1010, 1015, and 1020.

The first stage 1005 is identical to the first stage 905 of FIG. 9, except that different UI controls for initiating the different color adjustments for the image have a different appearance. As mentioned before, different embodiments use different types of UI controls for adjusting color values on the image. In this example, the application implements the set of UI controls 1052-1058 as dials. Similar to the range sliders, a different dial is for initiating a different color adjustment operation to the image. For example, UI control 1052 is for initiating a saturation adjustment to the image, UI control 1054 is for initiating a color adjustment to the sky colors of an image, UI control 1058 is for initiating a color adjustment to the foliage colors of an image, and 1056 is for initiating a color adjustment to the skin-tone colors of the image. A user can initiate a particular color adjustment by selecting one of the dials and rotate the dial in a clockwise or counter-clockwise direction.

The second stage 1010 illustrates the GUI 300 after the user has selected the foliage UI control 1058, as indicated by the highlighting of the foliage UI control 1058. The selection of the foliage UI control 1058 may be performed by performing a gesture (placing, pointing, or tapping a finger) at a location on a device having a touch or near touch sensitive screen that displays the foliage UI control 1058, or by placing a cursor at the foliage UI control 1058 and providing an input (e.g., clicking on the cursor controlling device, pressing a hot key, etc.).

The third stage 1015 illustrates the GUI 300 after the user has begun to enhance the foliage colors of the image by proving a circular input on the foliage UI control 1058, as indicated by the arrow 1025. In some embodiments, the user can provide a circular input on the foliage UI control 358 by dragging the user's finger (or dragging a cursor) in a clockwise or counter-clockwise direction. As a result of the finger movement, the foliage colors in the image 355 (e.g., the colors of the mountain in the background of the image 355) have been enhanced, as indicated by the diagonal lines across the area of the mountain in the image 355 while the rest of the image 355 remains unaffected. In some embodiments, the application enhances the foliage colors by adjusting the saturation, contrast, and brightness of the foliage colors. In these embodiments, the application uses a single adjustment value specified by the user's movement on the foliage UI control 1058 to determine adjustments for saturation, contrast, and brightness to the pixels of the image that have been identified as having foliage colors. Similar to the sky adjustment, the application determines an algorithm or mathematical equation for adjusting the color values of the image based on the user's input on the foliage UI control 1058. The application then applies the algorithm or mathematical equation to the pixels of the image that have been identified as having foliage colors.

The fourth stage 1020 illustrates the GUI 300 after the user has further enhanced the foliage colors of the image by providing more circular input of the foliage UI control 1058 further to the right, as indicated by the arrow 1030. As shown, the foliage colors of the image 355 in this stage 1020 are shown to be even more enhanced than the foliage colors in the image in the third stage 1015, as indicated by the higher density of the diagonal lines across the area of the mountain in the image 355, while the rest of the image 355 remains unaffected.

FIG. 10 above illustrates one alternative implementation for the UI control. Some other example implementations for the UI control include buttons (i.e., the user can specify an extent to which to apply an adjustment by the period of holding the button), a number field (i.e., the higher the number represents more application of the adjustment to the image), or the like.

Figure 11:
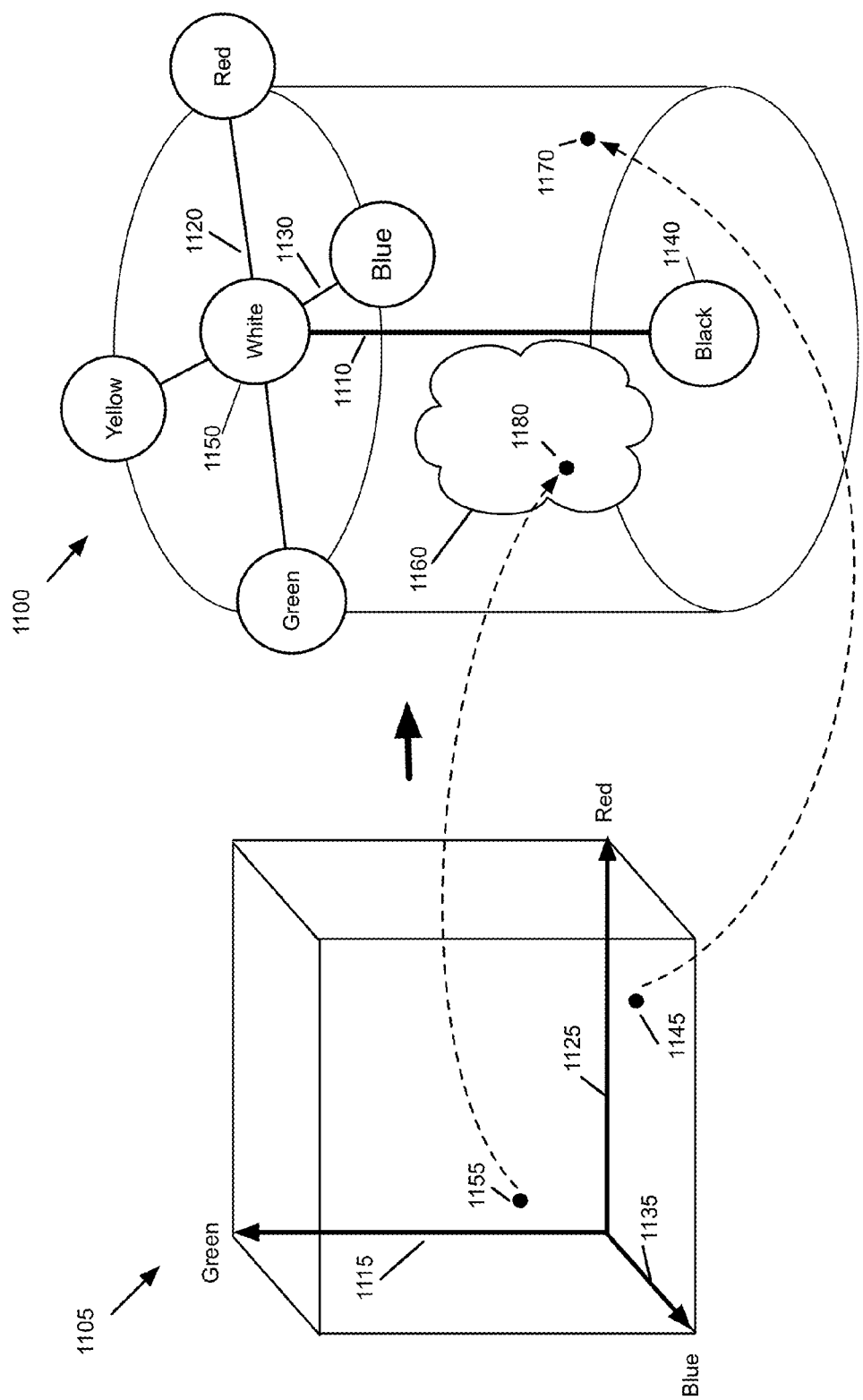
FIG. 11 illustrates an example of identifying a set of pixels with color values that fall within a range of color values defined for foliage colors.

Different embodiments use different techniques to identify foliage colors. For instance, the image editing application of some embodiments defines foliage colors as a range of color values within an opponent color space. An opponent color space is a color space that relies on three opponent color channels (e.g., white/black channel, red/green channel, and yellow/blue channel), generically known as a YCC color space. Some examples of the opponent color space include a YIQ color space, a YcbCr color space, and an IPT color space. In some embodiments, an opponent color space is preferable for defining sky colors because of its uniform perceptual behavior. In the descriptions that follow, the color space that is used to define the ranges of color values for different types of content will be described as a YCC color space. However, one of ordinary skill in the art should know that the YCC color space can be one of any of the color spaces mentioned above. In some of these embodiments, the color space that is used for defining the range of skin-tone colors is different from the color space (e.g., an RGB color space) in which the color values of the image are defined. In these embodiments, the application of some embodiments first converts the image from a native color space (e.g., the RGB color space) in which the color values of the image are defined to the YCC color space that is used to define the range of foliage colors. The application then identifies pixels of the image with color values that fall within the range defined for foliage colors in the new color space. FIG. 11 illustrates an example conversion from an RGB color space 1105 to a YCC color space 1100.

As shown in FIG. 11, the RGB color space 1105 is defined along three axes, an axis 1125 that represents a range of red component values, an axis 1115 that represents a range of green component values, and an axis 1135 that represents a range of blue component values. As such, every color of the image 355 can be represented by a location within the RGB color space 1105.

FIG. 11 also presents a YCC color space 1100 used in conjunction with some embodiments to define foliage colors. As shown, the YCC color space is defined along three axes: an axis 1120 that represents a range of red and green color values, an axis 1130 that represents a range of blue and yellow color values, and a vertical axis 1110 that represents a range of different shades of grays (i.e., a range of luminance values), where the bottom location 1140 represents a black color and a top location 1150 represents a white color. A color is lighter the further the color appears from the bottom of this color space cylinder 1100.

In some embodiments, foliage colors are defined within an area of the YCC color space cylinder 1100 around the green and yellow regions, with a particular black/white range, such as the area 1160. It should be apparent to one of ordinary skill in the art that some embodiments provide a threshold parameter to increase or reduce the range of foliage colors recognized by the application.

The application of some embodiments converts an image from the RGB color space 1105 to the YCC color space 1100 by mapping each color in the RGB color space 1105 to another color in the YCC color space 1100. For example, color 1145 in the RGB color space 1105 is mapped to color 1170 in the YCC color space 1100 and color 1155 in the RGB color space 1105 is mapped to color 1180 in the YCC color space 1100. By converting the image from the RGB color space to the YCC color space, the application is able to identify colors that fall within the defined foliage color region 1160 (e.g., color 1155) and colors that do not fall within the defined foliage color region 1160 (e.g., color 1145).

The GUIs of the image editing application illustrated in the figures described above are illustrated under an assumption that the device, on which the image editing application runs, has a screen large enough to display the GUIs. However, some of the devices, on which the image editing application runs, may have limited screen sizes to display UI items the way the items are displayed in larger screens of larger devices. Also, the larger screens of the larger devices may be deemed limited when the devices are held in different orientations (e.g., portrait). In some embodiments, the image editing application displays different sets of different UI items at different instances in time to accommodate to the limited screen spaces.

Figure 12:
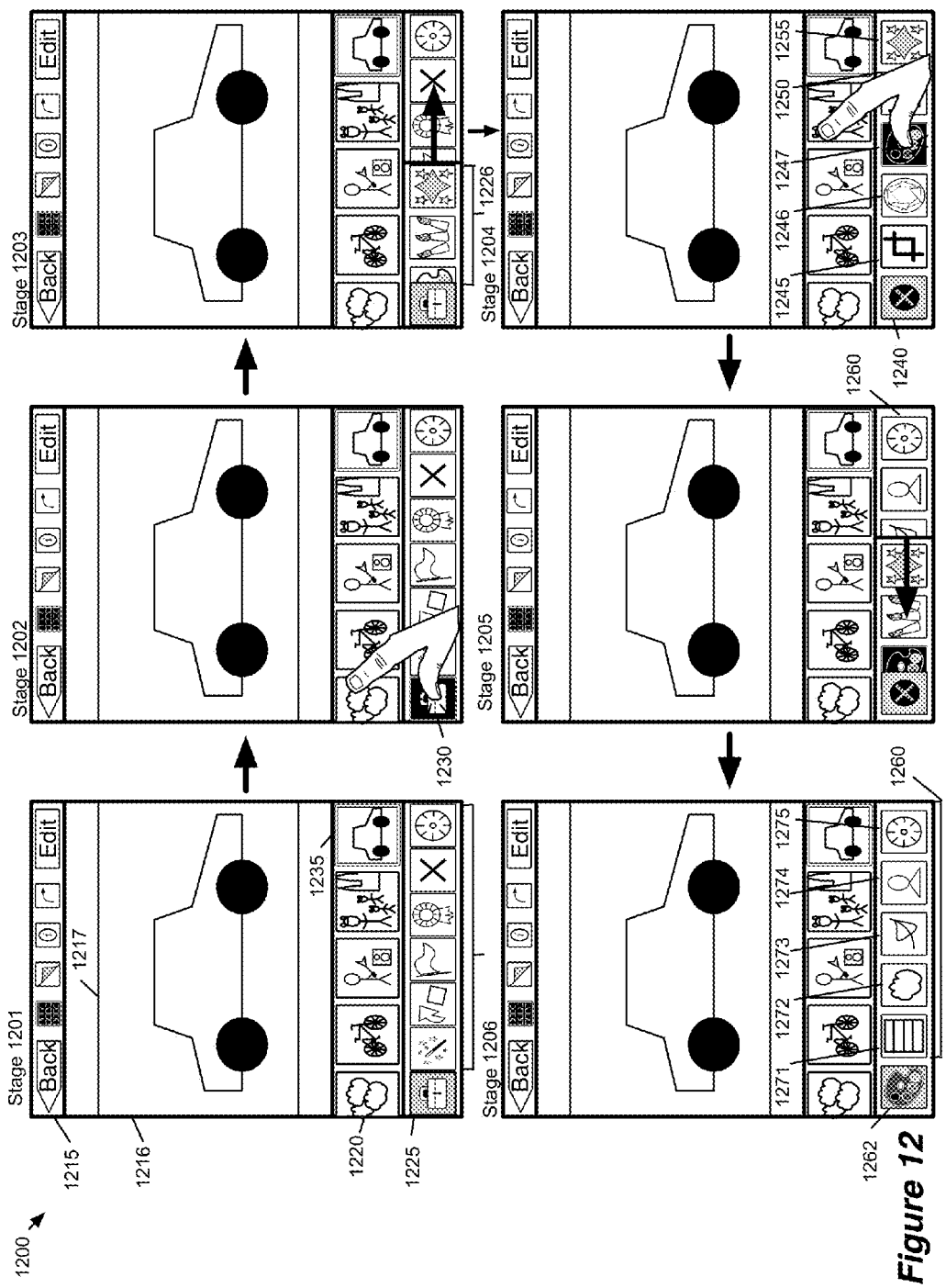
FIG. 12 illustrates an example of invoking a set of color adjustment tools through a different GUI of an image editing application of some embodiments.

FIG. 12 conceptually illustrates an example of invoking a set of color adjustment tools through GUI 1200 of some embodiments at six different stages 1201-1206. As shown, the GUI 1200 includes a control pane 1215, an image display area 1216, a thumbnail display area 1220, and a tool navigation pane 1225.

The image display area 1216 is similar to the image display area 345 described above by reference to FIG. 3, in that the image display area 1216 displays an image that the user wishes to edit using the image editing application. The thumbnail display area 1215 is similar to the thumbnail display area 330 in that the thumbnail display area 1215 displays a collection of thumbnails of images that are available for editing using the image editing application. In some embodiments, the image editing application allows the user to scroll up and down or sideways to display different thumbnails. Also, the image editing application provides a visual indication (e.g., highlights) on a thumbnail to show that the thumbnail has been chosen and the corresponding image is displayed in the display area. Moreover, the image editing application of some embodiments provides a visual indication (e.g., a toolbox icon) on a thumbnail to show that the corresponding image has been edited.

The tool navigation pane 1225 displays different sets of selectable or controllable UI items at different instances in time. In some embodiments, a set of user interface items that is currently displayed in the tool navigation pane 1225 depends on the user's interaction with the set of UI items that was previously displayed in the tool navigation pane 1225. For instance, when the user touches a particular UI item that represents a set of editing tools, a set of UI items for the set of editing tools related to that particular UI item replaces the set of UI items that includes the particular UI item in the tool navigation pane 1225. As shown, the tool navigation pane 1225 displays a UI item 1230 and a set of other UI items 1292.

The image editing application may replace a first set of UI items displayed in the tool navigation pane 1225 with a second set of UI items in a number of different ways. For instance, the image editing application slides out the first set while sliding in the second set. The image editing application may overlay the first set with the second set as the second set is sliding in. Moreover, direction of sliding by the first and second sets may be any direction—up, down, left, right, diagonal, etc.

An example operation of invoking the color adjustment tools through the GUI 1200 will now be described. At the first stage 1201, the image editing application displays an image 1217 in the image display area 1216. The image 1217 corresponds to a thumbnail 1235 displayed in the thumbnail display area 1220. That is, the image editing application displays the image 1217 in the image display area 1216 in response to the user's selection of the thumbnail 1235.

The second stage 1202 illustrates the GUI 1200 after a user has started to initiate a change of UI items that is displayed in the navigation pane 1225. In some embodiments, selecting the UI item 1230, which is an icon showing a toolbox, changes the UI items that is displayed in the navigation pane 1225 to a set of UI items that represents a set of image editing tools, including the color adjustment tool. As shown, the user has selected a UI item 1230, as indicated by the highlighting of the UI item 1230.

The third stage 1203 is a transient stage showing the animation that the GUI 1200 provides when the application changes the set of UI items that is displayed in the tool navigation pane 1225. As mentioned, the application of some embodiments provides an animation of replacing one set of UI items in the tool navigation pane 1225 with another set of UI item. In this example, the GUI displays an animation of a new set of UI items 1226 replacing the set of UI items 1292 that was displayed in the tool navigation pane 1225. As shown, the set of UI items 1292 is sliding in from underneath the UI item 1230 to the right, covering the set of UI items 1292 in the process.

The fourth stage 1204 illustrates the GUI 1200 after the set of UI items 1226 has completely replaced the set of UI items 1292. As shown, the tool navigation pane 1225 displays the new set of UI items 1226. The set of UI items 1226 in this example includes six UI items 1240, 1245, 1246, 1247, 1250, and 1255. The UI item 1245 represents the on-image cropping and straightening tool. The UI item 1246 represents a set of exposure adjustment tools. The UI item 1247 represents a set of color adjustment tools. The UI item 1250 represents the on-image brush tools. The UI item 1255 represents the on-image effect tools. At this stage, the user selects the UI item 1247 to invoke the color adjustment tools.

In addition, because of the replacement of the set of UI items, the UI item 1230 is also replaced with a UI item 1240. The UI item 1240 is for replacing the new set of UI items 1226 with another set of UI items in the tool navigation pane 1225. The UI item 1240 is also for the user to touch to indicate that the user does not wish to use the editing tools represented by the set of UI items.

The fourth stage 1204 also shows that the user has started to invoke the color adjustment tool by selecting the UI item 1247. As shown, the user has tapped a finger on the UI item 1247, as indicated by the highlighting of the UI item 1247.

The fifth stage 1205 is a transient stage showing the animation that the GUI 1200 provides when application replaces the set of UI items 1226 in the tool navigation pane 1225 with a set of color adjustment tools 1260, in response to the user's selection of the UI item 1247. As shown, the set of UI items 1226 begins to slide to the left into the UI item 1240, revealing a new set of color adjustment tools 1260 during the process.

The sixth stage 1206 illustrates the GUI 1200 after the set of color adjustment tools 1260 has completely replaced the set of UI items 1226 in the tool navigation pane 1225. As shown, the set of color adjustment tools includes a UI item 1271 for invoking a saturation UI control, a UI item 1272 for invoking a sky UI control, a UI item 1273 for invoking a foliage UI control, a UI item 1274 for invoking a skin UI control, and a UI item 1275 for invoking a set of color balance UI controls. In addition, the replacement of the set of UI items 1226 also causes the UI item 1240 to change to a UI item 1262 that looks like the color adjustment icon. A user may select the UI item 1262 for exiting out (or deselecting the set of color adjustment tools).

Figure 13:
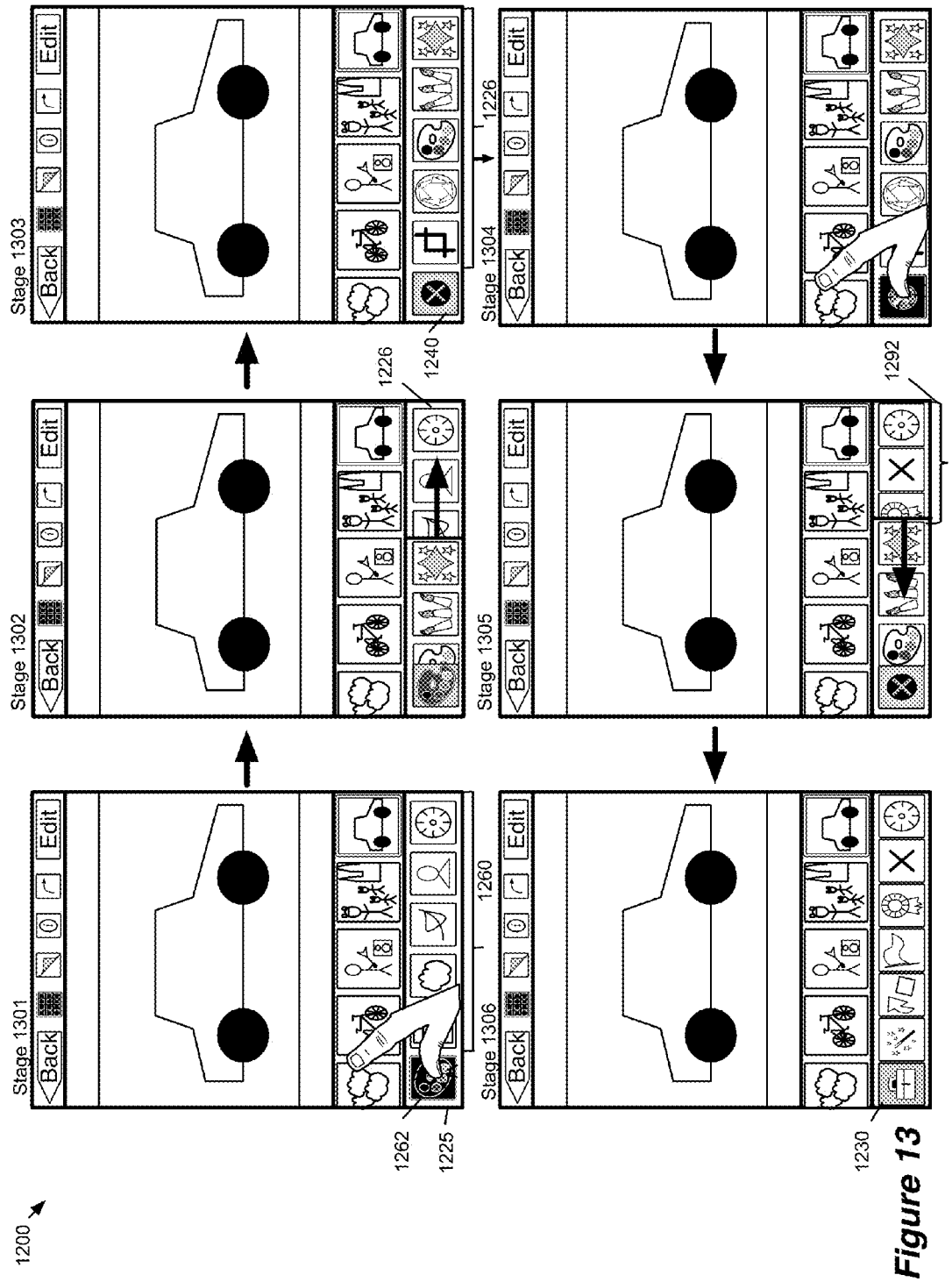
FIG. 13 illustrates an example of deselecting a set of color adjustment tools through a different GUI of an image editing application of some embodiments.

FIG. 12 illustrates an example of invoking a set of color adjustment tools through the GUI 1200. FIG. 13 illustrates an example of deselecting the set of color adjustment tools through the GUI 1200 at six different stages.

The first stage 1301 is identical to the sixth stage 1206 of FIG. 12, except that the user has just selected the UI item 1262 in the tool navigation pane 1225 for deselecting the set of color adjustment tools 1260.

The second stage 1302 is a transient stage showing the animation that the GUI 1200 provides when the application replaces the set of color adjustment tools 1260 with the set of UI items 1226. As shown, the set of UI items 1226 begins to slide into the tool navigation pane 1225 from underneath the UI item 1262, covering the set of color adjustment tools 1260 in the process.

The third stage 1303 shows that the set of UI items 1226 has completely replaced the set of color adjustment tools 1260. In addition, the UI item 1262 has also been changed to the UI item 1240. As mentioned, the UI item 1240 is for the user to select to indicate that the user does not wish to use the editing tools represented by the set of UI items.

The fourth stage 1304 illustrates the GUI 1200 when the user has selected the UI item 1240. The fifth stage 1305 is a transient stage showing the animation that the application replaces the set of UI items 1226 with the set of UI items 1292, in response to the user's selection of the UI item 1240. As shown, the set of UI items 1226 begins to slide to the left into the UI item 1240, revealing the set of UI items 1292 during the process.

The sixth stage 1306 illustrates the GUI 1200 after the set of UI items 1292 has completely replaced the set of UI items 1226 in the tool navigation pane 1225. In addition, the UI item 1240 has changed to the UI item 1230.

Figure 14:
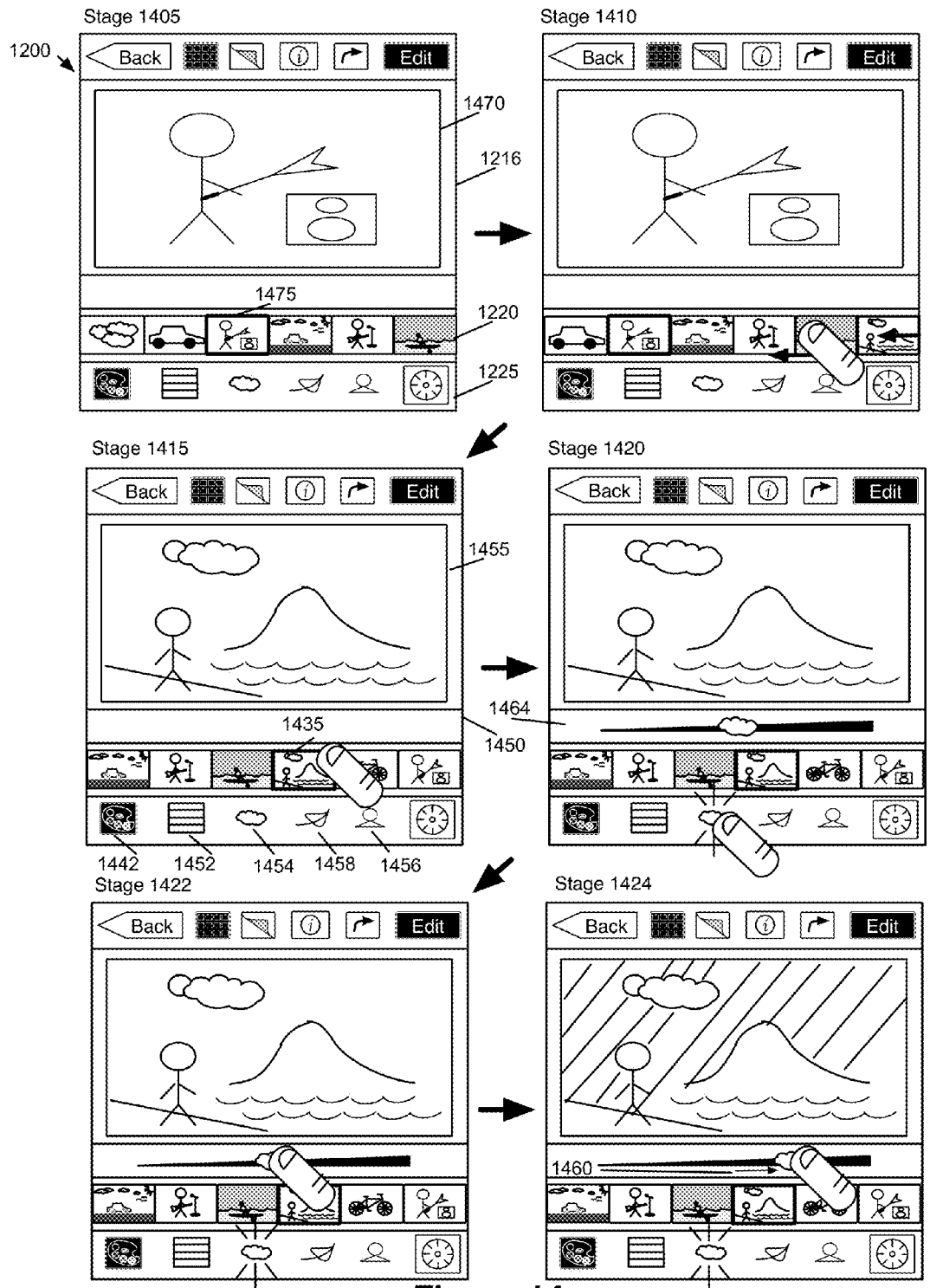
FIG. 14 illustrates another example of adjusting only a portion of the image that represents a sky through a different GUI of an image editing application of some embodiments.

FIG. 14 illustrates an example of performing a sky adjustment operation on an image through the GUI 1200 at six stages 1405, 1410, 1415, 1420, 1422, and 1424. As shown in FIG. 14, the GUI 1200 has a thumbnail display area 1220 that includes a set of thumbnail versions of images for a user to browse and select. A user may browse through more thumbnail images by scrolling on the thumbnail display area 1220 left or right (e.g., by putting a finger on the thumbnail display area 1220 and dragging the finger to the left or to the right). The GUI 1200 also includes an image display area 1216 for displaying a set of images, a tool navigation pane 1225, and a UI control display area 1450.

The first stage 1405 illustrates the GUI 1200 after the user has selected an image 1470 to be displayed in the image display area 1216. The selection of an image to be displayed in the image display area 1216 can be performed by performing a gesture (placing, pointing, or tapping a finger) at a location on a device having a touch or near touch sensitive screen that displays the corresponding thumbnail of the image 1475, or by placing a cursor at the thumbnail of the image 1475 and providing an input (e.g., clicking on the cursor controlling device, pressing a hot key, etc.). The selection is also indicated by the highlighting of the thumbnail 1475 in the thumbnail display area 1220.

The second stage 1410 illustrates the GUI 1200 after the user has begun to scroll the thumbnail images in the thumbnail display area 1220. As mentioned above, a user may browse through more thumbnail images by scrolling on the thumbnail display area 1220 left or right. The scrolling can be performed by performing a gesture (e.g., placing, pointing, tapping a finger) on a device having a touch or near touch sensitive screen that displays the thumbnail display area 1220 and dragging the finger to the left or to the right. As shown, the user has scrolled the thumbnail images to the left by dragging a finger to the left.

The third stage 1415 illustrates the GUI 1200 after the user has completed scrolling the thumbnail images in the thumbnail display area 1220 and selected a new image to be displayed in the image display area 1216. As shown, the thumbnail display area 1220 now includes a thumbnail 1435 that was not displayed in the thumbnail display area 1220 in the first stage 1405. As shown in the third stage 1415, the user has also selected an image 1455 to be displayed in the image display area 1216. The selection of an image to be displayed in the image display area 1216 can be performed by performing a gesture (placing, pointing, or tapping a finger) at a location on a device having a touch or near touch sensitive screen that displays the corresponding thumbnail of the image 1435, or by placing a cursor at the thumbnail of the image 1435 and providing an input (e.g., clicking on the cursor controlling device, pressing a hot key, etc.). The selection is also indicated by the highlighting of the thumbnail 1435 in the thumbnail display area 1220.

As shown in the third stage 1415, the user has also selected to perform color adjustments on the image 1455, as indicated by the highlighting of the color adjusting icon 1442. As a result, a set of selectable UI items 1452-1458 is displayed in the tool navigation pane 1225. Each of the selectable UI items 1452-1458 is for initiating a different color adjustment on the image. For example, selectable UI item 1452 is for initiating a saturation adjustment for the image, selectable UI item 1454 is for initiating a sky adjustment for the image, selectable UI item 1458 is for initiating a foliage adjustment for the image, and selectable UI item 1456 is for initiating a skin-tone adjustment for the image. These color adjustments are identical to the different color adjustments described above by reference to FIGS. 3, 4, 6, 7, and 9.

The fourth stage 1420 illustrates the GUI 1200 after the user has selected the selectable UI item 1454 in the tool navigation pane 1225. The selection of the selectable UI item 1454 may be performed by performing a gesture (e.g., placing, pointing, or tapping a finger) at a location on a device having a touch or near touch sensitive screen that displays the selectable UI item 1454, or by placing a cursor at the selectable UI item 1454 and providing an input (e.g., clicking on the cursor controlling device, pressing a hot key, etc.). As shown, the user has selected the selectable UI item 1454 by tapping a finger on the selectable UI item 1454, as indicated by the highlight of the selectable UI item 1454. As a result of the selection, a sky adjustment UI control 1464 has appeared in the UI control display area 1220.

Different embodiments provide different types of UI controls for adjusting colors of an image. In this example, the sky adjustment UI control is a range slider. A user can adjust the sky colors in the image by sliding the knob of the sky UI control 1464 to a different position along the range slider.

The fifth stage 1422 is a transient stage that shows the user has selected the knob of the sky UI control 1464 but has not begun to adjust the sky colors in the image. The sixth stage 1424 illustrates the GUI 1200 after the user has begun to adjust the sky colors of the image by moving the knob of the sky UI control 1464 to the right, as indicated by the arrow 1460. In some embodiments, the user can move the knob of the sky UI control 1464 by dragging the user's finger (or dragging a cursor) to a different location. As a result of the finger movement, the sky colors in the image 1455 have been enhanced, as indicated by the diagonal lines across the area of the sky in the image 355 while the rest of the image 1455 remains unaffected. In some embodiments, the application adjusts the sky colors in the image in the same manner as described above by reference to FIG. 7.

Figure 15:
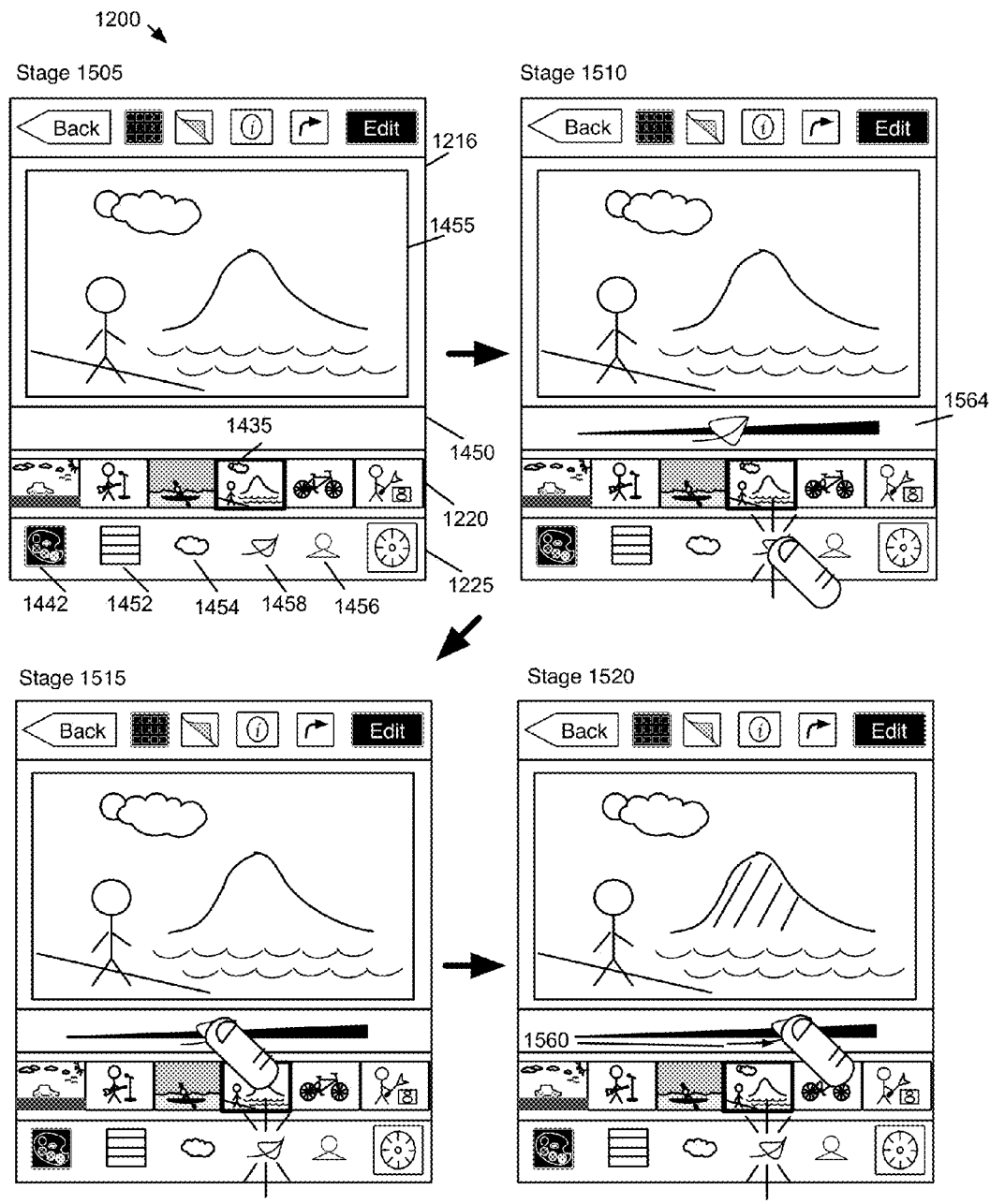
FIG. 15 illustrates another example of adjusting only a portion of the image that represents foliage through a different GUI of an image editing application of some embodiments.

FIG. 14 illustrates an example of performing a sky adjustment operation through the GUI 1200. The user can perform other kinds of color adjustment operations (e.g., a saturation adjustment, a vibrancy adjustment, a foliage adjustment, a skin-tone adjustment, etc.) in a similar manner through selecting the different selectable UI items 1452-1458. FIG. 15 provides an example of performing a foliage adjustment operation through the GUI 1200 at four stages, 1505, 1510, 1515, and 1520

The first stage 1505 is identical to the first stage 1405 of FIG. 14. As shown, the user has selected the image 1455 to be displayed in the image display area 1216. The second stage 1510 illustrates the GUI 1200 after the user has selected the selectable UI item 1458 in the Tool navigation pane 1225. The selection of the selectable UI item 1458 may be performed by performing a gesture (e.g., placing, pointing, or tapping a finger) at a location on a device having a touch or near touch sensitive screen that displays the selectable UI item 1458, or by placing a cursor at the selectable UI item 1458 and providing an input (e.g., clicking on the cursor controlling device, pressing a hot key, etc.). As shown, the user has selected the selectable UI item 1458 by tapping a finger on the selectable UI item 1458, as indicated by the highlight of the selectable UI item 1458. As a result of the selection, a foliage adjustment UI control 1564 has appeared in the UI control display area 1450.

The third stage 1515 is a transient stage that shows the user has selected the knob of the foliage UI control 1564 but has not begun to adjust the foliage colors in the image. The fourth stage 1520 illustrates the GUI 1200 after the user has begun to adjust the foliage colors of the image by moving the knob of the foliage UI control 1564 to the right, as indicated by the arrow 1560. In some embodiments, the user can move the knob of the foliage UI control 1564 by dragging the user's finger (or dragging a cursor) to a different location. As a result of the finger movement, the foliage colors in the image 1455 have been enhanced, as indicated by the diagonal lines across the area of the mountain in the image 1455 while the rest of the image 1455 remains unaffected. In some embodiments, the application adjusts the foliage colors in the image in the same manner as described above by reference to FIG. 9.

Figure 16:
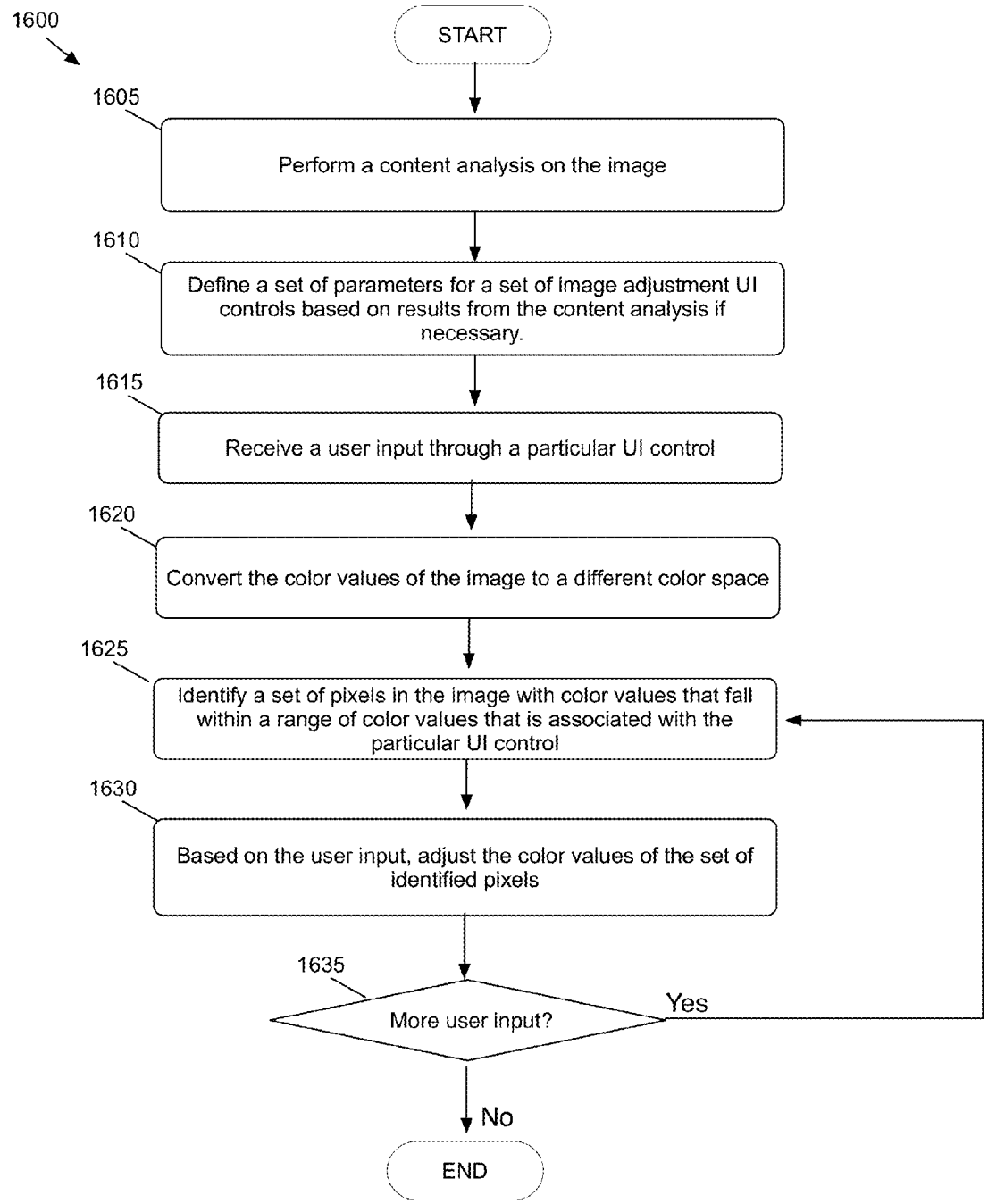
FIG. 16 conceptually illustrates a process of some embodiments for adjusting only a portion of an image based on a user's selection of a location on the image.

FIG. 16 conceptually illustrates a process 1600 for adjusting color values of a portion of an image based on the user's input on a color adjustment UI control. In some embodiments, the process is performed by an image editing application. The process begins by performing (at 1605) a content analysis on the image. Different embodiments perform different content analyses on the image. For example, the application of some embodiments performs a face detection analysis on the image to determine if the image contains any person's face.

The process then defines (at 1610) a set of parameters for a set of image adjustment UI controls based on results from the content analysis if necessary. In some embodiments, at least one of the adjustment UI controls can be configured to perform different adjustment operations on the image based on a setting of the application. In some of these embodiments, the application defines a default setting for the image based on the results from the content analysis. For instance, when the application detects that the image includes a person's face, the application configures the saturation UI control to perform a vibrancy adjustment (i.e. adjusting the saturation of the image while preserving skin-tone colors) rather than adjusting the saturation of the entire image.

Next, the process receives (at 1615) a user input on a particular UI control. As mentioned above, some of the UI controls are for adjusting color values of different portions of the image. In some embodiments, the application includes a set of pre-defined ranges of color values for the UI controls. For example, the application has defined a range of color values associated with sky colors for the sky UI control, a range of color values associated with foliage colors for the foliage UI control, and a range of color values associated with skin-tone colors for the saturation UI control and the skin-tone UI control. In some of these embodiments, the color values of the image are defined in a color space that is different from the color space that is used to define these ranges of color values. Therefore, after a user input is received on a particular UI control, the process converts (at 1620) the color values of the image to the color space that is used to define the ranges of color values.

The process then identifies (at 1625) a set of pixels in the image with color values that fall within a range of color values that is associated with the particular UI control. In some embodiments, the ranges of color values that are associated with the different types of contents are stored in a media storage. In these embodiments, the process retrieves the range of color values associated with the particular UI control from the media storage and identifies the pixels with color values that fall within the range of color values. In other embodiments, the ranges of color values are defined within the executable codes for performing the color adjustments. In these other embodiments, the identification operation is executed at the same time as the process performs the color adjustments to the image.

Based on the user input, the process then adjusts (at 1630) the color values of the set of pixels that have been identified at operation 1625. The process 1600 shows that in some embodiments, the process first identifies the set of pixels in the image that falls within the range of color values, and then performs the adjustment to the set of identified set of pixels. However, in some other embodiments, the process identifies the pixels for adjustment at the same time it performs the adjustment operation. Specifically, for each pixel in the image, the process iteratively determines if the color values of the pixel fall within the range of color values and perform the adjustment only if the color values are within the range.

In some embodiments, before adjusting the color values of the image, the application generates an algorithm or a mathematical equation that can be applied to the color values of the image. The application then applies the algorithm or mathematical equation to the color values of each pixel in the image that has been identified at operation 1625.

Next, the process determines (at 1635) whether more user inputs are received on the set of UI controls. If more inputs are received, the process returns to 1625 to identify another set of pixels. The process will cycle through operations 1625-1635 until no more inputs are received on the set of UI controls. Then the process ends.

Different embodiments use different techniques to identify the set of pixels at operation 1625 of FIG. 16. In some embodiments, the application uses the techniques described above by reference to FIGS. 5, 8, and 11 to identify the set of pixels.

In some embodiments, the application only performs one type of adjustment (e.g., a saturation adjustment) to the color values of the image in response to the user input on a particular UI control. As mentioned above, the application of some other embodiments performs more than one type of adjustment to the color values of the image in response to a single user input on a particular UI control. For example, when a user provides an input to the sky UI control 354, the application of some embodiments performs a saturation adjustment, a contrast adjustment, and a brightness adjustment to the color values of a portion of the image. In these embodiments, the application uses the single user input to determine an adjustment value for adjusting contrast, an adjustment value for adjusting the saturation, and an adjustment value for adjusting brightness for the image, and applies these separate adjustment values to the color values of the image.

Figure 17:
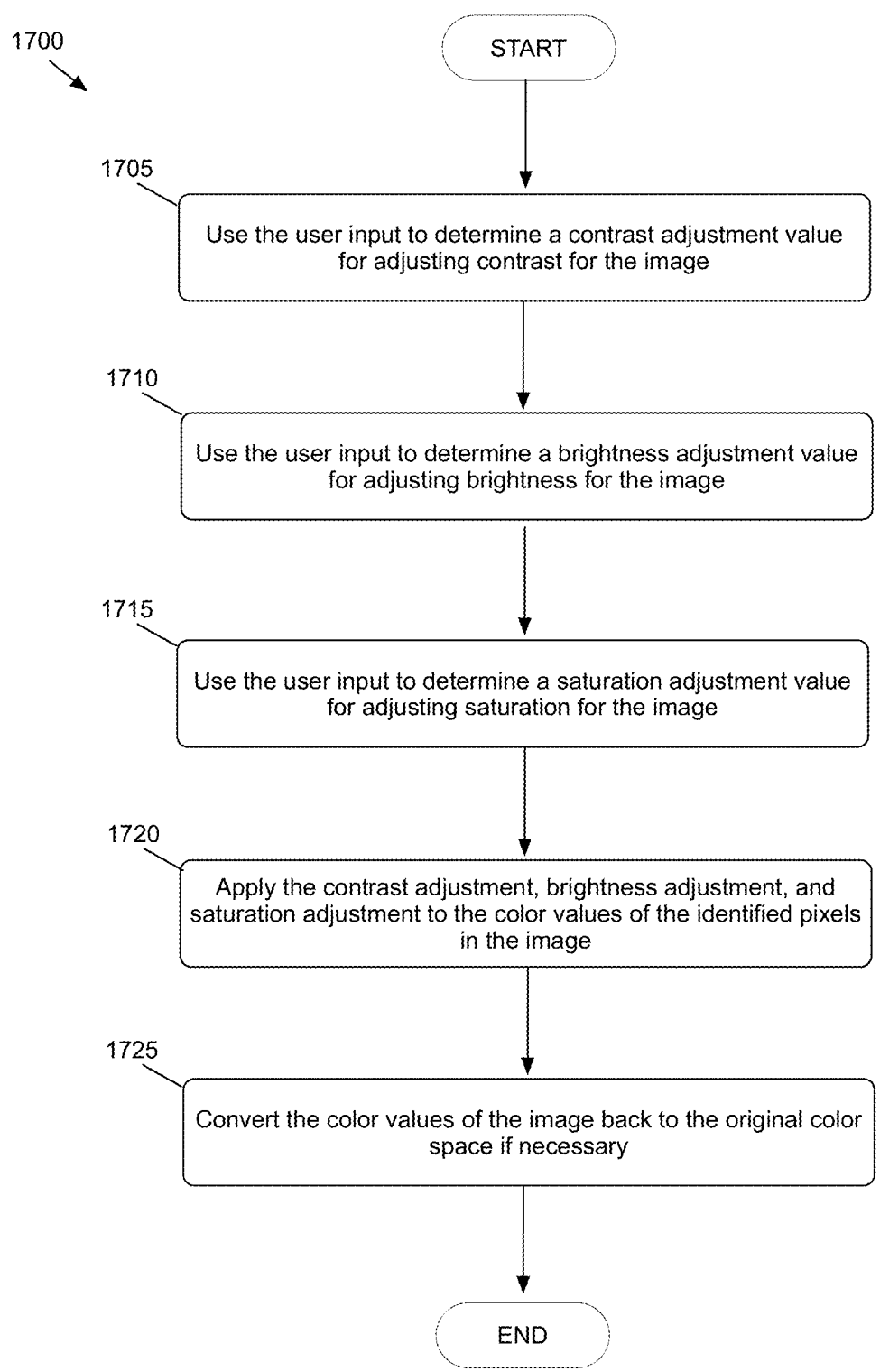
FIG. 17 conceptually illustrates a process of some embodiments for performing multiple color adjustments to an image based on a single user input.

FIG. 17 conceptually illustrates a process 1700 for performing several types of adjustments to a limited range of color values in an image based on a single user's input on the color adjustment UI control. In some embodiments, the process is performed during the operation 1620-1630 of FIG. 16. The process 1700 begins by using (at 1705) the user input on a UI control to determine a contrast adjustment value for adjusting contrast of the image. In some embodiments, contrast of an image represents the range of color values in the image. In other words, an image with higher contrast has a wider range of color values than an image with lower contrast. Thus, increasing the contrast of an image involves stretching the range of color values in the image (i.e., widening the difference between the bright color values and the dark color values of the image) and decreasing the contrast of an image reduces the range of color values in the image (i.e., shrinking the difference between the bright color values and the dark color values of the image). Thus, the contrast adjustment value determines the extent the application adjusts the range of the color values in the image.

Next, the process uses (at 1710) the same user input on the UI control to determine a saturation adjustment value for adjusting the saturation of the image. In some embodiments, saturation of an image represents the intensity of color values in the image. Thus, increasing the saturation of an image involves increasing the intensity of the color values of the image. Thus, the saturation adjustment value determines the extent to which the application adjusts the intensity of the color values in the image.

The process then uses (at 1715) the same user input on the particular UI control to determine a brightness adjustment value for adjusting brightness of the image. In some embodiments, brightness of an image represents the lightness or luminance of color values in the image. Thus, increasing the brightness of an image involves increasing the luminance values of the color values in the image. Thus, the brightness adjustment value determines the extent to which the application adjusts the lightness or brightness values of the color values in the image.

After determining the three different adjustment values for adjusting contrast, saturation and brightness of the image, the process applies (at 1720) the contrast adjustment value, saturation adjustment value, and brightness adjustment value to the color values of the set of pixels that have been identified at operation 1625. In some embodiments, the application generates a set of algorithms or a set of mathematical equations based on the different adjustment values for applying to the color values of the image. The application then applies the set of algorithms or the set of mathematical equations to the color values of each pixel in the image that has been identified at operation 1625.

Next, the process converts (at 1725) the color values of the image back to its original color space if necessary. In some embodiments, after identifying the set of pixels for adjustment in the converted color space (e.g., the YCC color space), the application performs the adjustment on the color values of the image in the converted color space. For example, the application of some embodiments performs foliage adjustment in the YCC color space. In some embodiments, it is preferable to perform the foliage adjustment in a particular YCC color space (e.g., the IPT color space) because of its uniform perceptual behavior. For example, the hues of a color can be moved towards green without making the color yellow. In these embodiments, it is necessary for the process to convert the color values of the image back to its original color space when the adjustment operation is completed. In other embodiments, after identifying the set of pixels for adjustments, the application performs the adjustment on the color values of the image in its original color space. For example, the application of some embodiments performs sky adjustment in the color values' original color space (e.g., the RGB color space). In these embodiments, it is not necessary for the process to perform this conversion step 1720. Then the process ends.

Some embodiments perform all adjustments in the same color space, while other embodiments perform color adjustments in different color spaces.

Figure 18:
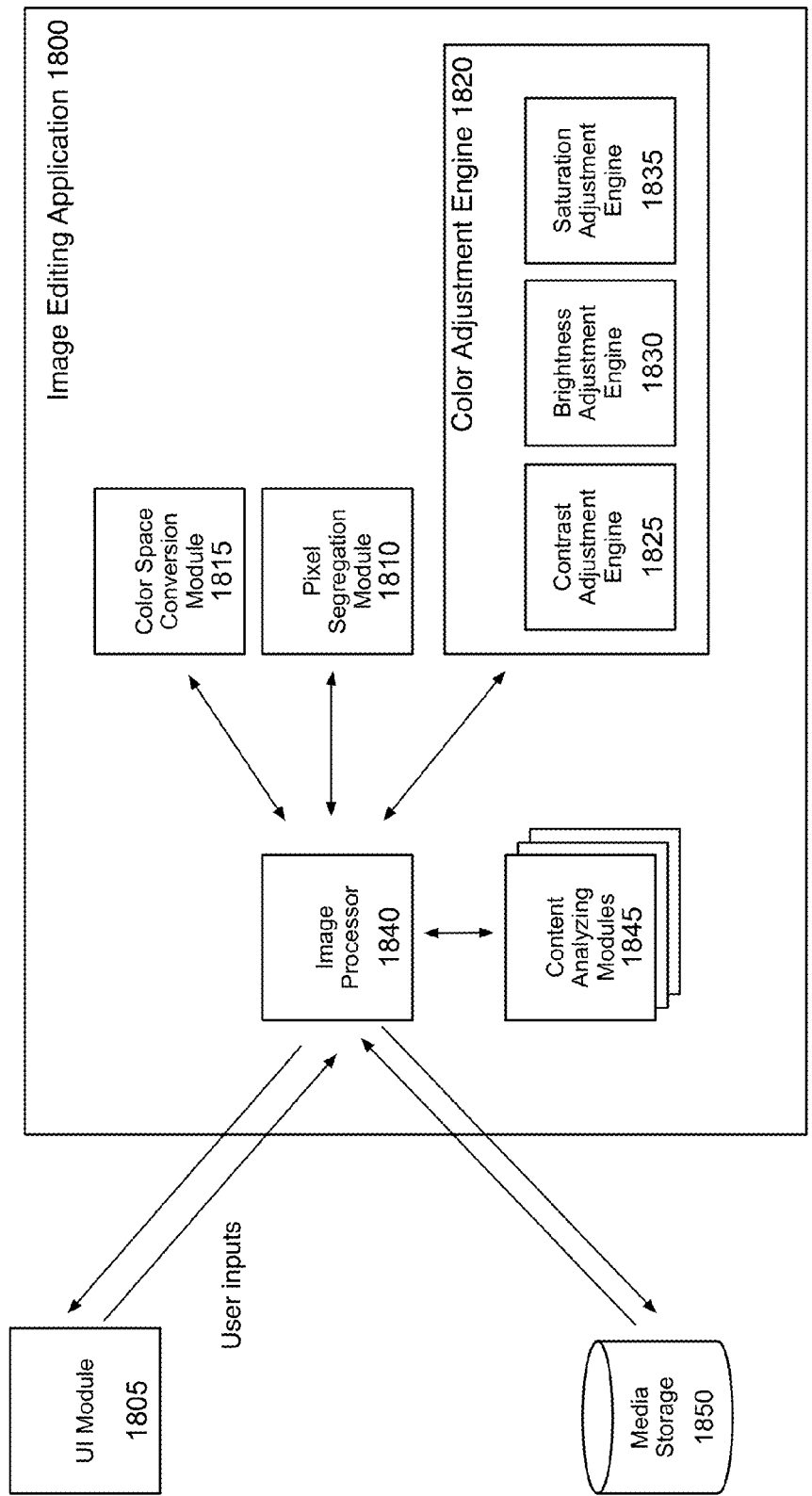
FIG. 18 conceptually illustrates a software architecture of an image editing application of some embodiments.

FIG. 18 illustrates an image editing application 1800 of some embodiments that provides a set of UI controls for adjusting color values of only a portion of an image. In some embodiments, the image editing application 1800 performs the processes 1600 and 1700. As shown in FIG. 18, the image editing application 1800 includes an image processor 1840, a set of content analyzing modules 1845, a color space conversion module 1815, a pixel segregation module 1810, and a color adjustment engine 1820.

When the UI module 1805 receives a user input for invoking the set of color adjustment UI controls, the UI module 1805 passes the request to the image processor 1840. The image processor 1840 retrieves an image from the media storage 1850 and requests the set of content analyzing modules 1845 to perform a set of content analyses on the image. In some embodiments, the media storage 1850 is a set of file folders organized by the image editing application 1800 and stored on a particular set of storage devices. The storage devices may include the boot drive of the electronic device on which the application operates, a different partition of that disk, a separate internal or external hard drive, a flash drive, SD card, etc.

The set of content analyzing modules 1845 performs a set of content analyzing modules on the image. Different embodiments perform different content analysis on the image. For instance, the application of some embodiments perform a face detection analysis to detect whether a person's face appear on the image. The set of content analyzing modules 1845 then sends the results of the analyses back to the image processor 1840. Based on the results of the analyses, the image processor 1840 in some embodiments defines a set of parameters for a set of UI controls. For instance, if a person's face is detected on the image, the image processor

1840 configures a saturation adjustment UI control to be associated with a vibrancy adjustment operation.

When the UI module 1805 receives a user input on one of the UI controls for initiating a color adjustment operation, the UI module 1805 passes the user input to the image processor 1840. The image processor 1840 then requests the pixel segregation module 1810 to identify a set of pixels in the image with color values that fall within a range of color values associated with the UI control that receives the user input. In some embodiments, the color values of the image are defined within a color space (e.g., an RGB color space) that is different from the color space (e.g., a YCC color space) that is used to define the range of color values. In these embodiments, before requesting the pixel segregation module 1810 to identify the set of pixels, the image processor 1840 requests the color space conversion module 1815 to convert the color values of the image to the color space that is used to define the range of color values.

After the set of pixels are identified, the image processor 1840 sends the image and information about the identified pixels to the color adjustment engine 1820 to perform a set of color adjustments on the image. The color adjustment engine 1820 applies different color adjustments to the identified pixels in the image. In some embodiments, the color adjustment engine 1820 performs the process 1700 to apply adjustments to the identified pixels of the image. As shown, the color adjustment engine 1820 includes a contrast adjustment engine 1825 for applying a contrast adjustment to the image, a brightness adjustment engine 1830 for applying a brightness adjustment to the image, and a saturation adjustment engine 1835 for applying a saturation adjustment to the image. It should be apparent to one who is skilled in the art that these are only example color adjustments that can be performed to an image and the color adjustment engine 1820 may include additional color adjustment engines for performing additional types of color adjustments to the image. For example, the brightness adjustment engine 1830 uses the user input to determine a brightness adjustment value for adjusting brightness of the image, the contrast adjustment engine 1825 uses the user input to determine a contrast adjustment value for adjusting contrast of the image, and the saturation adjustment engine 1835 uses the user input to determine a saturation adjustment value for adjusting the saturation of the image. The different adjustment engines 1825-1835 then apply the brightness adjustment, the contrast adjustment, and the saturation adjustment to the image to produce an edited image.

In some embodiments, the color adjustment engine 1820 adjusts the color values of the image in the converted color space. In these embodiments, the image processor 1840 sends the adjusted image to the color space conversion module 1815 to convert the color values of the image back to its original color space. The image processor 1840 then sends the adjusted image to the media storage and to the UI module 1805 for display.

II. On-Image Controls

As mentioned above by reference to FIG. 1, the image editing application of some embodiments provides a set of UI controls that is overlaid on the image for editing the image. Each of the set of on-image UI controls is associated with a different adjustment. In some embodiments, the user may activate the set of overlaid UI controls (also referred to as on-image UI controls) by selecting a location on the image. In these embodiments, when the user selects a particular location on the image, the application performs a set of analyses to determine a particular type of content that is associated with the selected location on the image. The application then displays a different set of UI controls that is associated with different color-adjusting functions for applying to the image when the selected location is associated with a different type of content. In some embodiments, the set of overlaid UI controls is opaque or transparent. Several embodiments of these on-image UI controls will be described in more detail below in Sections II.A and II.B.

Figure 19:
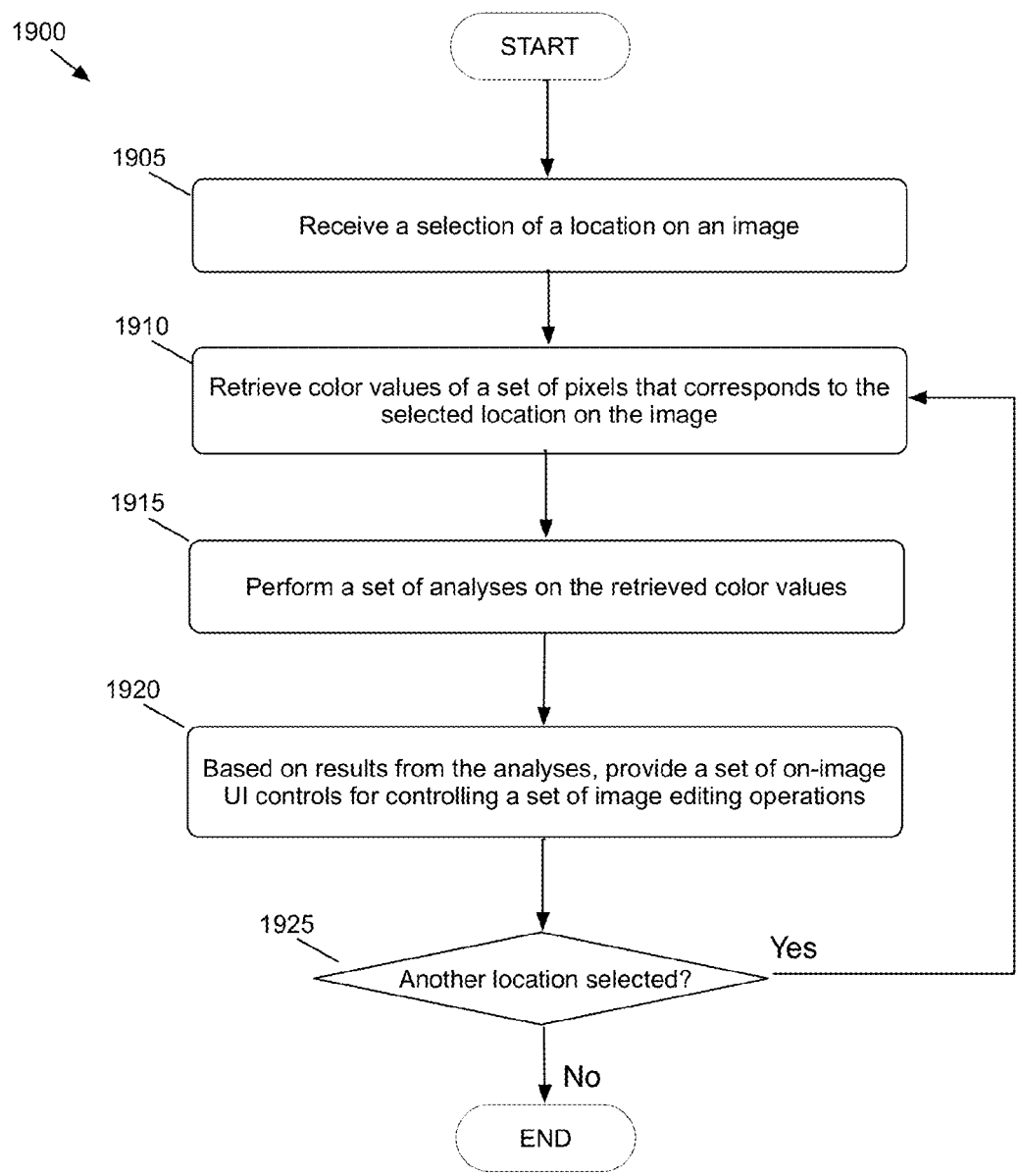
FIG. 19 conceptually illustrates a process of some embodiments for providing different on-image UI controls based on different location selected on an image.

FIG. 19 conceptually illustrates a process 1900 for providing a set of on-image UI controls for adjusting color values of an image based on a user selection of a location on the image. In some embodiments, the process is performed by an image editing application. The process begins by receiving (at 1905) a selection of a location on an image. The process then retrieves (at 1910) color values of a set of pixels that corresponds to the selected location on the image. In some embodiments, the set of pixels are pixels that are located in proximity of the selected location.

Next, the process performs (at 1915) a set of analyses on the retrieved color values. In some embodiments, each analysis determines whether the selected location is associated with a particular type of content based on the retrieved color values. For example, one analysis is for determining whether the selected location is associated with skin-tone and another analysis is for determining whether the selected location is associated with sky.

Based on the results from the set of analyses, the process provides (at 1920) a set of UI controls for controlling a set of image editing operations. In some embodiments, the set of UI controls are on-image controls that are displayed on the image. In some of these embodiments, the set of on-image UI controls are direction dependent UI controls. The user may initiate different image editing operations on the image by providing a directional input on the image.

Next, the process determines (at 1930) whether another location is selected on the image. If another location is selected, the process returns to 1910 to retrieve color values of another set of pixels that corresponds to the newly selected location. The process will cycle through operations 1910-1925 until no more locations are selected. Then the process ends.

A. On-Image Color Controls

Figure 20:
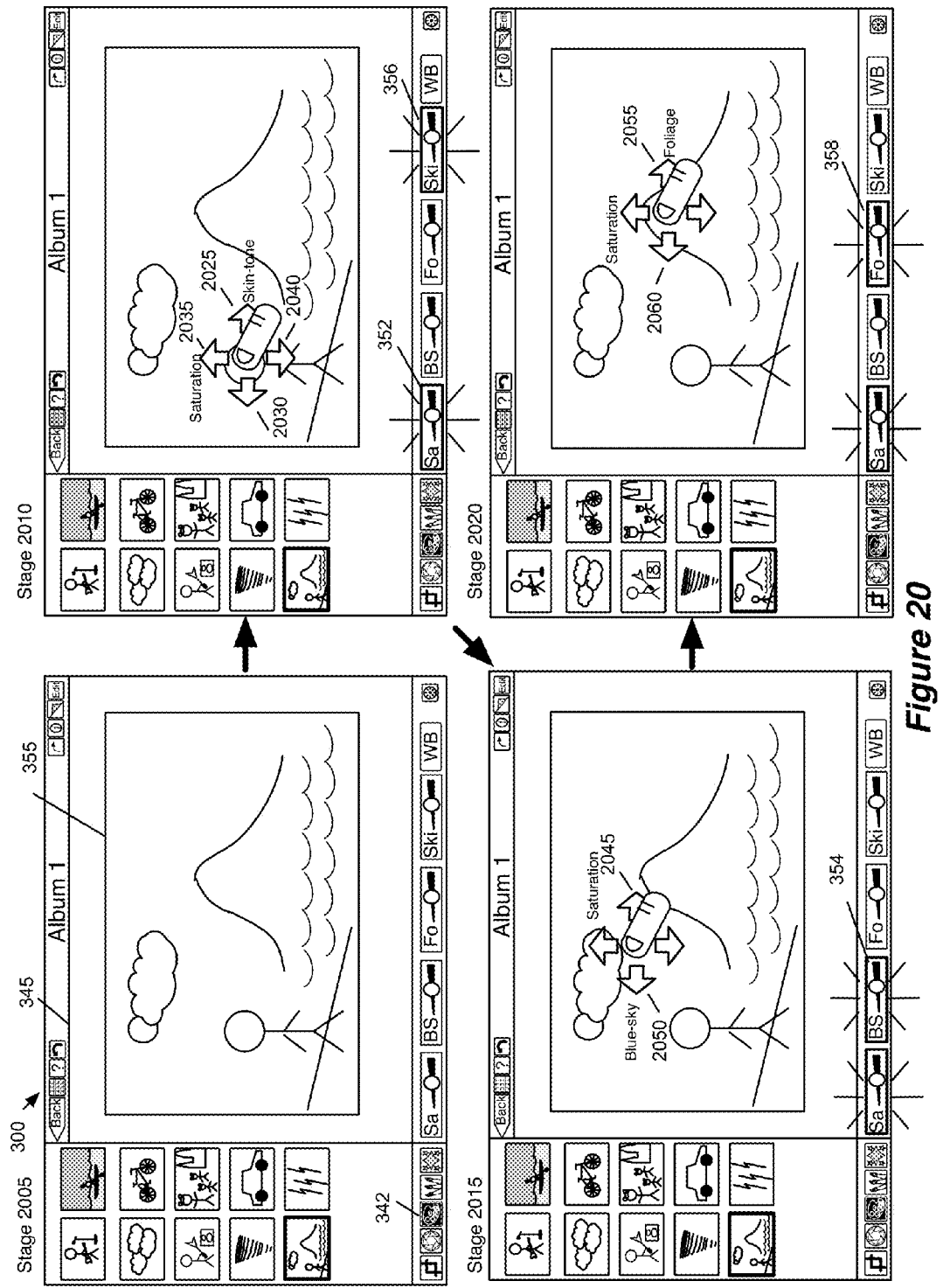
FIG. 20 illustrates an example of providing different on-image UI controls based on different location selected on an image.

In some embodiments, the set of overlaid UI controls that the image editing application provides are for applying different color adjustments to an image. FIG. 20 illustrates an example GUI 300 of an image editing application of some embodiments that provides a set of on-image UI controls for applying color adjustments to an image based on the location on the image selected by the user. Specifically, FIG. 20 illustrates the operation of activating different sets of on-image UI controls at four different stages 2005, 2010, 2015, and 2020. Each of these stages will be described in more detail below.

The first stage 2005 is identical to the second stage 310 of FIG. 3. As shown, the user has selected the selectable UI item 342 for adjusting colors of the image 355. The UI control display area 350 displays a UI control 352 for adjusting the saturation of the image, a UI control 354 for adjusting the sky colors in the image, a UI control 358 for adjusting the foliage colors in the image, and a UI control 356 for adjusting the skin-tone colors in the image. The second stage 2010 illustrates the GUI 300 after a user has selected a location on the image 355. As shown, the user has selected a location on the image that displays a person's face. The selection of the location on the image 355 may be performed by performing a gesture (e.g., placing, pointing, or tapping a finger) at a location on a device having a touch or near touch sensitive screen that displays the image, or by placing a cursor at the location of the image and providing an input (e.g., clicking on the cursor controlling device, pressing a hot key, etc.). As mentioned above, after the user has selected a location on the image, the image editing application of some embodiments performs a set of analyses to determine a particular type of content that is associated with the selected location. Different embodiments use different techniques to determine a type of content that is associated with the selected location. The application of some embodiments first defines different ranges of color values to be associated with different types of contents. For example, the application of some embodiments defines a range of color values to be associated with skin-tone colors, a range of color values to be associated with sky colors, and a range of color values to be associated with foliage colors. In some embodiments, the application defines the ranges of color values in the same manner that is described above by reference to FIGS. 5, 8, and 11. The application then determines whether the color values of a set of pixels that corresponds to the selected location in the image fall within a range of color values associated with a particular type of content, and displays a set of on-image UI controls that is associated with the particular type of content.

Different embodiments implement the set of on-image UI controls differently. For instance, the application of some embodiments implements the set of on-image UI controls as direction dependent UI controls. In some of these embodiments, the application displays a directional arrow for each UI control in order to guide the user to initiate the color adjustment operation associated with the UI control. The user initiates different color adjustment operations by providing different directional inputs. Based on the direction of the directional input, the application performs a particular color adjustment on the image. In the second stage 2010, since the user has selected a location on the image that displays a person's face, the application determines that the color values of the pixels that corresponds with the selected location is associated with skin-tone colors. As a result, the application displays a set of on-image UI controls 2025 and 2030 (displayed as two directional arrows along the horizontal axis) for adjusting skin-tone colors. The set of on-image UI controls 2025 and 2030 corresponds to the skin-tone UI control 356. In some embodiments, the application also highlights the skin-tone UI controls 356 to indicate that the skin-tone UI control 356 is activated. In addition to the UI controls for adjusting skin-tone colors, the application of some embodiments also displays a set of content independent UI controls for adjusting color values for the entire image. In these embodiments, the set of content independent UI controls are always displayed independent of the location selected by the user. In this example, the application displays a set of content independent UI controls 2035 and 2040 (displayed as two directional arrows along the vertical axis) for adjusting the saturation for the entire image. The set of on-image UI controls 2035 and 2040 corresponds to the saturation UI control 352. In some embodiments, the application also highlights the saturation UI control 352 to indicate that the saturation UI control 352 is activated. Although not shown in this figure, the user in this second stage 2010 may select a particular color adjustment (i.e., saturation adjustment to the entire image or color adjustment to the skin-tone colors of the image) by providing a directional input.

In some embodiments, different sets of on-image UI controls that are associated with different color adjustments have different appearances. For example, the on-image UI controls 2025 and 2030 may have a different color than the on-image UI controls 2035 and 2040 in order to provide a distinction to the user.

The third stage 2015 illustrates the GUI 300 after a user has selected a different location on the image 355. As shown, the user has selected a location on the image that shows a blue sky. The application determines that the color values of the pixels that correspond to the newly selected location fall within a range of color values that are defined for sky colors. As a result, the application displays a set of on-image UI controls 2045 and 2050 (displayed as two directional arrows along the horizontal axis) for adjusting sky colors. The set of on-image UI controls 2045 and 2050 corresponds to the sky UI control 354. As shown, the application also highlights the sky UI control 354 to indicate that the sky UI control 354 is activated. Similar to the second stage 2010, in addition to the on-image UI controls for adjusting sky colors, the application also displays a set of content independent UI controls 2035 and 2040 for adjusting the saturation for the entire image. The application also highlights the saturation UI control 352 to indicate that the saturation UI control 352 is activated. Although not shown in this figure, the user in this third stage 2015 may select a particular color adjustment (i.e., saturation adjustment to the entire image or color adjustment to the sky colors of the image) by providing a directional input.

The fourth stage 2020 illustrates the GUI 300 after a user has selected a different location on the image 355. As shown, the user has selected a location on the image that shows a mountain. The application determines that the color values of the pixels that correspond to the newly selected location fall within a range of color values that are defined for foliage colors. As a result, the application displays a set of on-image UI controls 2055 and 2060 (displayed as two directional arrows along the horizontal axis) for adjusting foliage colors. The set of on-image UI controls 2055 and 2060 corresponds to the foliage UI control 358. As shown, the application also highlights the foliage UI control 358 to indicate that the foliage UI control 358 is activated. Similar to the second and third stages 2010 and 2015, in addition to the on-image UI controls for adjusting foliage colors, the application also displays a set of content independent UI controls 2035 and 2040 for adjusting the saturation for the entire image. The application also highlights the saturation UI control 352 to indicate that the saturation UI control 352 is activated. Although not shown in this figure, the user in this fourth stage 2020 may select a particular color adjustment (i.e., saturation adjustment to the entire image or color adjustment to the foliage colors of the image) by providing a directional input.

Figure 21:
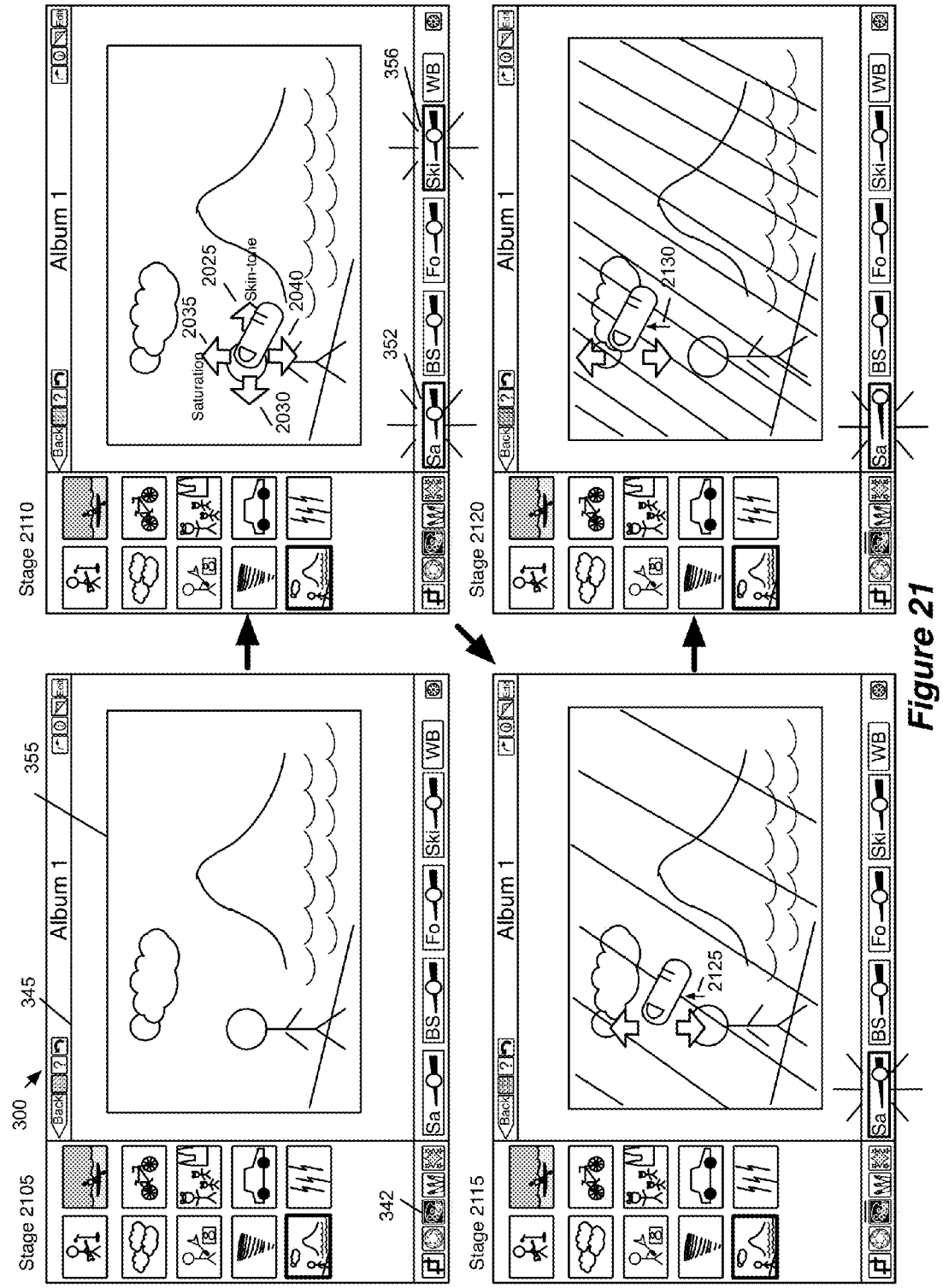
FIG. 21 illustrates an example of adjusting the saturation of an image through the GUI of an image editing application of some embodiments.

FIG. 20 illustrates an example operation of activating different on-image UI controls for performing different color adjustments on the image. FIGS. 21, 22, 23, and 24 illustrate examples of manipulating the different on-image UI controls to perform different color adjustments on the image. Specifically, FIG. 21 illustrates an example operation of manipulating a set of on-image UI controls for adjusting the saturation for the entire image at four different stages 2105, 2110, 2115, and 2120.

The first stage 2105 is identical to the first stage 2005 of FIG. 20. As shown, the user has selected the selectable UI item 342 for adjusting colors of the image 355. The second stage 2110 illustrates the GUI 300 after the user has selected a location on the image 355. The selection of the location on the image 355 may be performed by performing a gesture (e.g., placing, pointing, or tapping a finger) at a location on a device having a touch or near touch sensitive screen that displays the image, or by placing a cursor at the location of the image and providing an input (e.g., clicking on the cursor controlling device, pressing a hot key, etc.). As shown, the user has selected a location on the image 355 that shows a person's face by tapping a finger at the location. As a result of the selection, a set of on-image UI controls 2025-2040 is displayed around the selected location on the image. The set of on-image UI controls includes a set of on-image UI controls 2035 and 2040 that corresponds to the saturation UI control 352 for adjusting the saturation for the entire image and a set of on-image UI controls 2025 and 2030 that corresponds to the skin-tone UI control 356 for adjusting skin-tone colors of the image. The second stage 2110 also shows that the corresponding saturation UI control 352 and the skin-tone UI control 356 are highlighted to indicate that these two UI controls are activated.

The third stage 2115 illustrates the GUI 300 after the user has begun adjusting the saturation of the image 355 by providing a directional input on the image 355. The directional input can be provided by dragging the user's finger on a device having a touch or near touch sensitive screen or dragging a cursor in a direction. In this example, the user provides a directional input by dragging the user's finger upward, toward the top of the image, as indicated by the arrow 2125. The application associates the directional input with the on-image UI control 2035 for increasing the saturation for the entire image and performs the saturation adjustment to the image 355. As shown, the saturation of the colors in the image 355 has been increased, as indicated by the diagonal lines across the image 355. The third stage 2115 also illustrates that once the application associates the directional input with one set of the on-image UI controls, the inactivated on-image UI controls 2025 and 2030 are removed from display and the corresponding skin-tone UI control 356 is no longer highlighted. In some embodiments, the on-image UI controls 2035 and 2040 that have been activated follows the directional input. Thus, the activated on-image UI controls will always be around where the finger (or the cursor) is located on the image. Moreover, the third stage 2115 illustrates that the knob of the corresponding saturation UI control 352 has moved to the right as the saturation of the colors in the image 355 is increased by the on-image UI control 2035.

Additionally, the GUI 300 also displays a bar on top of the selectable UI item 342 when a color adjustment has been performed on the image. The bar on top of the selectable UI item 342 will remain visible to indicate what type of adjustments the user has performed on the image. As shown, a bar has appeared on top of the selectable UI item 342 at the third stage 2115 after the user has made saturation adjustments to the image 355.

The fourth stage 2120 illustrates the GUI 300 after the user has further adjusted the saturation of the image 355 by dragging the user's finger further upward, as indicated by the arrow 2130. As shown, the colors in the image 355 in this stage 2120 are shown to be even more saturated than the colors in the image in the third stage 2115, as indicated by the higher density of the diagonal lines across the image 355. The fourth stage 2120 also illustrates that the knob of the corresponding saturation UI control 352 has moved further to the right. In some embodiments, when the user's adjustment of the saturation of the image hits a limit (e.g., upper or lower end of the possible range of the saturation for the image) the arrow in the direction of the user's figure will fade away or disappear. For instance, if the user even further adjusts the saturation of the image 355 by dragging the user's finger further upward from the position of the finger shown in this stage 2120, the arrow 2035 will fade away or disappear. Also, the knob of the corresponding saturation UI control 352 will hit the right end and will not move further to the right. In some embodiments, the fading away or disappearing of the arrow for hitting a limit is applicable to other types of color adjustment described in this application.

Figure 22:
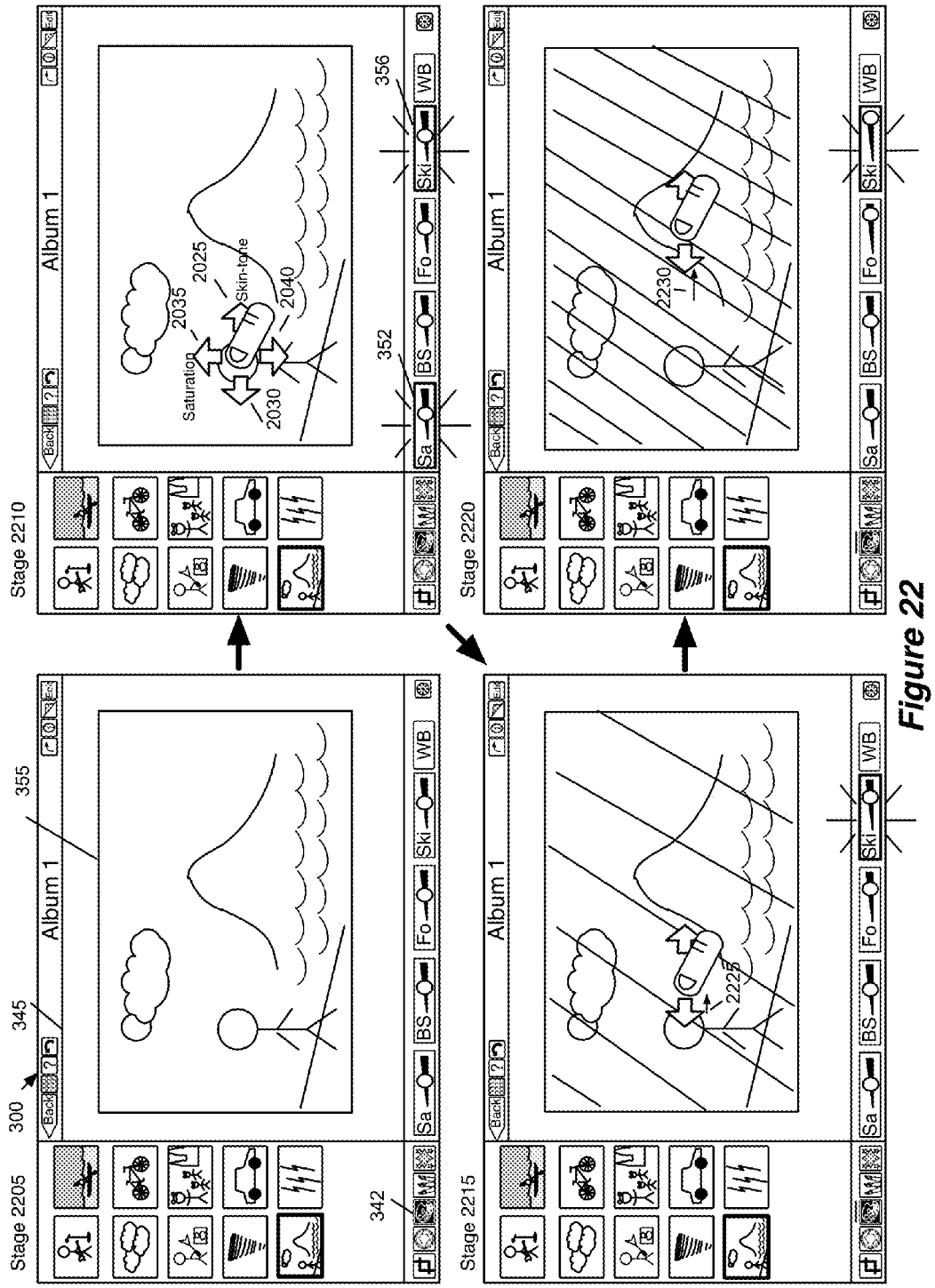
FIG. 22 illustrates an example of adjusting the color temperature of an image based on the skin-tone colors of the image through the GUI of an image editing application of some embodiments.

FIG. 21 illustrates an example operation of manipulating a set of on-image UI controls for adjusting the saturation for the entire image. FIG. 22 illustrates an example operation of manipulating a set of on-image UI controls for adjusting the color temperature of an image. A color temperature is a characteristics of visible light that reflects off of the objects in the image. A warmer light that is hitting the objects in the image creates a warmer color tone (i.e., more red and yellow) to the colors of the objects in the image while a cooler light that is hitting the objects in the image creates a cooler color tone (i.e., more blue and cyan) to the colors of the objects in the image. Thus, adjusting the color temperature of an image means adding more red/yellow or adding more cyan/blue to the image. Specifically, FIG. 22 illustrates the color adjustment operation at four different stages 2205, 2210, 2215, and 2220.

The first stage 2205 is identical to the first stage 2005 of FIG. 20. As shown, the user has selected the selectable UI item 342 for adjusting colors of the image 355. The second stage 2210 illustrates the GUI 300 after the user has selected a location on the image 355. The selection of the location on the image 355 may be performed by performing a gesture (e.g., placing, pointing, or tapping a finger) at a location on a device having a touch or near touch sensitive screen that displays the image, or by placing a cursor at the location of the image and providing an input (e.g., clicking on the cursor controlling device, pressing a hot key, etc.). As shown, the user has selected a location on the image 355 that shows a person's face by tapping a finger at the location. As a result of the selection, a set of on-image UI controls 2025-2040 is displayed around the selected location on the image. The set of on-image UI controls includes a set of on-image UI controls 2035 and 2040 that corresponds to the saturation UI control 352 for adjusting the saturation for the entire image and a set of on-image UI controls 2025 and 2030 that corresponds to the skin-tone UI control 356 for adjusting skin-tone colors of the image. The second stage 2210 also shows that the corresponding saturation UI control 352 and the skin-tone UI control 356 are highlighted to indicate that these two UI controls are activated.

The third stage 2215 illustrates the GUI 300 after the user has begun adjusting the color temperature of the image 355 by providing a directional input on the image 355. The directional input can be provided by dragging the user's finger on a device having a touch or near touch sensitive screen or dragging a cursor in a direction. In this example, the user provides a directional input by dragging the user's finger to the right, as indicated by the arrow 2225. The application associates the directional input with the on-image UI control 2025 for improving the skin-tone colors in the image and performs the color temperature adjustment to the image 355. As shown, the color temperature of the image 355 has been increased, as indicated by the diagonal lines across the image 355. In some embodiments, the application adjusts the color temperature of the image in order to make the skin-tone colors more pleasing. In some of these embodiments, the application uses the same defined range of skin-tone colors that was described above by reference to FIG. 5, and adjusts the color values of the image to make colors in the image that fall within the defined range of skin-tone colors more pleasing.

The third stage 2215 also illustrates that once the application associates the directional input with one set of the on-image UI controls, the inactivated on-image UI controls 2035 and 2040 are removed from display and the corresponding saturation UI control 352 is no longer highlighted. The third stage 2215 also illustrates that the knob of the corresponding skin-tone UI control 356 has moved to the right.

Additionally, the GUI 300 also displays a bar on top of the selectable UI item 342 when a color adjustment has been performed on the image. The bar on top of the selectable UI item 342 will remain visible to indicate what type of adjustments the user has performed on the image. As shown, a bar has appeared on top of the selectable UI item 342 at the third stage 2215 after the user has made skin-tone adjustments to the image 355.

The fourth stage 2220 illustrates the GUI 300 after the user has further adjusted the color temperature of the image 355 by dragging the user's finger further to the right, as indicated by the arrow 2230. As shown, the image 355 in this stage 2220 is shown to be even more adjusted than the image in the third stage 2215, as indicated by the higher density of the diagonal lines across the image 355. The fourth stage 2220 also illustrates that the knob of the corresponding skin-tone UI control 356 has moved further to the right.

Figure 23:
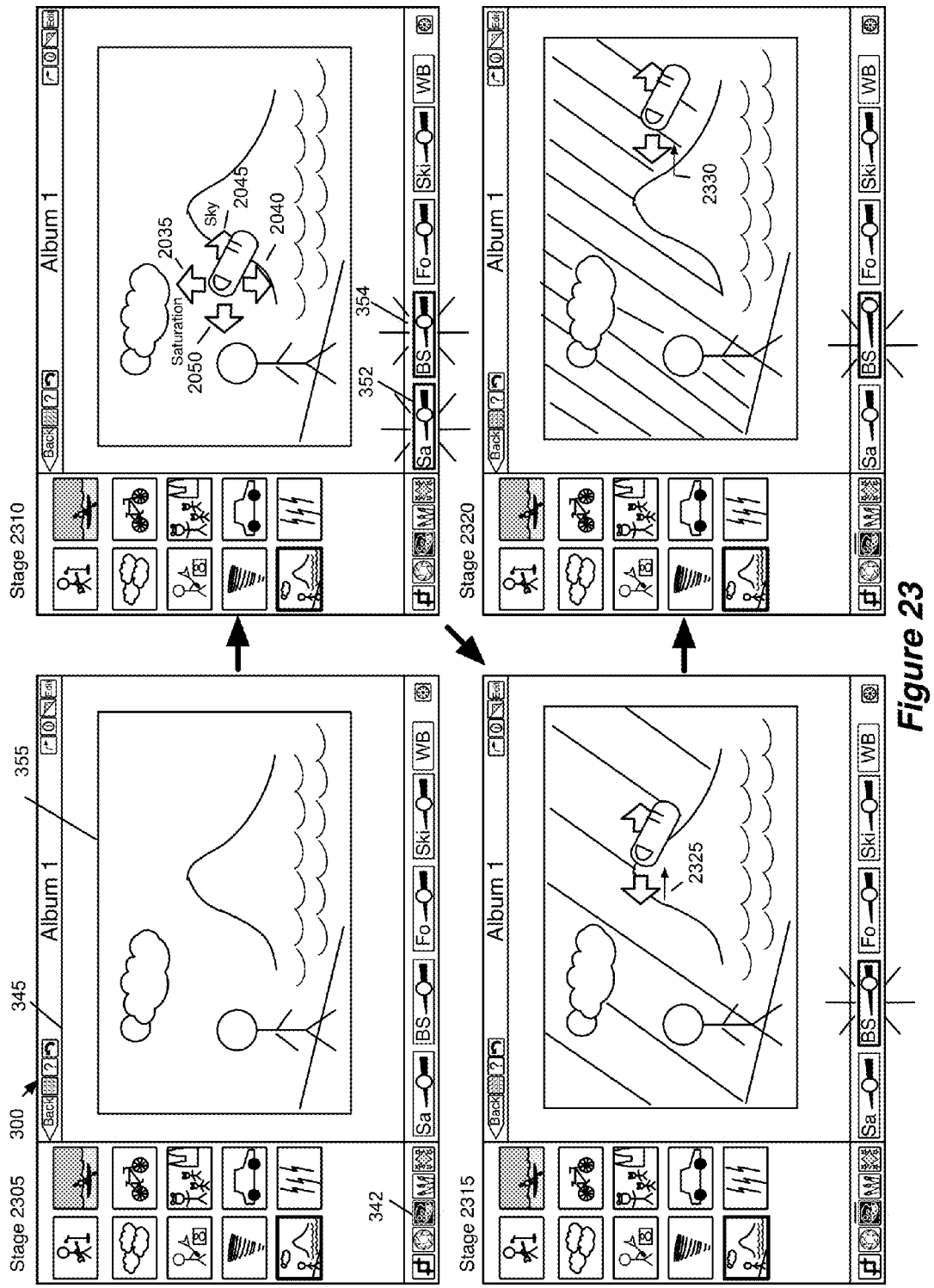
FIG. 23 illustrates an example of adjusting only a portion of the image that represents a sky through the GUI of an image editing application of some embodiments.

FIG. 22 illustrates an example operation of manipulating a set of on-image UI controls for adjusting color temperature for the image. FIG. 23 illustrates an example operation of manipulating a set of on-image UI controls for adjusting sky colors in an image. Specifically, FIG. 23 illustrates the color adjustment operation at four different stages 2305, 2310, 2315, and 2320.

The first stage 2305 is identical to the first stage 2205 of FIG. 22. As shown, the user has selected the selectable UI item 342 for adjusting colors of the image 355. The second stage 2310 illustrates the GUI 300 after the user has selected a location on the image 355. The selection of the location on the image 355 may be performed by performing a gesture (e.g., placing, pointing, or tapping a finger) at a location on a device having a touch or near touch sensitive screen that displays the image, or by placing a cursor at the location of the image and providing an input (e.g., clicking on the cursor controlling device, pressing a hot key, etc.). As shown, the user has selected a location on the image 355 that shows the sky by tapping a finger at the location. As a result of the selection, a set of on-image UI controls 2035-2050 is displayed around the selected location on the image. The set of on-image UI controls includes a set of on-image UI controls 2035 and 2040 that corresponds to the saturation UI control 352 for adjusting the saturation for the entire image and a set of on-image UI controls 2045 and 2050 that corresponds to the sky UI control 354 for adjusting sky colors of the image. The second stage 2310 also shows that the corresponding saturation UI control 352 and the sky UI control 354 are highlighted to indicate that these two UI controls are activated.

The third stage 2315 illustrates the GUI 300 after the user has begun adjusting the sky colors of the image 355 by providing a directional input on the image 355. The directional input can be provided by dragging the user's finger on a device having a touch or near touch sensitive screen or dragging a cursor in a direction. In this example, the user provides a directional input by dragging the user's finger to the right, as indicated by the arrow 2325. The application associates the directional input with the on-image UI control 2045 for adjusting the sky colors in the image and performs the sky color adjustment to the image 355. As shown, the sky colors in the image 355 has been enhanced, as indicated by the diagonal lines across the area showing the sky in the image 355. The third stage 2315 also illustrates that once the application associates the directional input with one set of the on-image UI controls, the inactivated on-image UI controls 2035 and 2040 are removed from display and the corresponding saturation UI control 352 is no longer highlighted. The third stage 2315 also illustrates that the knob of the corresponding sky UI control 354 has moved to the right.

Additionally, the GUI 300 also displays a bar on top of the selectable UI item 342 when a color adjustment has been performed on the image. The bar on top of the selectable UI item 342 will remain visible to indicate what type of adjustments the user has performed on the image. As shown, a bar has appeared on top of the selectable UI item 342 at the third stage 2315 after the user has made sky adjustments to the image 355.

The fourth stage 2320 illustrates the GUI 300 after the user has further adjusted the sky colors of the image 355 by dragging the user's finger further to the right, as indicated by the arrow 2330. As shown, the sky colors in the image 355 in this stage 2320 are shown to be even more enhanced than the sky colors in the image in the third stage 2315, as indicated by the higher density of the diagonal lines across the area showing the sky in the image 355. The fourth stage 2320 also illustrates that the knob of the corresponding sky UI control 354 has moved further to the right.

Figure 24:
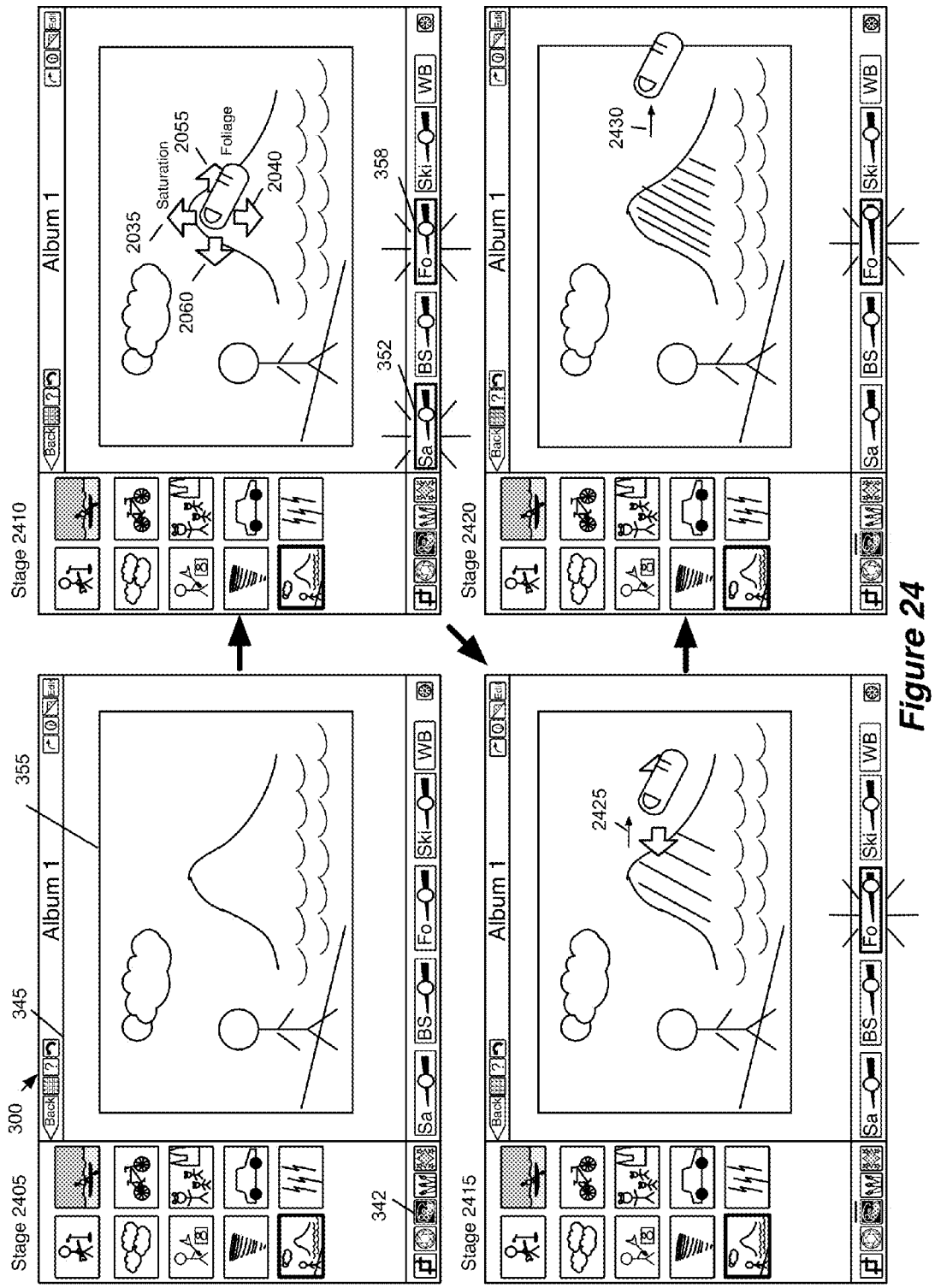
FIG. 24 illustrates an example of adjusting only a portion of the image that represents foliage through the GUI of an image editing application of some embodiments.

FIG. 23 illustrates an example operation of manipulating a set of on-image UI controls for adjusting sky colors for the image. FIG. 24 illustrates an example operation of manipulating a set of on-image UI controls for adjusting foliage colors in an image. Specifically, FIG. 24 illustrates the color adjustment operation at four different stages 2405, 2410, 2415, and 2420.

The first stage 2405 is identical to the first stage 2305 of FIG. 23. As shown, the user has selected the selectable UI item 342 for adjusting colors of the image 355. The second stage 2410 illustrates the GUI 300 after the user has selected a location on the image 355. The selection of the location on the image 355 may be performed by performing a gesture (e.g., placing, pointing, or tapping a finger) at a location on a device having a touch or near touch sensitive screen that displays the image, or by placing a cursor at the location of the image and providing an input (e.g., clicking on the cursor controlling device, pressing a hot key, etc.). As shown, the user has selected a location on the image 355 that shows the mountain by tapping a finger at the location. As a result of the selection, a set of on-image UI controls 2035, 2040, 2055, and 2060 are displayed around the selected location on the image. The set of on-image UI controls includes a set of on-image UI controls 2035 and 2040 that corresponds to the saturation UI control 352 for adjusting the saturation for the entire image and a set of on-image UI controls 2055 and 2060 that corresponds to the foliage UI control 358 for adjusting foliage colors of the image. The second stage 2410 also shows that the corresponding saturation UI control 352 and the foliage UI control 358 are highlighted to indicate that these two UI controls are activated.

The third stage 2415 illustrates the GUI 300 after the user has begun adjusting the foliage colors of the image 355 by providing a directional input on the image 355. The directional input can be provided by dragging the user's finger on a device having a touch or near touch sensitive screen or dragging a cursor in a direction. In this example, the user provides a directional input by dragging the user's finger to the right, as indicated by the arrow 2425. The application associates the directional input with the on-image UI control 2055 for adjusting the foliage colors in the image and performs the foliage color adjustment to the image 355. As shown, the foliage colors in the image 355 has been enhanced, as indicated by the diagonal lines across the area showing the mountain in the image 355. The third stage 2415 also illustrates that once the application associates the directional input with one set of the on-image UI controls, the inactivated on-image UI controls 2035 and 2040 are removed from display and the corresponding saturation UI control 352 is no longer highlighted.

Additionally, the GUI 300 also displays a bar on top of the selectable UI item 342 when a color adjustment has been performed on the image. The bar on top of the selectable UI item 342 will remain visible to indicate what type of adjustments the user has performed on the image. As shown, a bar has appeared on top of the selectable UI item 342 at the third stage 2415 after the user has made foliage adjustments to the image 355.

The fourth stage 2420 illustrates the GUI 300 after the user has further adjusted the foliage colors of the image 355 by dragging the user's finger further to the right, as indicated by the arrow 2430. As shown, the foliage colors in the image 355 in this stage 2420 are shown to be even more enhanced than the foliage colors in the image in the third stage 2415, as indicated by the higher density of the diagonal lines across the area showing the mountain in the image 355.

In some embodiments, after the user has begun to provide a directional input that is associated with a set of on-image UI controls, the set of on-image UI controls will always begin to fade away until it disappears entirely from the image. The fourth stage 2420 shows that the on-image UI controls 2055 and 2060 have faded away after the user has moved the finger further to the right.

Figure 25:
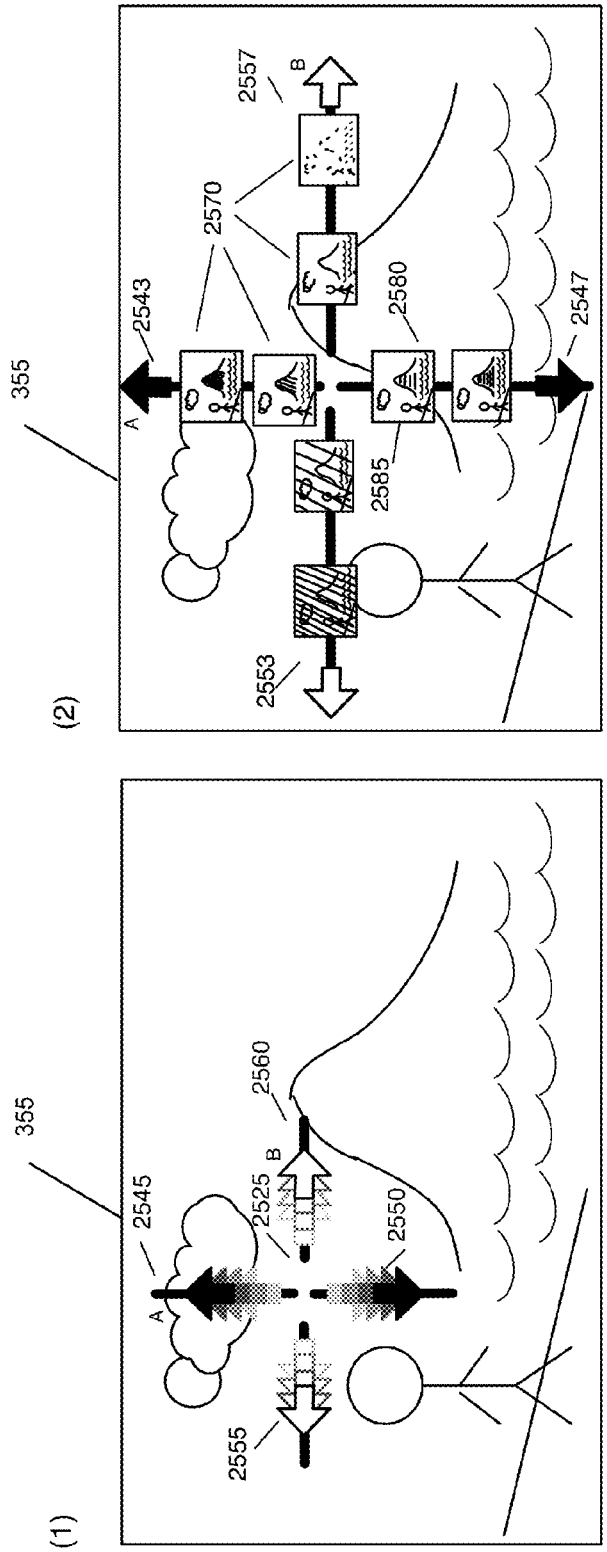
FIG. 25 illustrates two example implementations of on-image UI controls.

Although the set of overlaid UI controls 2025-2060 is displayed as four arrows on the image 355 in the above examples illustrated in FIGS. 20, 21, 22, 23, and 24, the set of overlaid UI controls may have different appearances in other embodiments. FIG. 25 illustrates two other examples for the overlaid UI controls. As shown in the first example, the set of overlaid UI controls 2545, 2550, 2555, and 2560 includes a set of arms that extends from a location 2525 on the image 355 selected by a user. Each overlaid UI control also includes an animated directional arrow that traverses within the arm in the direction indicated by the arrow. In addition, each overlaid UI controls is displayed in a color that represents the adjustment operations that corresponds to the overlaid UI control. Overlaid UI controls 2545 and 2550 are displayed in one color (e.g., in black) while overlaid UI controls 2555 and 2560 are displayed in another color (e.g., in white) since these two sets of overlaid UI controls are for initiating different adjustments. The second example illustrates a second alternative appearance for the overlaid UI controls. Specifically, Example (2) illustrates a set of overlaid UI controls 2543, 2547, 2553, and 2557 that provides thumbnail previews for the user. As shown, a set of thumbnails 2570 is displayed on each of the overlaid UI control. The thumbnail provides a preview of the image 355 corresponding to the edits that would be applied based on the location of the thumbnail on the overlaid UI control. For example, the thumbnail 2585 provides a preview of how the image 355 would look like if the user provides a directional input based on the location 2580.

Figure 26:
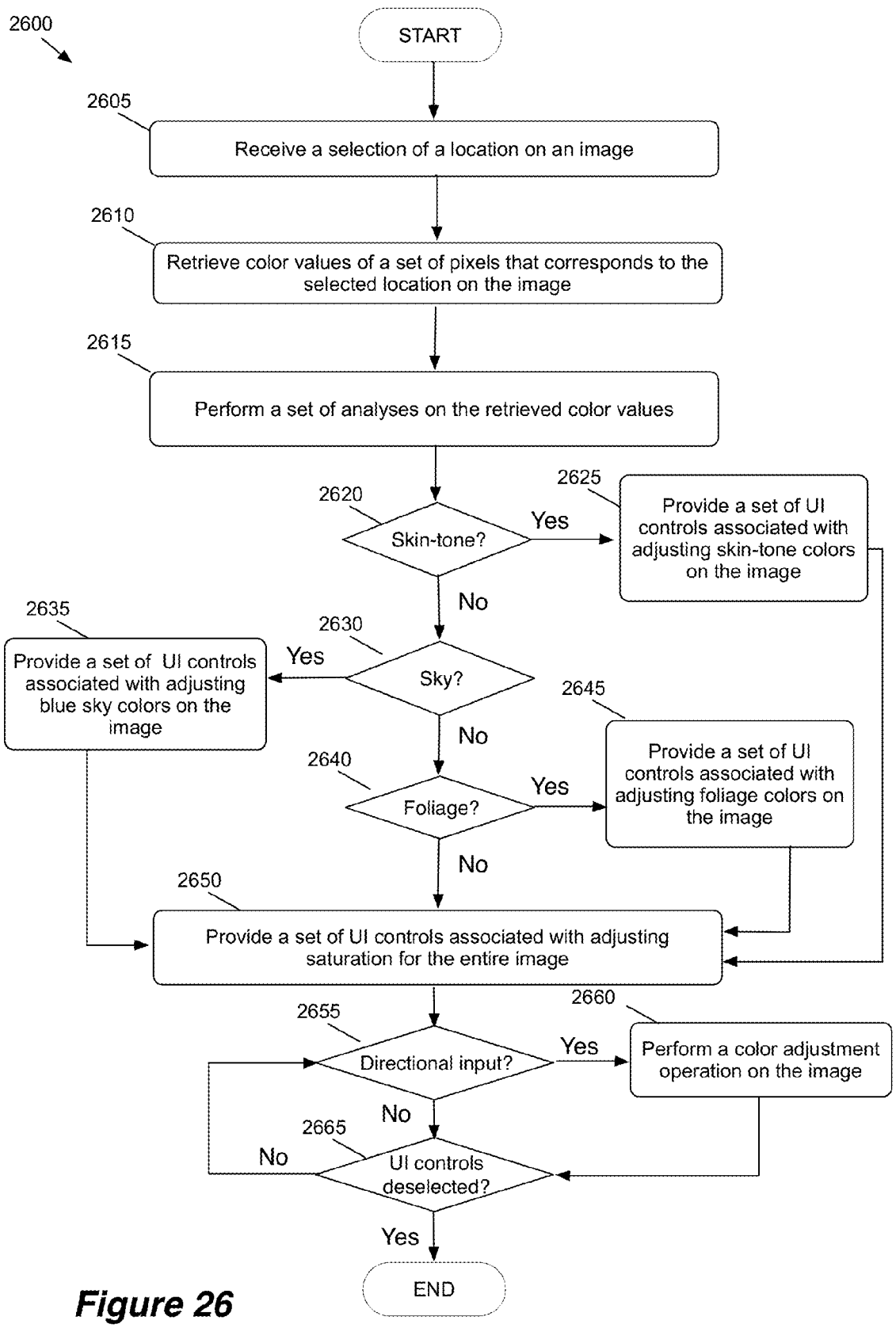
FIG. 26 conceptually illustrates a process of some embodiments for providing different color adjustment UI controls based on different location selected on an image.

FIG. 26 conceptually illustrates a process 2600 for providing a set of on-image UI controls for adjusting the saturation, skin-tone colors, sky colors, and foliage colors in an image based on a user selection of a location on the image. In some embodiments, the process is performed by an image editing application. The first three operations 2605, 2610, and 2615 are identical to the first three operations 1905, 1910, and 1915 of process 1900 in FIG. 19. The process begins by receiving (at 2605) a selection of a location on an image. The process then retrieves (at 2610) color values of a set of pixels that corresponds to the selected location on the image. In some embodiments, the set of pixels are pixels that are located in proximity of the selected location.

Next, the process performs (at 2615) a set of analyses on the retrieved color values. In some embodiments, each analysis determines whether the selected location is associated with a particular type of content based on the retrieved color values. For example, the set of analyses includes an analysis for determining whether the selected location is associated with skin-tone colors, an analysis for determining whether the selected location is associated with sky colors, and an analysis for determining whether the selected location is associated with foliage colors.

The process determines (at 2620) whether the selected location is associated with skin-tone colors based on the results from the set of analyses. If the selected location is associated with skin-tone colors, the process provides (at 2625) a set of UI controls for adjusting skin-tone colors in the image. In some embodiments, the set of UI controls for adjusting skin-tone colors are displayed around the selected location on the image.

The process determines (at 2630) whether the selected location is associated with sky colors based on the results from the set of analyses. If the selected location is associated with sky colors, the process provides (at 2635) a set of UI controls for adjusting sky colors in the image. In some embodiments, the set of UI controls for adjusting sky colors are displayed around the selected location on the image.

The process determines (at 2640) whether the selected location is associated with foliage colors based on the results from the set of analyses. If the selected location is associated with foliage colors, the process provides (at 2645) a set of UI controls for adjusting foliage colors in the image. In some embodiments, the set of UI controls for adjusting foliage colors are displayed around the selected location on the image.

Next, the process provides (at 2650) a set of UI controls for adjusting the saturation for the entire image. In some embodiments, the process always provides this set of UI controls for adjusting the saturation for the entire image independent of the location on the image selected by the user.

The process then determines (at 2655) whether a directional input is received. If a directional input is received, the process performs (at 2660) a color adjustment operation to the image based on the directional input. The process then determines (at 2665) if the on-image UI controls are deselected. In some embodiments, the set of on-image UI controls can be deselected by lifting the finger from the device having a touch or near touch sensitive screen (or releasing a button).

If the process determines (at 2655) that there is no directional input received, the process also proceeds to operation 2665 to determine if the on-image UI controls are deselected. If the set of on-image UI controls is not deselected, the process returns to 2655 to determine if a directional input is received. On the other hand, if the set of on-image UI controls is deselected, the process ends.

Figure 27:
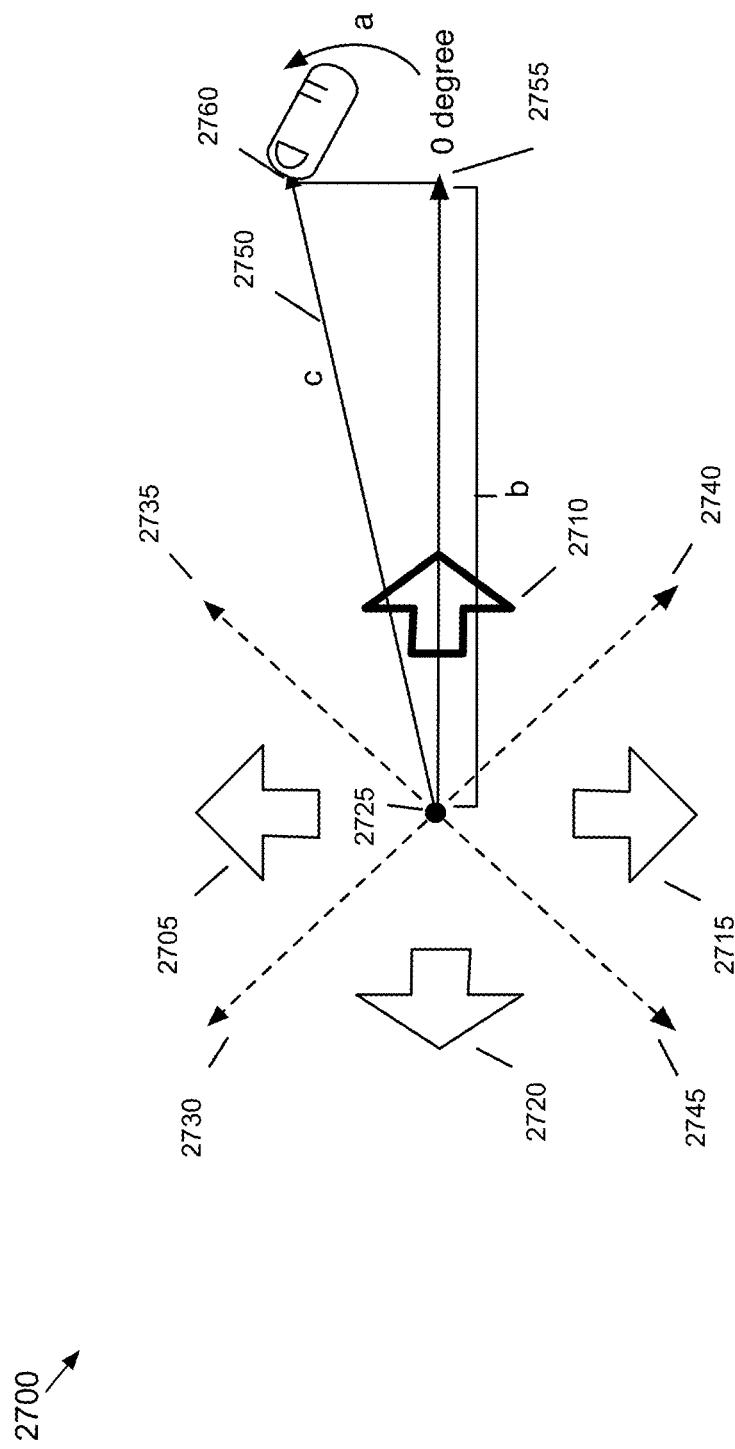
FIG. 27 conceptually an example of identifying a direction and magnitude of a directional input.

In some embodiments, the set of UI controls that is displayed on the image are direction dependent UI controls. In these embodiments, the user can activate one of the color adjustment operations on the image by providing a directional input (i.e., a vector) on the image. The directional input is a vector that includes a direction and a magnitude. FIG. 27 illustrates a set of example direction dependent UI controls 2700 that may be displayed after a user selects a location 2725 in an image. The set of UI controls 2700 includes UI controls 2705-2720. Each UI control corresponds to a different general direction. For example, UI control 2705 corresponds to a general upward direction along a vertical axis of the image (i.e. between direction 2730 and direction 2735), UI control 2710 corresponds to a general direction to the right along a horizontal axis of the image (i.e. between direction 2735 and direction 2740), UI control 2715 corresponds to a general downward direction along the vertical axis of the image (i.e. between direction 2740 and direction 2745), and UI control 2720 corresponds to a general direction to the left along the horizontal direction of the image (i.e. between direction 2745 and direction 2730). When a user provides a directional input, such as vector 2750, the application determines if the direction of the vector 2750 falls within the general direction of a particular UI control. In some embodiments, the vector 2750 is created by a movement of a finger on a device having a touch or near touch sensitive screen or a cursor movement from the selected location 2725 to a new location 2760. In some embodiments, the vector 2750 is determined to be a straight line "c" from the selected location 2725 to the new location 2760.

In some embodiments, the direction of a vector can be expressed as an angle with respect to an axis. For instance, the application of some embodiments may choose to use the direction 2755 along the horizontal axis as 0 degree. In these embodiments, each direction can be expressed in terms of an angle going counter-clockwise from the 0 degree direction 2755. For instance, the direction of the directional input 2750 can be expressed as angle "a". In these embodiments, a directional input is associated with UI control 2705 if the angle of the directional input is between direction 2735 (45 degrees) and direction 2730 (135 degrees). Similarly, a directional input is associated with UI control 2720 if the angle of the directional input is between direction 2730 (135 degrees) and direction 2745 (225 degrees), a directional input is associated with UI control 2715 if the angle of the directional input is between direction 2730 (225 degrees) and direction 2745 (315 degrees), and a directional input is associated with UI control 2710 if the angle of the directional input is between direction 2740 (315 degrees) and direction 2735 (45 degrees). Thus, a directional input with a direction at 30 degrees is associated with UI control 2710 and another directional input with a direction at 70 degrees is associated with UI control 2705. In this example, since the angle of the directional input 2750 (i.e., angle "a") is between 315 degrees and 45 degrees, the application associates the directional input 2750 with UI control 2710, as indicated by the highlighting of the UI control 2710.

In some embodiments, each color adjustment operation is associated with a range of adjustment values for applying to the image. That is, a larger adjustment value indicates applying a larger extent (or degree) of the color adjustment operation to the image and a smaller adjustment value indicates applying a smaller extent (or degree) of the color adjustment operation to the image. In these embodiments, the application determines an adjustment value for the color adjustment operation based on a magnitude of the directional input. Different embodiments use different techniques to compute the magnitude of the directional input. In some embodiments, the application determines the magnitude of the directional input 2750 as the distance "c" of the vector from the selected location 2725 to the new location 2760. In other embodiments, each direction dependent UI control has a corresponding axis. For instance, the UI control 2710 corresponds to an axis 2755. In these embodiments, the application determines the magnitude of the directional input 2750 as the distance "b", which is a distance covered by the vector 2750 along the corresponding axis 2755 of the UI control 2710. In either case, the computed magnitude is used to determine the adjustment value for applying the color adjustment operation to the image.

Although the set of direction dependent UI controls 2700 illustrated in FIG. 27 only includes four direction dependent UI controls, it should be apparent to one of ordinary skill in the art that some embodiments provide more than or less than four direction dependent UI controls on the image for providing different adjustments to the image.

Figure 28:
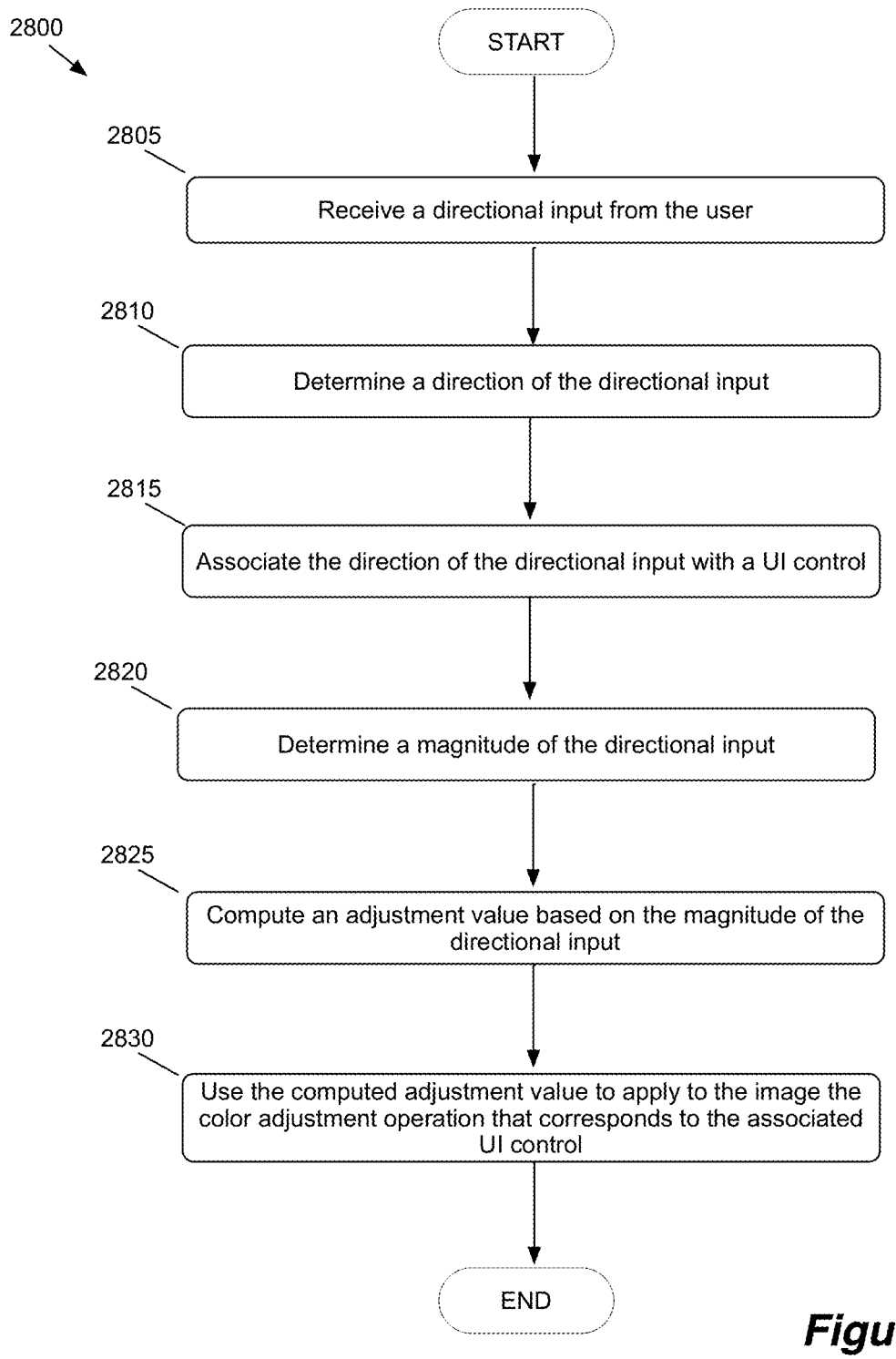
FIG. 28 conceptually illustrates a process of some embodiments for determining a specific color adjustment based on a directional input.

FIG. 28 conceptually illustrates a process 2800 for receiving a directional input from a user and applying a corresponding color adjustment operation to the image based on the direction and magnitude of the input. In some embodiments, the application performs the process 2800 after the application has received a selection of a location on the image and provided a set of corresponding UI controls on the image.

The process begins by receiving (at 2805) a directional input on the image. In some embodiments, the directional input includes a direction and a magnitude. The process then determines (at 2810) a direction of the directional input. In some embodiments, the operation of determining a direction of the directional input involves determining an angle of the directional input with respect to an axis of the image.

After determining the direction of the directional input, the process associates (at 2815) the direction with a UI control. In some embodiments, the process uses the techniques illustrated above by reference to FIG. 27 to associate a direction with a particular UI control. In these embodiments, the process assigns different ranges of directions to different UI controls. The process then determines if the direction of the input falls within a range associated with a particular UI control.

Next, the process determines (at 2820) a magnitude of the directional input. In some embodiments, the process uses the techniques illustrated above by reference to FIG. 27 to determine a magnitude of the directional input. The process then (at 2825) computes an adjustment value based on the magnitude of the directional input. In some embodiments, a larger magnitude corresponds to a larger adjustment value and a smaller magnitude corresponds to a smaller adjustment value.

Finally, the process uses the computed adjustment value to apply to the image the color adjustment operation that corresponds to the associated UI control. In some embodiments, the process applies the color adjustment to only a portion of the image, based on the UI control that receives the user input. Additionally, the process may apply a full extent of the color adjustment to a set of the image's pixels and apply a lesser extent of the color adjustment to another set of the image's pixels. Then the process ends.

Figure 29:
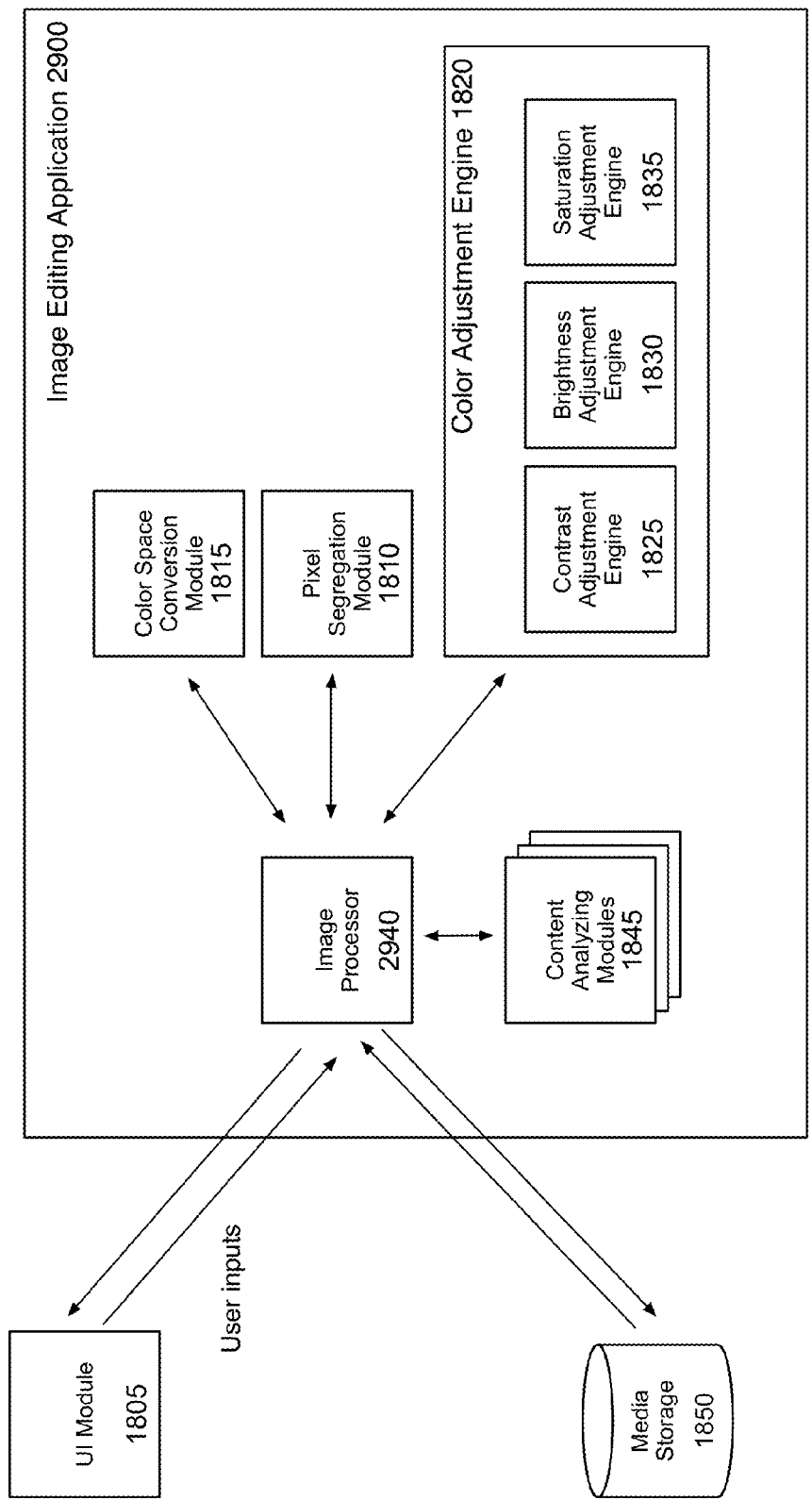
FIG. 29 conceptually illustrates a software architecture of an image editing application of some embodiments.

FIG. 29 illustrates an image editing application 2900 of some embodiments that provides a set of on-image UI controls for editing color values of an image. In some embodiments, the image editing application 2900 performs the processes 1900, 2600, and 2800. The image editing application 2900 includes several components that are identical to the image editing application 1800. For example, the image editing application 2900 includes a set of content analyzing modules 1845, a color space conversion module 1815, a pixel segregation module 1810, and a color adjustment engine 1820. As shown, the image editing application also includes an image processor 2940.

The UI module 1805 receives a user selection of a location on the image and passes information about the selected location to the image processor 2940. Upon receiving the selected location, the image processor 2940 retrieves color values of a set of pixels that corresponds to the selected location on the image, and passes the set of pixels and their color values to the set of content analyzing modules 1845. The set of content analyzing modules 1845 performs a set of different analyses on the color values.

In some embodiments, each content analyzing module 1845 performs a different analysis to determine whether the selected location is associated with a different type of content based on the received color values. For example, a content analyzing module performs an analysis on the color values to determine whether the selected location is associated with skin-tone and another content analyzing module performs another analysis on the color values to determine whether the selected location is associated with a sky. The set of content analyzing modules 1845 then passes the results of the analyses (i.e., a determined particular type of content that is associated with the selected location) to the image processor 2940.

Based on the results of the analyses received from the content analyzing modules 1845, the image processor 2940 selects a set of on-image UI controls for adjusting different color values for display on the image. The image processor 2940 then requests the UI module 1805 to display the selected set of on-image UI controls. When the UI module 1805 receives an input on the image, the UI module 1805 passes the received input back to the image processor 2940. In some embodiments, the received input is a directional input The image processor 2940 associates the directional input with a particular color adjustment operation (e.g., saturation adjustment, vibrancy adjustment, skin-tone adjustment, etc.). The image processor 2940 then requests the pixel segregation module 1810 to identify a set of pixels in the image with color values that fall within a range of color values associated with the particular color adjustment operation. In some embodiments, the color values of the image are defined within a color space (e.g., an RGB color space) that is different from the color space (e.g., a YCC color space) that is used to define the range of color values. In these embodiments, before requesting the pixel segregation module 1810 to identify the set of pixels, the image processor 2940 requests the color space conversion module 1815 to convert the color values of the image to the color space that is used to define the range of color values.

After the set of pixels are identified, the image processor 2940 sends the image and information about the identified pixels to the color adjustment engine 1820 to perform a set of color adjustments on the image. The color adjustment engine 1820 applies different color adjustments to the identified pixels in the image. As shown, the color adjustment engine 1820 includes a contrast adjustment engine 1825 for applying a contrast adjustment to the image, a brightness adjustment engine 1830 for applying a brightness adjustment to the image, and a saturation adjustment engine 1835 for applying a saturation adjustment to the image. It should be apparent to one who is skilled in the art that these are only example color adjustments that can be performed to an image and the color adjustment engine 1820 may include additional color adjustment engines for performing additional types of color adjustments to the image. For example, the brightness adjustment engine 1830 uses the user input to determine a brightness adjustment value for adjusting brightness of the image, the contrast adjustment engine 1825 uses the user input to determine a contrast adjustment value for adjusting contrast of the image, and the saturation adjustment engine 1835 uses the user input to determine a saturation adjustment value for adjusting the saturation of the image. The different adjustment engines 1825-1835 then apply the brightness adjustment, the contrast adjustment, and the saturation adjustment to the image to produce an edited image.

In some embodiments, the color adjustment engine 1820 adjusts the color values of the image in the converted color space. In these embodiments, the image processor 2940 sends the adjusted image to the color space conversion module 1815 to convert the color values of the image back to its original color space. The image processor 2940 then sends the adjusted image to the media storage and to the UI module 1805 for display.

Figure 30:
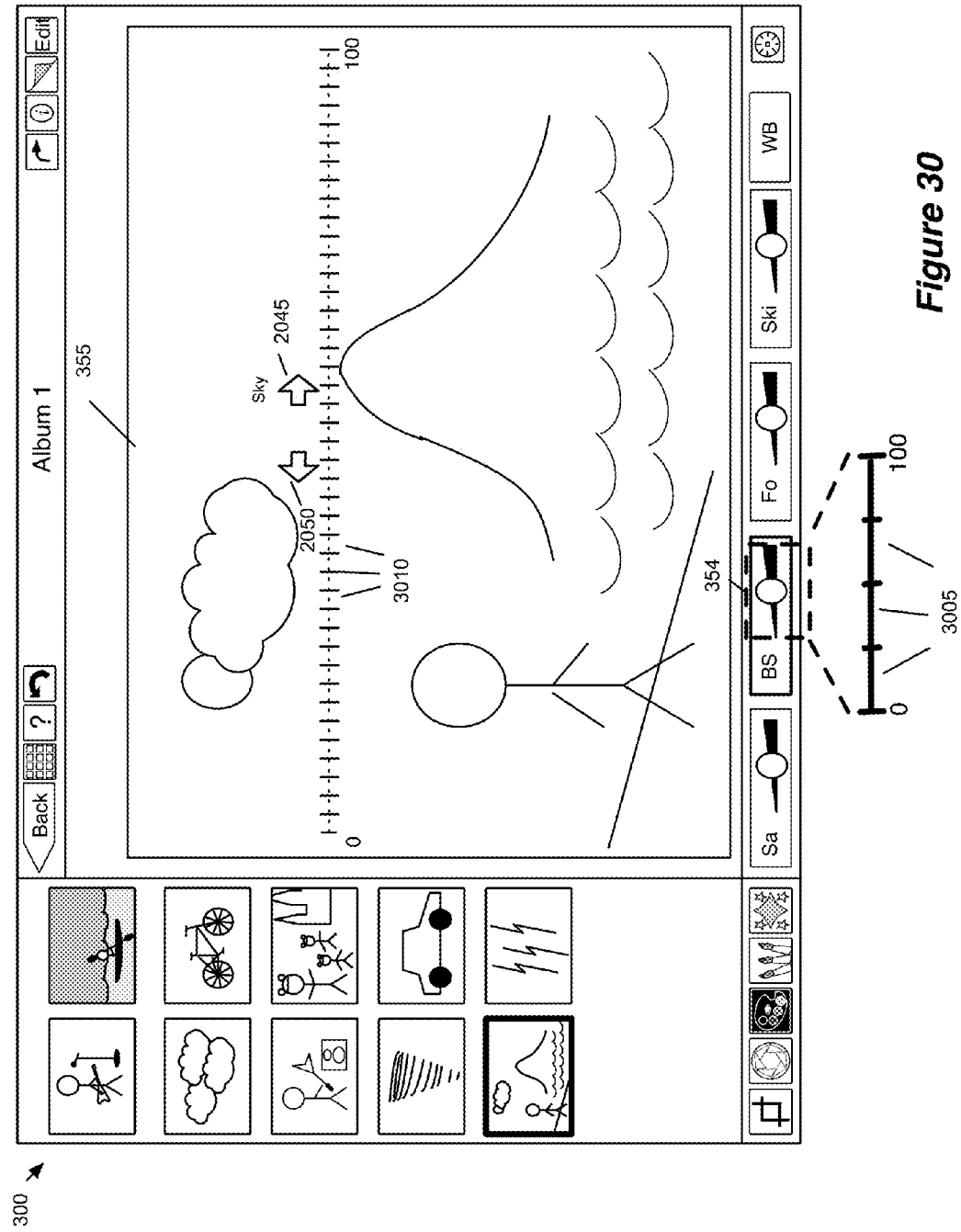
FIG. 30 illustrates a benefit of using the on-image UI controls.

Providing a set of UI controls on the image has many benefits. For instance, the on-image UI controls provide a larger scale with finer granularity for allowing the user to specify an adjustment value within the range of adjustment values than a range slider. FIG. 30 illustrates an example of such a benefit through the GUI 300. As shown in FIG. 30, the sky UI control 354 and the corresponding on-image controls 2045 and 2050 for adjusting sky colors of the image 355 are activated. As mentioned above by reference to FIGS. 7 and 23, the user can adjust the sky colors of the image by either manipulating the sky UI control 354 or providing a directional input on the image using the on-image UI controls 2045 and 2050. In this example, the sky UI control 354 is implemented as a range slider that allows a user to specify an adjustment value between 0-100 by moving the knob along the range slider 354. Since the range slider 354 is limited by its size, every unit 3005 the user moves the knob along the range slider 354 increases or decreases the adjustment value by a large amount (e.g., 25). On the other hand, when a user uses the on-image UI control by providing a directional input on the image, the user may move from the selected location to either end of the image. As such, every unit 3010 the user moves on the image only increases or decreases the adjustment value by a small number (e.g., 2). Thus, the on-image UI controls offer the user a much larger scale with finer granularity for specifying an adjustment value.

B. On-Image Exposure Controls

Figure 31:
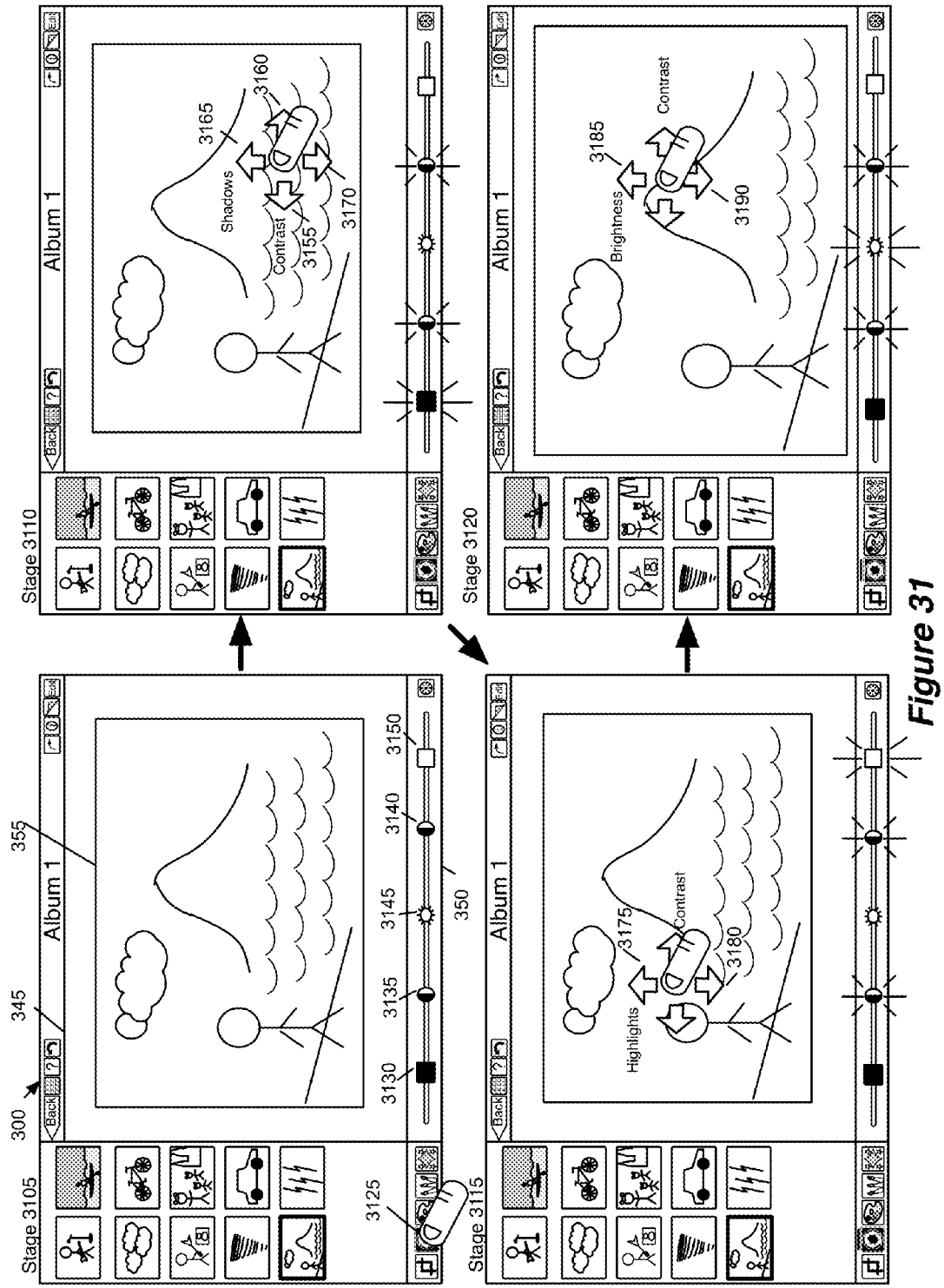
FIG. 31 illustrates an example of providing different on-image UI controls based on different location selected on an image.

FIGS. 20, 21, 22, 23, and 24 in the above section described several examples of on-image UI controls. In those examples, the application allows a user to select a location in the image and provides different sets of on-image UI controls for adjusting colors of an image depending on the type of content that is associated with the selected location. This section provides several additional examples of these on-image UI controls. Specifically, FIG. 31 illustrates an operation of providing different sets of on-image UI controls for adjusting exposure settings of an image depending on the type of content that is associated with the selected location. Specifically, FIG. 31 illustrates the operation of activating different sets of on-image UI controls through the GUI 300 at four different stages 3105, 3110, 3115, and 3120. Each of these stages will be described in more detail below.

The first stage 3105 is similar to the first stage 2005 of FIG. 20, except that the user has selected selectable UI item 3125 for adjusting exposure of the image 355, as indicated by the highlighting of the selectable UI item 3125. The selection of the selectable UI item 3125 may be performed by performing a gesture (e.g., placing, pointing, or tapping a finger) at a location on a device having a touch or near touch sensitive screen that displays the selectable UI item 3125, or by placing a cursor at the selectable UI item 3125 and providing an input (e.g., clicking on the cursor controlling device, pressing a hot key, etc.). As shown in FIG. 31, a set of exposure adjustment UI controls 3130-3150 is displayed in the UI control display area 350. Different embodiments provide different types of UI controls for adjusting colors of an image. In this example, the exposure adjustment UI control is a unified slider control, which includes multiple control knobs 3130-3150 that can slide along a sliding track.

In some embodiments, the unified slider control is used in a media editing application to allow a user to modify several different properties (e.g., brightness, contrast, etc.) of the image by moving several different control knobs along the sliding track. Each knob (3130-3150) on the multi-slider corresponds to a different adjustment operation that can be performed on the image. The UI control 3130 (knob 3130) is for adjusting the shadows of the image, the UI controls 3135 and 3140 (knobs 3135 and 3140) are for adjusting the contrast of the image, the UI control 3145 (knob 3145) is for adjusting the brightness of the image, and the UI control 3150 (knob 3150) is for adjusting the highlights of the image. A user can initiate different color adjustments to the image by selecting and moving one of the knobs to a different position along the multi-slider. The various operations of the unified slider control are described in U.S. Provisional Application 61/607, 554.

The second stage 3110 illustrates the GUI 300 after a user has selected a location on the image 355. As shown, the user has selected a location on the image that displays a sea. The selection of the location on the image 355 may be performed by performing a gesture (e.g., placing, pointing, or tapping a finger) at a location on a device having a touch or near touch sensitive screen that displays the image, or by placing a cursor at the location of the image and providing an input (e.g., clicking on the cursor controlling device, pressing a hot key, etc.). As mentioned above, after the user has selected a location on the image, the image editing application of some embodiments performs a set of analyses to determine a particular type of content that is associated with the selected location. Different embodiments use different techniques to determine a type of content that is associated with the selected location. The application of some embodiments first defines different ranges of color values to be associated with different types of contents. For example, the application of some embodiments defines a range of color values to be associated with shadows, a range of color values to be associated with mid-tone, and a range of color values to be associated with highlights. The application then determines whether the color values of a set of pixels that corresponds to the selected location in the image fall within a range of color values associated with a particular type of content, and then displays a set of on-image UI controls that is associated with the particular type of content.

Different embodiments implement the set of on-image UI controls differently. For instance, the application of some embodiments implements the set of on-image UI controls as direction dependent UI controls. In some of these embodiments, the application displays a directional arrow for each UI control in order to guide the user to initiate the color adjustment operation associated with the UI control. The user initiates different color adjustment operations by providing different directional inputs. Based on the direction of the directional input, the application performs a particular color adjustment on the image.

In the second stage 3110, since the user has selected a location on the image that displays the sea that has dark colors (i.e., low luminance values), the application determines that the color values of the pixels that corresponds with the selected location are associated with shadows. As a result, the application displays a set of on-image UI controls 3165 and 3170 (displayed as two directional arrows along the vertical axis) for adjusting shadows in the image. The set of on-image UI controls 3165 and 3170 corresponds to the shadows UI control 3130. In some embodiments, the application also highlights the shadows UI control 3130 to indicate that the shadows UI control 3130 is activated. In addition to the UI controls for adjusting shadows, the application of some embodiments also displays a set of content independent UI controls for adjusting contrast for the image. In these embodiments, the set of content independent UI controls are always displayed independent of the location selected by the user. In this example, the application displays a set of content independent UI controls 3155 and 3160 (displayed as two directional arrows along the horizontal axis) for adjusting contrast for the image. The set of on-image UI controls 3155 and 3160 corresponds to the contrast UI controls 3135 and 3140. In some embodiments, the application also highlights the contrast UI controls 3135 and 3140 to indicate that the contrast UI controls 3135 and 3140 are activated. Although not shown in this figure, the user in this second stage 3110 may exposure adjustment (i.e., contrast adjustment or shadows adjustment) by providing a directional input on the image.

The third stage 3115 illustrates the GUI 300 after a user has selected a different location on the image 355. As shown, the user has selected a location on the image that shows a blue sky that has light colors (i.e., high luminance values). The application determines that the color values of the pixels that correspond to the newly selected location fall within a range of color values that are defined for highlights. As a result, the application displays a set of on-image UI controls 3175 and 3180 (displayed as two directional arrows along the vertical axis) for adjusting highlights of the image. The set of on-image UI controls 3175 and 3180 corresponds to the highlights UI control 3150. As shown, the application also highlights the highlights UI control 3150 to indicate that the highlights UI control 3150 is activated. Similar to the second stage 3110, in addition to the on-image UI controls for adjusting highlights, the application also displays a set of content independent UI controls 3155 and 3160 for adjusting contrast for the image. The application also highlights the contrast UI controls 3135 and 3140 to indicate that the contrast UI controls 3135 and 3140 are activated. Although not shown in this figure, the user in this third stage 3115 may initiate a particular color adjustment (i.e., contrast adjustment or highlight adjustment) by providing a directional input on the image.

The fourth stage 3120 illustrates the GUI 300 after a user has selected a different location on the image 355. As shown, the user has selected a location on the image that shows a mountain that has mid-tone colors (i.e., median luminance values). The application determines that the color values of the pixels that correspond to the newly selected location fall within a range of color values that are defined for mid-tones. As a result, the application displays a set of on-image UI controls 3185 and 3190 (displayed as two directional arrows along the vertical axis) for adjusting brightness of the image. The set of on-image UI controls 3185 and 3190 corresponds to the brightness UI control 3145. As shown, the application also highlights the brightness UI control 3145 to indicate that the brightness UI control 3145 is activated. Similar to the second and third stages 3110 and 3115, in addition to the on-image UI controls for adjusting brightness, the application also displays a set of content independent UI controls 3155 and 3160 for adjusting contrast for the image. The application also highlights the contrast UI controls 3135 and 3140 to indicate that the contrast UI controls 3135 and 3140 are activated. Although not shown in this figure, the user in this fourth stage 3120 may select a particular exposure adjustment (i.e., contrast adjustment or brightness adjustment) by providing a directional input on the image.

Figure 32:
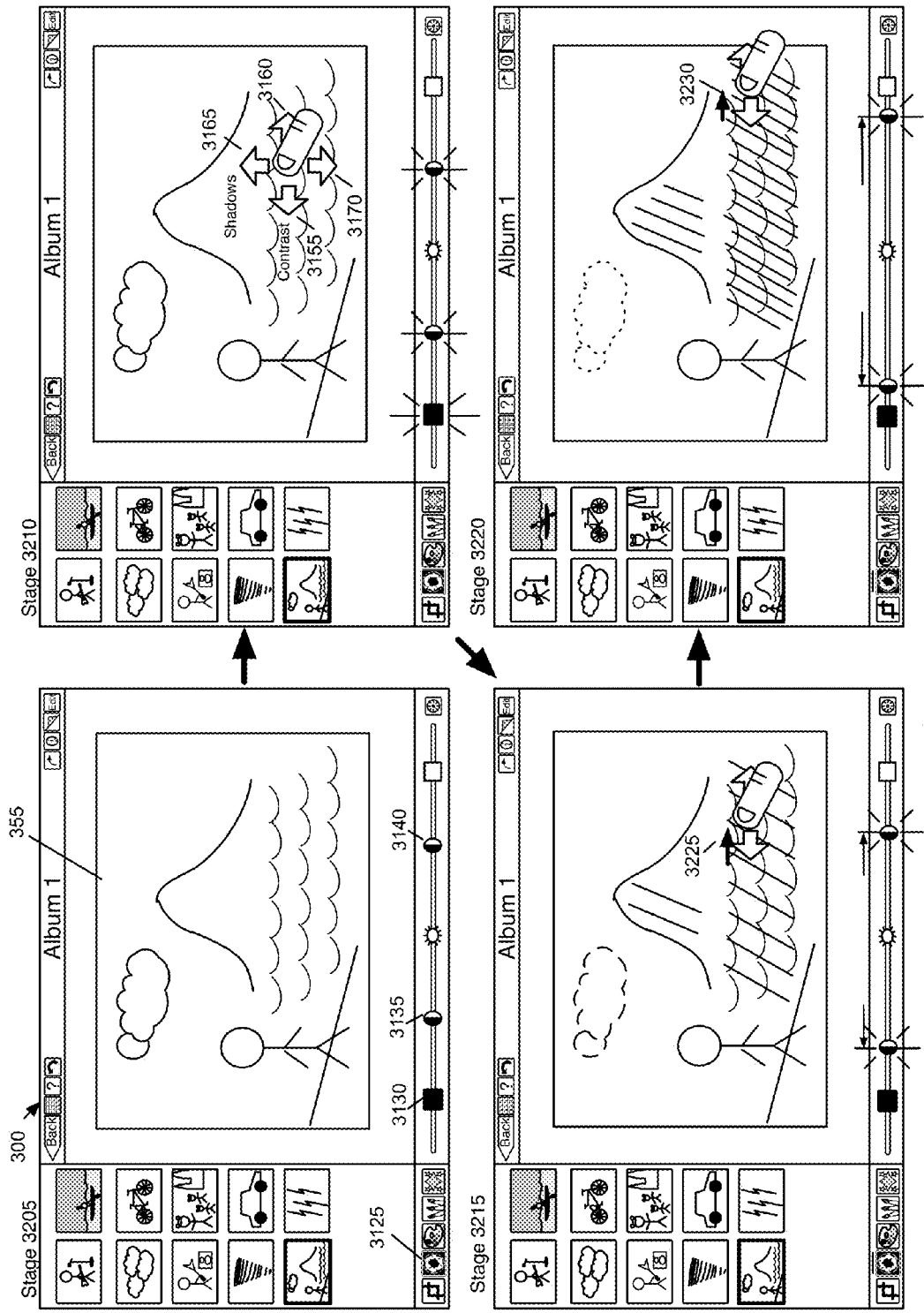
FIG. 32 illustrates an example of adjusting the contrast of an image through the GUI of an image editing application of some embodiments.

FIG. 31 illustrates an example operation of activating different on-image UI controls for performing different exposure adjustments on the image. FIGS. 32, 33, 34, and 35 illustrate examples of manipulating the different on-image UI controls to perform different exposure adjustments on the image. Specifically, FIG. 32 illustrates an example operation of manipulating a set of on-image UI controls for adjusting contrast for the image at four different stages 3205, 3210, 3215, and 3220.

The first stage 3205 is identical to the first stage 3105 of FIG. 31. As shown, the user has selected the selectable UI item 3125 for adjusting exposure settings of the image 355. The second stage 3210 illustrates the GUI 300 after the user has selected a location on the image 355. The selection of the location on the image 355 may be performed by performing a gesture (e.g., placing, pointing, or tapping a finger) at a location on a device having a touch or near touch sensitive screen that displays the image, or by placing a cursor at the location of the image and providing an input (e.g., clicking on the cursor controlling device, pressing a hot key, etc.). As shown, the user has selected a location on the image 355 that shows a sea with dark colors by tapping a finger at the location. As a result of the selection, a set of on-image UI controls 3155-3170 are displayed around the selected location on the image. The set of on-image UI controls includes a set of on-image UI controls 3155 and 3160 that corresponds to the contrast UI controls 3135 and 3140 for adjusting contrast for the image and a set of on-image UI controls 3165 and 3170 that corresponds to the shadows UI control 3130 for adjusting shadows of the image. The second stage 3210 also shows that the corresponding contrast UI controls 3135 and 3140, and the shadows UI control 3130 are highlighted to indicate that these UI controls are activated.

The third stage 3215 illustrates the GUI 300 after the user has begun adjusting contrast of the image 355 by providing a directional input on the image 355. The directional input can be provided by dragging the user's finger on a device having a touch or near touch sensitive screen or dragging a cursor in a direction. In this example, the user provides a directional input by dragging the user's finger to the right of the image 355, as indicated by the arrow 3225. The application associates the directional input with the on-image UI controls 3155 and 3160 for increasing the contrast for the image 355 and performs the contrast adjustment to the image 355. As shown, the contrast of the colors in the image 355 has been increased. The darker areas of the image 355 (e.g., the mountain area and the sea area) are darkened, as indicated by the diagonal lines across those darker areas, and the brighter areas of the image 355 (e.g., the clouds and the sun areas) are brightened, as indicated by the broken lines outlining those brighter areas. The third stage 3215 also illustrates that once the application associates the directional input with one set of the on-image UI controls, the inactivated on-image UI controls 3165 and 3170 are removed from display and the corresponding shadows UI control 3130 is no longer highlighted. The third stage 3215 also illustrates that the corresponding contrast UI controls 3135 and 3140 have moved away from each other.

Additionally, the GUI 300 also displays a bar on top of the selectable UI item 3215 when an exposure adjustment has been performed on the image. The bar on top of the selectable UI item 3215 will remain visible to indicate what type of adjustments the user has performed on the image. As shown, a bar has appeared on top of the selectable UI item 3215 at the third stage 3215 after the user has made contrast adjustments to the image 355.

The fourth stage 3220 illustrates the GUI 300 after the user has further increased the contrast of the image 355 by dragging the user's finger further to the right, as indicated by the arrow 3230. As shown, the colors in the dark areas of the image 355 in this stage 3220 are shown to be even more darkened than the colors in the dark areas of the image in the third stage 3215, as indicated by the higher density of the diagonal lines across the dark areas of the image 355. Similarly, the colors in the bright areas of the image 355 in this stage 3220 are shown to be even more brightened than the colors in the bright areas of the image in the third stage 3215, as indicated by the even more broken lines that outline the bright areas of the image 355. The fourth stages 3320 also illustrates that the corresponding contrast UI controls 3135 and 3140 have moved further away from each other.

Figure 33:
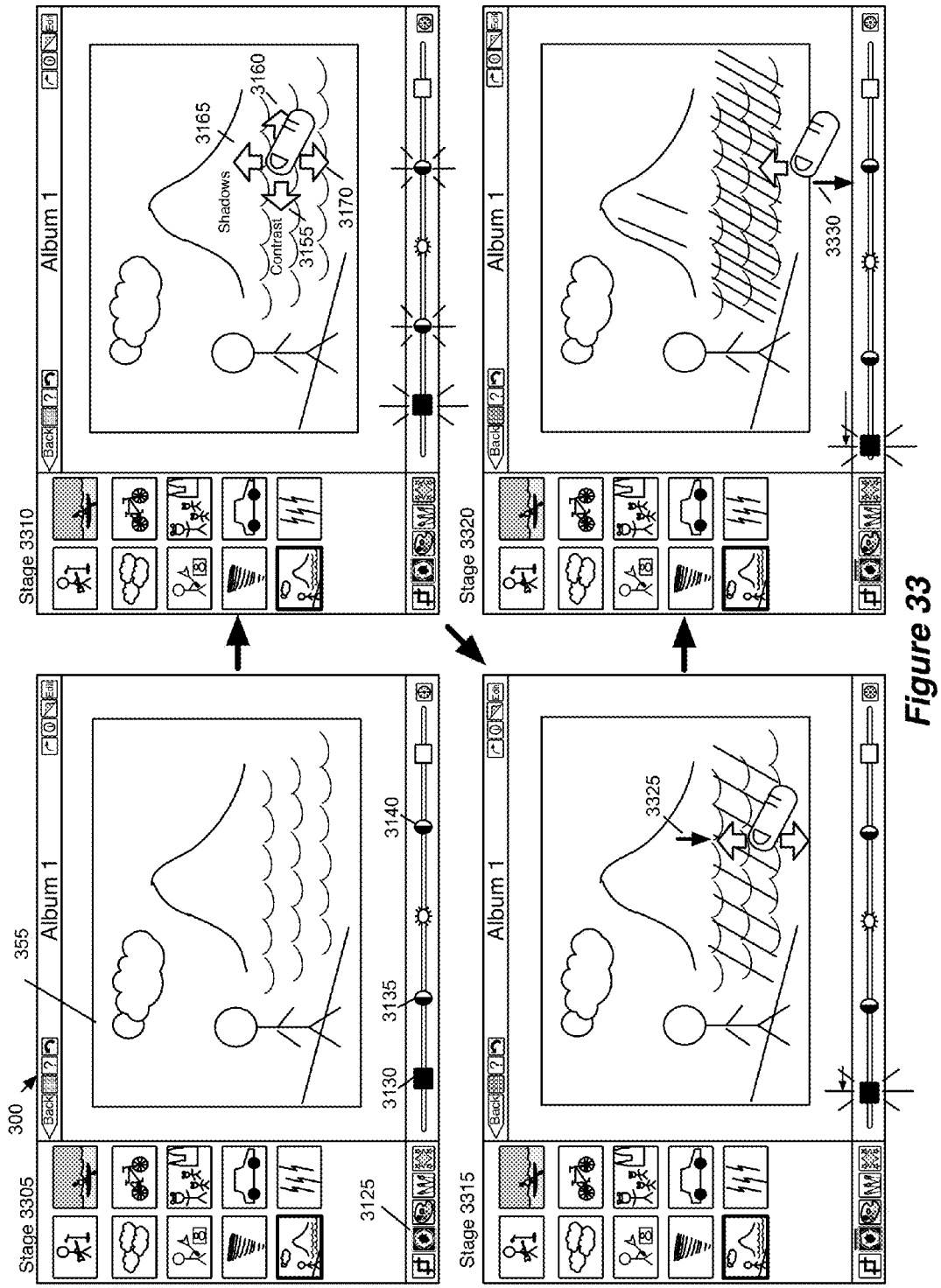
FIG. 33 illustrates an example of adjusting the shadows of an image through the GUI of an image editing application of some embodiments.

FIG. 32 illustrates an example operation of manipulating a set of on-image UI controls for adjusting contrast of an image. FIG. 33 illustrates an example operation of manipulating a set of on-image UI controls for adjusting shadows of an image. Specifically, FIG. 33 illustrates the exposure adjustment operation at four different stages 3305, 3310, 3315, and 3320.

The first stage 3305 is identical to the first stage 3105 of FIG. 31. As shown, the user has selected the selectable UI item 3125 for adjusting exposure settings of the image 355. The second stage 3310 illustrates the GUI 300 after the user has selected a location on the image 355. The selection of the location on the image 355 may be performed by performing a gesture (e.g., placing, pointing, or tapping a finger) at a location on a device having a touch or near touch sensitive screen that displays the image, or by placing a cursor at the location of the image and providing an input (e.g., clicking on the cursor controlling device, pressing a hot key, etc.). As shown, the user has selected a location on the image 355 that shows a sea with dark colors by tapping a finger at the location. As a result of the selection, a set of on-image UI controls 3155-3170 are displayed around the selected location on the image. The set of on-image UI controls includes a set of on-image UI controls 3155 and 3160 that corresponds to the contrast UI controls 3135 and 3140 for adjusting contrast of the image and a set of on-image UI controls 3165 and 3170 that corresponds to the shadows UI control 3130 for adjusting shadows of the image. The second stage 3310 also shows that the corresponding contrast UI controls 3135 and 3140, and the shadows UI control 3130 are highlighted to indicate that these UI controls are activated.

The third stage 3315 illustrates the GUI 300 after the user has begun adjusting the shadows of the image 355 by providing a directional input on the image 355. The directional input can be provided by dragging the user's finger on a device having a touch or near touch sensitive screen or dragging a cursor in a direction. In this example, the user provides a directional input by dragging the user's finger downward, toward the bottom of the image 355, as indicated by the arrow 3325. The application associates the directional input with the on-image UI control 3170 for darkening the shadows in the image and performs the shadows adjustment to the image 355. As shown, the dark areas in the image 355 (e.g., the area that shows the sea) has been darkened, as indicated by the diagonal lines across the area showing the sea in the image 355. The third stage 3315 also illustrates that once the application associates the directional input with one set of the on-image UI controls, the inactivated on-image UI controls 3155 and 3160 are removed from display and the corresponding contrast UI control 3135 and 3140 are no longer highlighted. The third stage 3315 also illustrates that the corresponding shadows UI controls 3130 has moved to the left.

Additionally, the GUI 300 also displays a bar on top of the selectable UI item 3125 when an exposure adjustment has been performed on the image. The bar on top of the selectable UI item 3125 will remain visible to indicate what type of adjustments the user has performed on the image. As shown, a bar has appeared on top of the selectable UI item 3125 at the third stage 3315 after the user has made shadows adjustments to the image 355.

The fourth stage 3320 illustrates the GUI 300 after the user has further adjusted the shadows of the image 355 by dragging the user's finger further downward, as indicated by the arrow 3330. As shown, the dark areas in the image 355 (e.g., the areas that show the sea and the mountain) in this stage 3320 are shown to be even more saturated than the dark areas in the image in the third stage 3315, as indicated by the higher density of the diagonal lines across the dark areas in the image 355. The fourth stages 3320 also illustrates that the corresponding shadows UI controls 3130 has moved further to the left.

Figure 34:
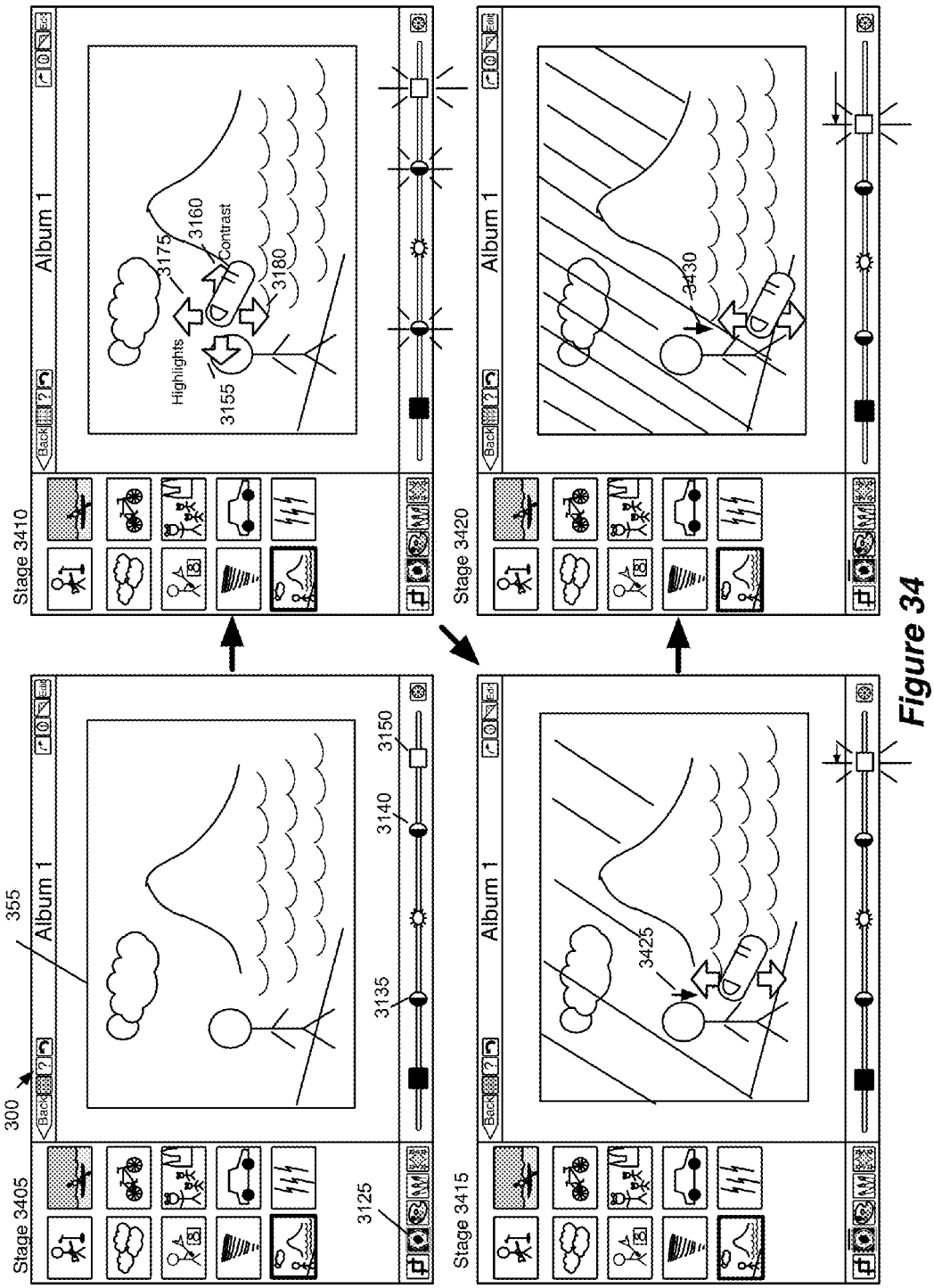
FIG. 34 illustrates an example of adjusting the highlights of an image through the GUI of an image editing application of some embodiments.

FIG. 33 illustrates an example operation of manipulating a set of on-image UI controls for adjusting shadows of an image. FIG. 34 illustrates an example operation of manipulating a set of on-image UI controls for adjusting highlights of an image. Specifically, FIG. 34 illustrates the exposure adjustment operation at four different stages 3405, 3410, 3415, and 3420.

The first stage 3405 is identical to the first stage 3105 of FIG. 31. As shown, the user has selected the selectable UI item 3125 for adjusting exposure settings of the image 355. The second stage 3410 illustrates the GUI 300 after the user has selected a location on the image 355. The selection of the location on the image 355 may be performed by performing a gesture (e.g., placing, pointing, or tapping a finger) at a location on a device having a touch or near touch sensitive screen that displays the image, or by placing a cursor at the location of the image and providing an input (e.g., clicking on the cursor controlling device, pressing a hot key, etc.). As shown, the user has selected a location on the image 355 that shows the sky with light colors by tapping a finger at the location. As a result of the selection, a set of on-image UI controls 3155, 3160, 3175, and 3180 are displayed around the selected location on the image. The set of on-image UI controls includes a set of on-image UI controls 3155 and 3160 that corresponds to the contrast UI controls 3135 and 3140 for adjusting contrast of the image and a set of on-image UI controls 3175 and 3180 that corresponds to the highlights UI control 3150 for adjusting highlights of the image. The second stage 3410 also shows that the corresponding contrast UI controls 3135 and 3140, and the highlights UI control 3150 are highlighted to indicate that these UI controls are activated.

The third stage 3415 illustrates the GUI 300 after the user has begun adjusting the highlights of the image 355 by providing a directional input on the image 355. The directional input can be provided by dragging the user's finger on a device having a touch or near touch sensitive screen or dragging a cursor in a direction. In this example, the user provides a directional input by dragging the user's finger downward, toward the bottom of the image 355, as indicated by the arrow 3425. The application associates the directional input with the on-image UI control 3180 for darkening the highlights in the image and performs the highlights adjustment to the image 355. As shown, the bright areas in the image 355 (e.g., the areas that shows sun and the sky) have been darkened, as indicated by the diagonal lines across the areas showing the sun and the sky in the image 355. The third stage 3415 also illustrates that once the application associates the directional input with one set of the on-image UI controls, the inactivated on-image UI controls 3155 and 3160 are removed from display and the corresponding contrast UI controls 3135 and 3140 are no longer highlighted. The third stage 3415 also illustrates that the corresponding highlights UI controls 3150 has moved to the left.

Additionally, the GUI 300 also displays a bar on top of the selectable UI item 3125 when an exposure adjustment has been performed on the image. The bar on top of the selectable UI item 3125 will remain visible to indicate what type of adjustments the user has performed on the image. As shown, a bar has appeared on top of the selectable UI item 3125 at the third stage 3415 after the user has made highlights adjustments to the image 355.

The fourth stage 3420 illustrates the GUI 300 after the user has further adjusted the highlights of the image 355 by dragging the user's finger further downward, as indicated by the arrow 3430. As shown, the bright areas in the image 355 (e.g., the areas that show the sun and the sky) in this stage 3420 are shown to be even more darkened than the bright areas in the image in the third stage 3415, as indicated by the higher density of the diagonal lines across the bright areas in the image 355. The fourth stage 3420 also illustrates that the corresponding highlights UI controls 3150 has moved further to the left.

Figure 35:
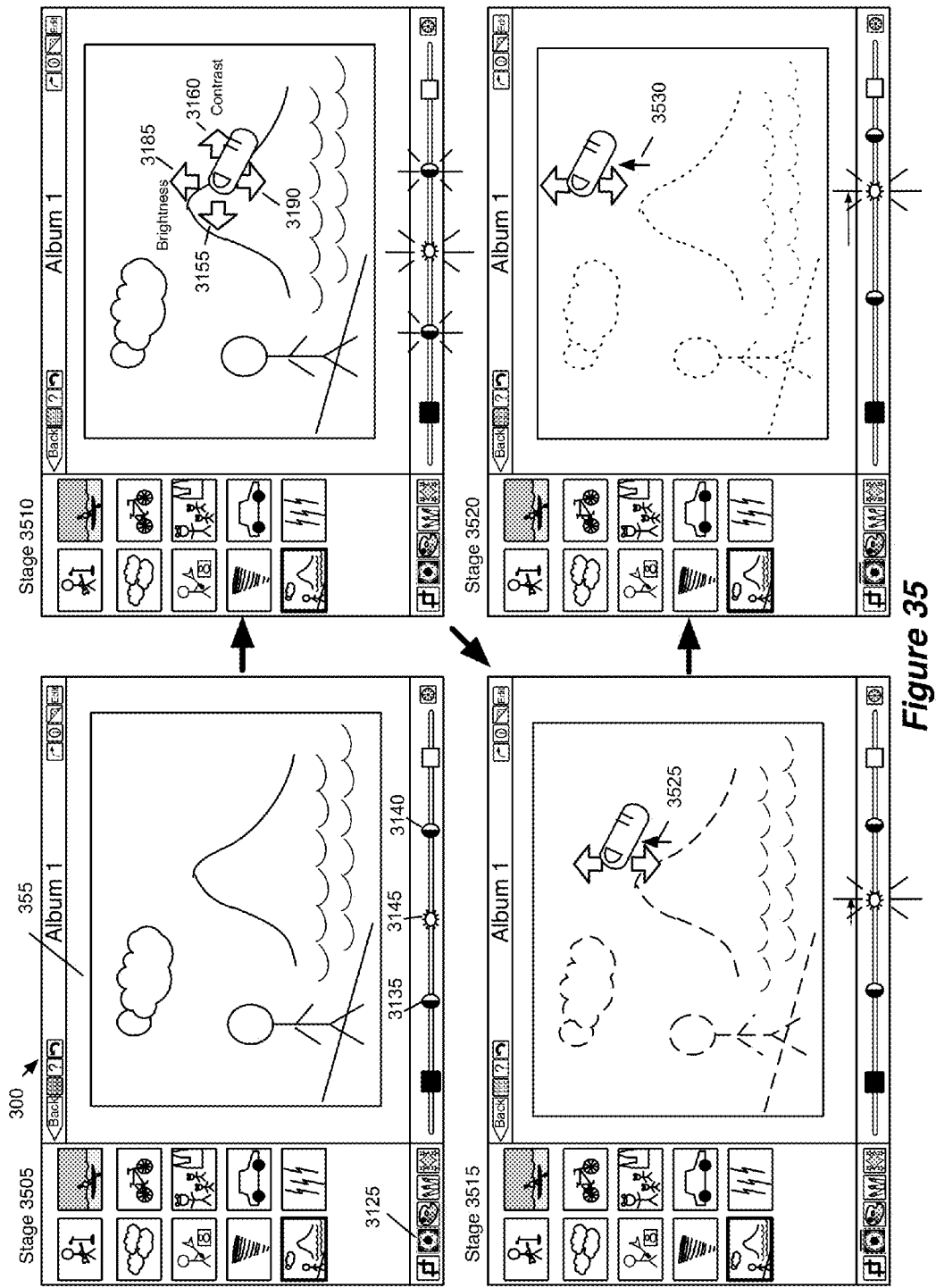
FIG. 35 illustrates an example of adjusting the brightness of an image through the GUI of an image editing application of some embodiments.

FIG. 34 illustrates an example operation of manipulating a set of on-image UI controls for adjusting highlights of an image. FIG. 35 illustrates an example operation of manipulating a set of on-image UI controls for adjusting the overall brightness of an image. Specifically, FIG. 35 illustrates the exposure adjustment operation at four different stages 3505, 3510, 3515, and 3520.

The first stage 3505 is identical to the first stage 3105 of FIG. 31. As shown, the user has selected the selectable UI item 3125 for adjusting exposure settings of the image 355. The second stage 3510 illustrates the GUI 300 after the user has selected a location on the image 355. The selection of the location on the image 355 may be performed by performing a gesture (e.g., placing, pointing, or tapping a finger) at a location on a device having a touch or near touch sensitive screen that displays the image, or by placing a cursor at the location of the image and providing an input (e.g., clicking on the cursor controlling device, pressing a hot key, etc.). As shown, the user has selected a location on the image 355 that shows the mountain with mid-tone colors by tapping a finger at the location. As a result of the selection, a set of on-image UI controls 3155, 3160, 3185, and 3190 are displayed around the selected location on the image. The set of on-image UI controls includes a set of on-image UI controls 3155 and 3160 that corresponds to the contrast UI controls 3135 and 3140 for adjusting contrast of the image and a set of on-image UI controls 3185 and 3190 that corresponds to the brightness UI control 3145 for adjusting the overall brightness of the image. The second stage 3510 also shows that the corresponding contrast UI controls 3135 and 3140, and the brightness UI control 3145 are highlighted to indicate that these UI controls are activated.

The third stage 3515 illustrates the GUI 300 after the user has begun adjusting the overall brightness of the image 355 by providing a directional input on the image 355. The directional input can be provided by dragging the user's finger on a device having a touch or near touch sensitive screen or dragging a cursor in a direction. In this example, the user provides a directional input by dragging the user's finger upward, toward the top of the image 355, as indicated by the arrow 3525. The application associates the directional input with the on-image UI control 3185 for increasing the brightness (i.e., increasing the luminance values of the image's pixels) of the image and performs the brightness adjustment to the image 355. As shown, the entire image 355 has been brightened, as indicated by the broken lines that outline the objects in the image 355. The third stage 3515 also illustrates that once the application associates the directional input with one set of the on-image UI controls, the inactivated on-image UI controls 3155 and 3160 are removed from display and the corresponding contrast UI controls 3135 and 3140 are no longer highlighted. The third stage 3515 also illustrates that the corresponding brightness UI controls 3145 has moved to the left.

Additionally, the GUI 300 also displays a bar on top of the selectable UI item 3125 when an exposure adjustment has been performed on the image. The bar on top of the selectable UI item 3125 will remain visible to indicate what type of adjustments the user has performed on the image. As shown, a bar has appeared on top of the selectable UI item 3125 at the third stage 3415 after the user has made brightness adjustments to the image 355.

The fourth stage 3520 illustrates the GUI 300 after the user has further adjusted the brightness of the image 355 by dragging the user's finger further upward, as indicated by the arrow 3530. As shown, the image 355 in this stage 3520 are shown to be even brighter than the image in the third stage 3515, as indicated by the more broken lines that outline the objects of the image 355. The fourth stage 3520 also illustrates that the corresponding brightness UI controls 3145 has moved further to the left.

Figure 36:
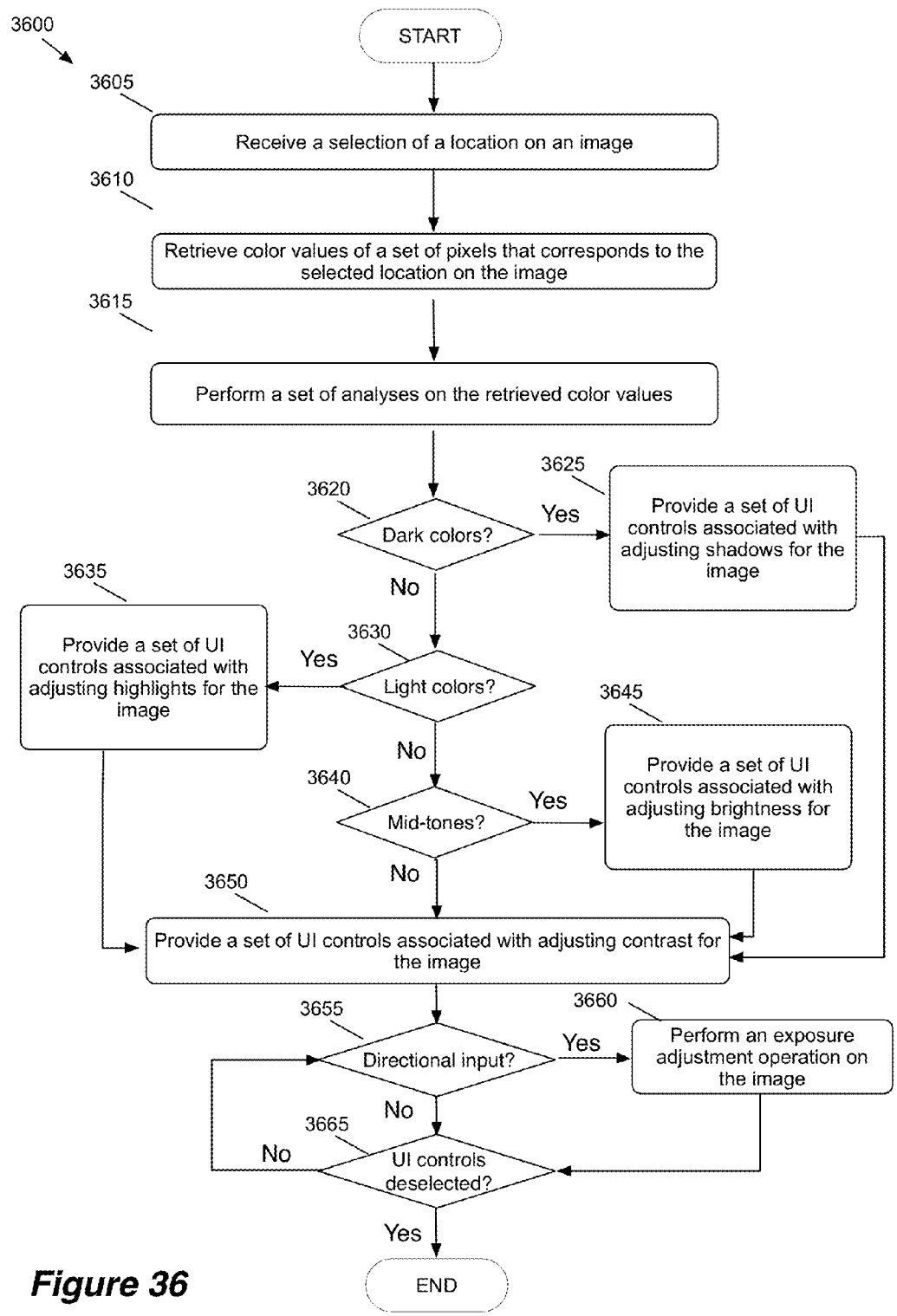
FIG. 36 conceptually illustrates a process of some embodiments for providing different color adjustment UI controls based on different location selected on an image.

FIG. 36 conceptually illustrates a process 3600 for providing a set of on-image UI controls for adjusting contrast, brightness, shadows, and highlights in an image based on a user selection of a location on the image. In some embodiments, the process is performed by an image editing application. The first three operations 3605, 3610, and 3615 are identical to the first three operations 1905, 1910, and 1915 of process 1900 in FIG. 19. The process begins by receiving (at 3605) a selection of a location on an image. The process then retrieves (at 3610) color values of a set of pixels that corresponds to the selected location on the image. In some embodiments, the set of pixels are pixels that are located in proximity of the selected location.

Next, the process performs (at 3615) a set of analyses on the retrieved color values. In some embodiments, each analysis determines whether the selected location is associated with a particular type of content based on the retrieved color values. For example, the set of analyses includes an analysis for determining whether the selected location is associated with dark colors, an analysis for determining whether the selected location is associated with light colors, and an analysis for determining whether the selected location is associated with mid-tones.

The process then determines (at 3620) whether the selected location is associated with dark colors based on the results from the set of analyses. In some embodiments the process determines that the selected location is associated with dark colors if the retrieved color values have low luminance (i.e., brightness) levels. If the selected location is associated with dark colors, the process provides (at 3625) a set of UI controls for adjusting shadows in the image. In some embodiments, the set of UI controls for adjusting shadows are displayed around the selected location on the image.

The process then determines (at 3630) whether the selected location is associated with light colors based on the results from the set of analyses. In some embodiments the process determines that the selected location is associated with light colors if the retrieved color values have high luminance (i.e., brightness) levels. If the selected location is associated with light colors, the process provides (at 3635) a set of UI controls for adjusting highlights in the image. In some embodiments, the set of UI controls for adjusting highlights are displayed around the selected location on the image.

The process then determines (at 3640) whether the selected location is associated with mid-tones based on the results from the set of analyses. In some embodiments the process determines that the selected location is associated with mid-tones if the retrieved color values have average or median luminance (i.e., brightness) levels. If the selected location is associated with mid-tones, the process provides (at 3645) a set of UI controls for adjusting brightness in the image. In some embodiments, the set of UI controls for adjusting brightness are displayed around the selected location on the image.

Next, the process provides (at 3650) a set of UI controls for adjusting contrast for the entire image. In some embodiments, the process always provides this set of UI controls for adjusting contrast for the entire image independent of the location on the image selected by the user.

The process then determines (at 3655) whether a directional input is received. If a directional input is received, the process performs (at 3660) an exposure adjustment operation to the image based on the directional input. The process then determines (at 3665) if the on-image UI controls are deselected. In some embodiments, the set of on-image UI controls can be deselected by lifting the finger from the device having a touch or near touch sensitive screen (or releasing a button).

If the process determines (at 3655) that there is no directional input received, the process also proceeds to operation 3665 to determine if the on-image UI controls are deselected. If the set of on-image UI controls is not deselected, the process returns to 3655 to determine if a directional input is received. On the other hand, if the set of on-image UI controls is deselected, the process ends.

III. Color Balance Controls

In addition to providing UI controls for adjusting only a portion of an image associated with a type of content, the image editing application of some embodiments also provides a set of UI controls for adjusting color balance of an image. Very often, capturing images under different lighting conditions may adversely affect the quality of the images. A common artifact is an overall unwanted color cast in the image created by the lighting condition in which the image is being captured. For example, an image that is captured under incandescent lights often has a yellow cast, such that an object that should appear white under neutral lighting condition appears yellow in the image. Thus, color balancing (also known as white balancing) is an operation to correct the overall colors of an image so that objects in the image look natural and pleasing.

In some embodiments, the application provides a color balance UI control that allows a user to select a location on the image. The application then retrieves the color values of a pixel that corresponds to the selected location, and determines a color adjustment that would change the color values of the pixel to an established baseline color (e.g., a gray color, an ideal skin color, etc.). Based on this color adjustment, the application generates a color space transform that maps each color in the image to a different color. The application then applies the color space transform to all the pixels in the image.

Different embodiments provide different baseline color for the color balancing operation. For example, the application of some embodiments establishes a gray color as the baseline color. In these embodiments, the user adjusts the color balance of an image through the color balance UI by selecting a location in the image that displays an object that appears as gray in person.

Figure 37:
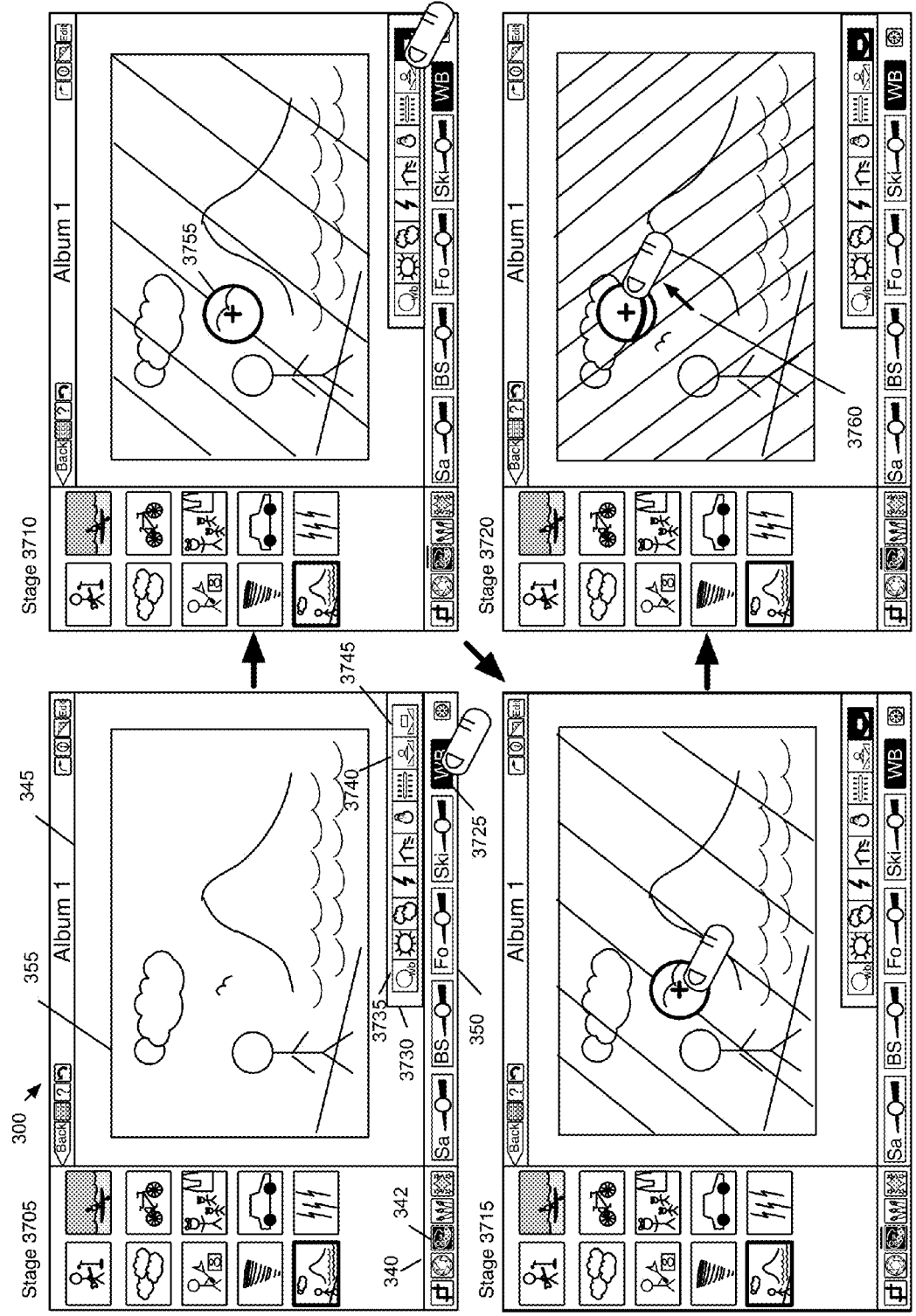
FIG. 37 illustrates an example of performing a custom white balance operation on an image through the GUI of an image editing application of some embodiments.

FIG. 37 illustrates an example of adjusting the color balance of an image through the color balance UI tool at four different stages 3705, 3710, 3715, and 3720.

The first stage 3705 is similar to the second stage 310 of FIG. 3, except that the user in this first stage 3705 has just selected the color balance selectable UI item 3725 to trigger the display of a set of different color balance tools. As shown, the user has selected the image 355 to be displayed in the image display area 345. In some embodiments, the selectable UI item 3725 for triggering the color balance tools is displayed within the UI control display area 350 when the user has selected the color adjustment view (by selecting the selectable UI item 342 in the menu bar 340). The selection of the selectable UI item 3725 may be performed by performing a gesture (e.g., placing, pointing, or tapping a finger) at a location on a device having a touch or near touch sensitive screen that displays the selectable UI item 3725, or by placing a cursor at the selectable UI item 3725 and providing an input (e.g., clicking on the cursor controlling device, pressing a hot key, etc.).

As shown, after the user has selected the selectable UI item 3725, a color balance tools display area 3730 appears on top of the UI control display area 350. The color balance tools display area 3730 includes several selectable UI items for initiating different color balance tools. For example, the color balance tools display area 3730 includes a selectable UI item 3735 for initiating an "Original White Balance" tool. The "Original White Balance" tool uses the white balance settings of the device that captured the image to adjust the white balance of the image. The color balance tools display area 3730 also includes a set of selectable UI items for initiating different pre-set white balance tools. The pre-set white balance tools adjusts the white balance of an image based on different pre-defined lighting conditions, such as daylight, cloudy, flash, shade, incandescent, and fluorescent lighting conditions. In addition, the color balance tools display area 3730 also includes selectable UI items for initiating two custom color balance tools, such as the selectable UI item 3745 for initiating a custom white balance tool and the selectable UI item 3740 for initiating a custom skin balance tool.

A custom white balance tool allows a user to select a location on the image that is supposed to be white or gray under a neutral lighting condition. The image editing application then defines an algorithm or mathematical equation to adjust the color values of the location so that the color values represent a white color. The application then applies that same algorithm or mathematical equation to the rest of the pixels in the image.

The second stage 3710 illustrates the GUI 300 after the user has selected the selectable UI item 3745 for initiating the custom white balance tool. The selection of the selectable UI item 3745 may be performed by performing a gesture (e.g., placing, pointing, or tapping a finger) at a location on a device having a touch or near touch sensitive screen that displays the selectable UI item 3745, or by placing a cursor at the selectable UI item 3745 and providing an input (e.g., clicking on the cursor controlling device, pressing a hot key, etc.). As shown, the user has just selected the selectable UI item 3745, as indicated by the highlighting of the selectable UI item 3745. As a result, a custom white balance UI control 3755 is displayed on the image.

Once the custom white balance UI control 3755 appears on the image, the application performs a white balance operation by adjusting color values of the image 355. Specifically, the application samples one or more of the color values of a set of pixels that corresponds to or is near the location selected through the custom white balance UI control 3755. The application then devises an algorithm or mathematical equation (that takes a set of parameters as inputs) to transform the color values to a nearest gray, and then applies the same algorithm or mathematical equation to all the pixels in the image 355. In some embodiments, the application converts the color values of the image 355 to a YCC color space (e.g., a YIQ color space) before applying the color balance adjustment to the image.

Different embodiments implement the custom white balance UI control differently. In this example, the custom white balance UI control appears as a circle with a cross-hair in the middle of the circle. A user can select a location on the image 355 by placing the custom white balance UI control 3755 in an area of the image 355 so that the cross-hair is on top of an object in the image 355 that is supposed to be white or gray under neutral lighting condition.

In some embodiments, the application provides a preview of the white balance adjustment by displaying the edited version (i.e., when the image is white balanced based on the current location of the custom white balance UI control 3755) for the portion of the image outside of the custom white balance UI control 3755. In these embodiments, the portion of the image that is inside the custom white balance UI control 3755 remains unedited to allow the user to see the difference between the edited and unedited versions. As shown in this second stage 3710, the portion of the image 355 that is outside the custom white balance UI control 3755 has been adjusted while the portion of the image 355 that is inside the custom white balance UI control 3755 remains unaffected, as indicated by the diagonal lines across only the portion of the image 355 that is outside the custom white balance UI control 3755. In other embodiments, only the portion of the image that is inside the custom white balance UI control 3755 gets edited and the portion of the image outside the custom white balance UI control 3755 remains unedited. Yet in other embodiments, the whole image gets edited.

In addition to the preview functionality, the application of some embodiments also zooms-in the portion of the image inside the custom white balance UI control 3755 to assist the user in precisely selecting a white or gray location in the image. As shown, the portion of the image 355 that is inside the custom white balance UI control 3755 has been zoomed in, as that area shows a much bigger bird than the one appears in the first stage 3705.

Additionally, the GUI 300 also displays a bar on top of the selectable UI item 342 when a color adjustment has been performed on the image. The bar on top of the selectable UI item 342 will remain visible to indicate what type of adjustments the user has performed on the image. As shown, a bar has appeared on top of the selectable UI item 342 at the second stage 320 after the user has made color balance adjustments to the image 355.

As mentioned above, the application of some embodiments allows the user to move the custom white balance UI control 3755 to different locations on the image. The third stage 3715 is a transient stage that shows the user has selected the custom white balance UI control 3755 but has not started moving the custom white balance UI control 3755. The fourth stage 3720 illustrates the GUI 300 after the user has moved the custom white balance UI control 3755 to a different location on the image. In some embodiments, the user can move the custom white balance UI control 3755 by dragging the user's finger or dragging a cursor to a different location on the image. As shown, the user has moved the custom white balance UI control 3755 to an area of the image 355 that shows a cloud, as indicated by the arrow. As a result of moving the custom white balance UI control 3755 to this new location, the application re-adjusts the color values of the image. In some embodiments, the application takes another sample of the pixel that corresponds to the location selected through the custom white balance UI control 3755. The application then devises an algorithm or mathematical equation (that takes a set of parameters as inputs) to transform the color values to a nearest gray, and then applies the same algorithm or mathematical equation to all the pixels in the image 355. As shown, the portion of the image outside the custom white balance UI control 3755 is shown to be re-adjusted, as indicated by a different set of diagonal lines across the portion of the image 355.

In the above example illustrated in FIG. 37, the application performs the color balance operation to the image immediately after the color balance control 3755 appears on the image, and re-adjusts the image every time the user moves the color balance UI control 3755. In some other embodiments, in order to conserve the processing power of the device on which the application is executed, the application performs the color balance operation to the image only upon an additional input is received from the user (e.g., a selection of a "perform color balance" selectable UI item, an extra tap on the image, etc.). This way, the image does not get adjusted every time the user moves the color balance UI control 3755, but only adjusted when the user finalizes the location and provides the additional input.

Figure 38:
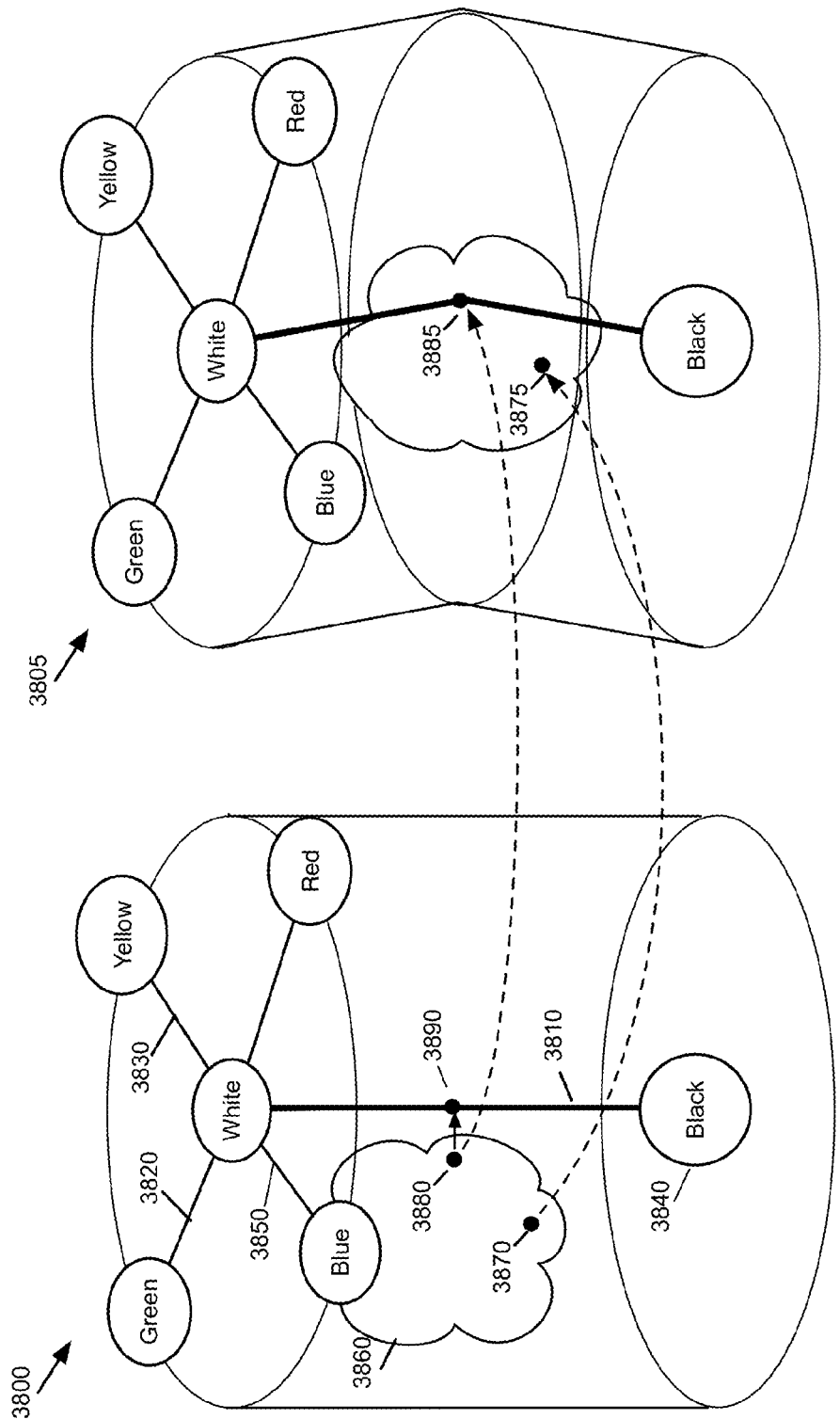
FIG. 38 illustrates an example of generating a color space transform for a custom white balance operation.

FIG. 38 illustrates an example white balance operation for an image that is performed by the image editing application of some embodiments. As shown, the color space 3800 represents a color space in which the color values of the image are defined. This particular color space is defined along three axes: an axis 3820 that represents a range of red and green color values, an axis 3830 that represents a range of blue and yellow color values, and a vertical axis 3810 that represents a range of different shades of grays (i.e., a range of luminance values), where the bottom location 3840 represents a black color and a top location 3850 represents a white color. The lighter a color is, the further the color appears from the bottom of this color space cylinder 3800.

The area 3860 represents all the color values of the image. Although the area 3860 is shown to be located in one small region in the color space 3800, the color values of an image may occupy many different regions of the color space 3800. When the user selects a location on the image using the white balance UI control, the application retrieves the color values of the pixel that corresponds to the selected location. In this figure, color 3880 represents the color of the pixel that corresponds to the location identified by the white balance UI control. The application then locates a gray color (e.g., 3890) that is nearest to the selected color values within the color space, and determines a color adjustment that will modify the selected color values 3880 to the gray color values 3890. The application then generates a color space transform based on the determined color adjustment. In some embodiments, the color space transform is a M by M matrix (e.g., a 3 by 3 matrix) that is generated based on the determined color adjustment. In some embodiments, the color space transform maps each color in the color space 3800 to another color in a warped color space. The color space 3805 in FIG. 38 represents a color space after the color space 3800 has been transformed by the color space transform. As shown, the color 3880 in the color space 3800 is mapped to the color 3885 in the color space 3805, another color 3870 in the color space 3800 is mapped to the color 3875 in the color space 3805. In some embodiments, the application adjusts the white balance of the image based on the selected location by applying this color space transform to each pixel in the image.

FIG. 37 illustrates an example of performing a custom white balance operation using the custom white balance UI control. In addition to the custom white balance operation, the application of some embodiments also provides a custom skin balance operation. The custom skin balance operation is similar to the custom white balance operation, except that instead of selecting a location on the image that is supposed to be white in color under neutral lights, the user selects a location on the image that displays a person's face. In these embodiments, the application defines a set of ideal face colors. For instance, the application of some embodiments may define an ideal face color under daylight condition and an ideal face color in artificial light condition. When the user selects a location on the image, the application samples the color values of the pixel that corresponds to the selected location, and defines an adjustment to adjust the color values of the pixel to be the ideal face color. The application then applies the same adjustment to all the pixels in the image.

Figure 39:
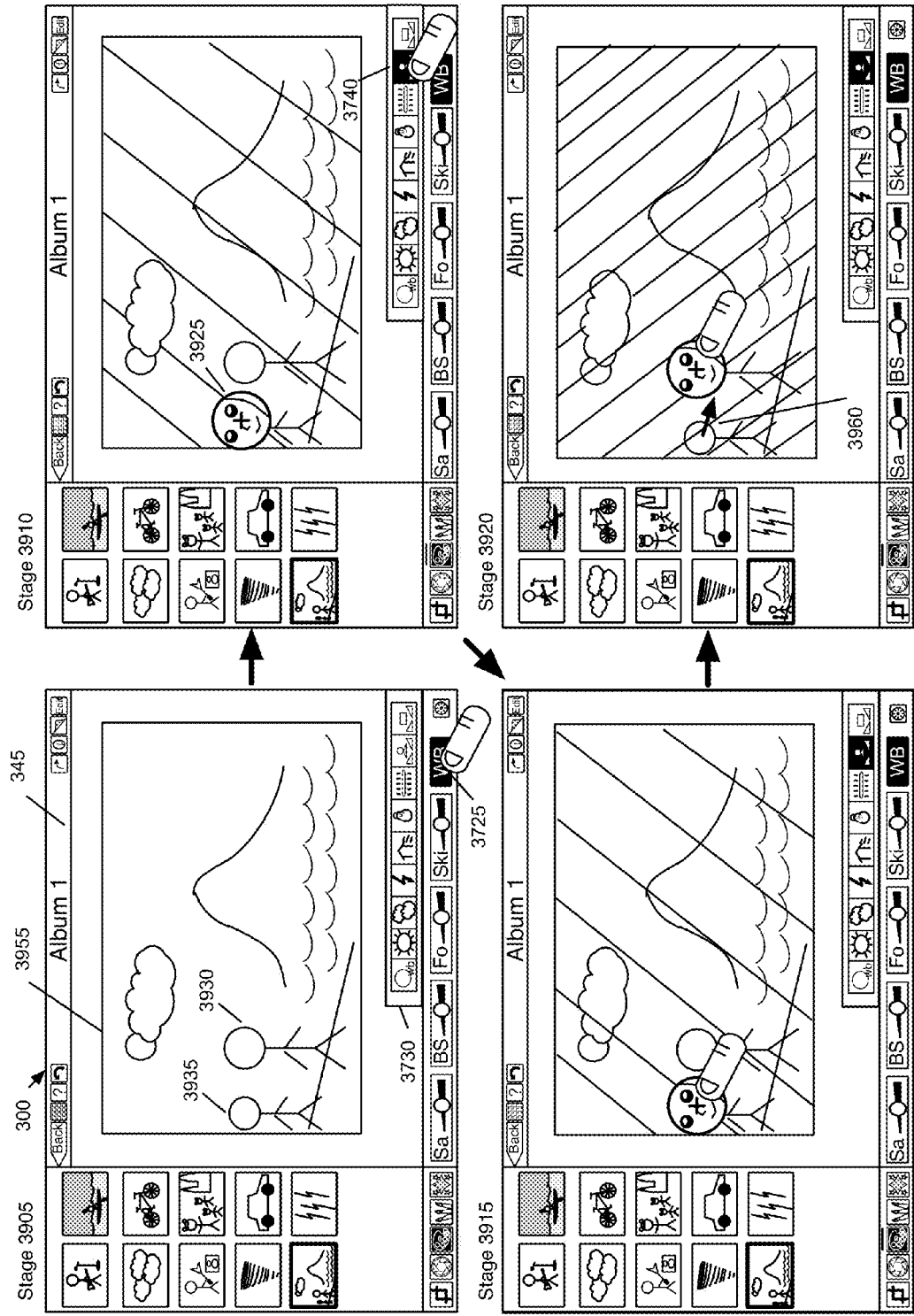
FIG. 39 illustrates an example of performing a custom face balance operation on an image through the GUI of an image editing application of some embodiments.

FIG. 39 illustrates an example of performing a custom skin balance operation at four different stages 3905, 3910, 3915, and 3920.

The first stage 3905 is similar to the first stage 3705 of FIG. 37, except that the user has selected another image to be edited. As shown, the user has selected image 3955 to be displayed in the image display area 345. The image 3955 is a photo of a person 3930 standing in the foreground and another person 3935 standing in the background. The image 3955 also shows a mountain and a sea on the right side of the image. Similar to the first stage 3705 of FIG. 37, the user has selected the selectable UI item 3725 to open up the white balance tools display area 3730.

The second stage 3910 illustrates the GUI 300 after the user has selected the selectable UI item 3740 for initiating the custom skin balance tool. The selection of the selectable UI item 3740 may be performed by performing a gesture (e.g., placing, pointing, or tapping a finger) at a location on a device having a touch or near touch sensitive screen that displays the selectable UI item 3740, or by placing a cursor at the selectable UI item 3740 and providing an input (e.g., clicking on the cursor controlling device, pressing a hot key, etc.). As shown, the user has just selected the selectable UI item 3740, as indicated by the highlighting of the selectable UI item 3740. As a result, a custom skin balance UI control 3925 is displayed on the image.

Once the custom skin balance UI control 3925 appears on the image, the application performs a skin balance operation by adjusting color values of the image 3955. Specifically, the application samples one or more of the color values of a set of pixels that corresponds to or is near the location the location selected through the custom skin balance UI control 3925. The application then devises an algorithm or mathematical equation (that takes a set of parameters as inputs) to transform the color values to a pre-defined ideal face color, and then applies the same algorithm or mathematical equation to all the pixels in the image 3955.

Different embodiments implement the custom skin balance UI control differently. In this example, the custom skin balance UI control 3925 appears as a circle with a cross-hair in the middle of the circle. A user can select a location on the image 3955 by placing (or moving) the custom skin balance UI control 3925 in an area of the image 3955 so that the cross-hair is on top of a person's face in the image 3955.

In some embodiments, the application uses a face detection algorithm to detect a person's face in the image and places the custom skin balance UI control 3925 over the first person's face it detects in the image. As shown in this second stage 3910, the custom skin balance UI control 3925 appears on top of the face of the person standing in the background.

Similar to the custom white balance UI control, the application of some embodiments provides a preview of the skin balance adjustment by displaying an edited version of the image (i.e., when the image is skin balanced based on the current location of the custom skin balance UI control 3925) for the portion of the image outside of the custom skin balance UI control 3925. In these embodiments, the portion of the image that is inside the custom skin balance UI control 3925 remains unedited to allow the user to see the difference between the edited and unedited versions. As shown in this second stage 3910, the portion of the image 3955 that is outside the custom skin balance UI control 3925 has been adjusted while the portion of the image 3955 that is inside the custom skin balance UI control 3925 remains unaffected, as indicated by the diagonal lines across only the portion of the image 3955 that is outside the custom skin balance UI control 3925. In other embodiments, only the portion of the image that is inside the custom skin balance UI control 3925 gets edited and the portion of the image outside the custom skin balance UI control 3925 remains unedited. Yet in other embodiments, the whole image gets edited.

In addition to the preview functionality, the application of some embodiments also zooms-in the portion of the image inside the custom skin balance UI control 3925 to assist the user in precisely selecting a location in the image that displays a person's face. As shown, the portion of the image 355 that is inside the custom skin balance UI control 3925 has been zoomed in, as that area shows more details of the face of the person standing in the background.

Additionally, the GUI 300 also displays a bar on top of the selectable UI item 342 when a color adjustment has been performed on the image. The bar on top of the selectable UI item 342 will remain visible to indicate what type of adjustments the user has performed on the image. As shown, a bar has appeared on top of the selectable UI item 342 at the second stage 320 after the user has performed a custom skin balance operation to the image 3955.

As mentioned above, the application of some embodiments allows the user to move the custom skin balance UI control 3925 to different locations on the image. With the help of the face detection algorithm, the application is able to locate a person's face in the image. However, when the image contains several faces, the user may not want to skin balance based on the face of the person selected by the application, rather, the user may want to skin balance based on the face of another person in the image. The second stage 3910 shows that the application automatically places the custom skin balance UI control 3925 over the face of the person in the background (the first face that the application detected using the face detection algorithm). However, the person in the foreground, instead of the person in the background, is the actual point of interest in this picture. Thus, the movable custom skin balance UI control 3925 allows the user to specify the correct location of the face in interest.

The third stage 3915 is a transient stage that shows the user has selected the custom skin balance UI control 3925 but has not started moving the custom skin balance UI control 3925. The fourth stage 3920 illustrates the GUI 300 after the user has moved the custom skin balance UI control 3925 to a different location on the image. In some embodiments, the user can move the custom skin balance UI control 3925 by dragging the user's finger or dragging a cursor to a different location on the image. As shown, the user has moved the custom skin balance UI control 3925 to an area of the image 3955 that displays the face of the person in the foreground. As a result of moving the custom skin balance UI control 3925 to this new location, the application re-adjusts the color values of the image. In some embodiments, the application takes another sample of the pixel that corresponds to the location selected through the custom skin balance UI control 3925. The application then devises an algorithm or mathematical equation (that takes a set of parameters as inputs) to transform the color values to the pre-defined ideal face color, and then applies the same algorithm or mathematical equation to all the pixels in the image 3955. As shown, the portion of the image outside the custom skin balance UI control 3925 is shown to be re-adjusted, as indicated by a different set of diagonal lines across the portion of the image 3955.

In the above example illustrated in FIG. 39, the application performs the color balance operation to the image immediately after the color balance control 3925 appears on the image, and re-adjusts the image every time the user moves the color balance UI control 3925. In some other embodiments, in order to conserve the processing power of the device on which the application is executed, the application performs the color balance operation to the image only upon an additional input is received from the user (e.g., a selection of a "perform color balance" selectable UI item, an extra tap on the image, etc.). This way, the image does not get adjusted every time the user moves the color balance UI control 3925, but only adjusted when the user finalizes the location and provides the additional input.

Figure 40:
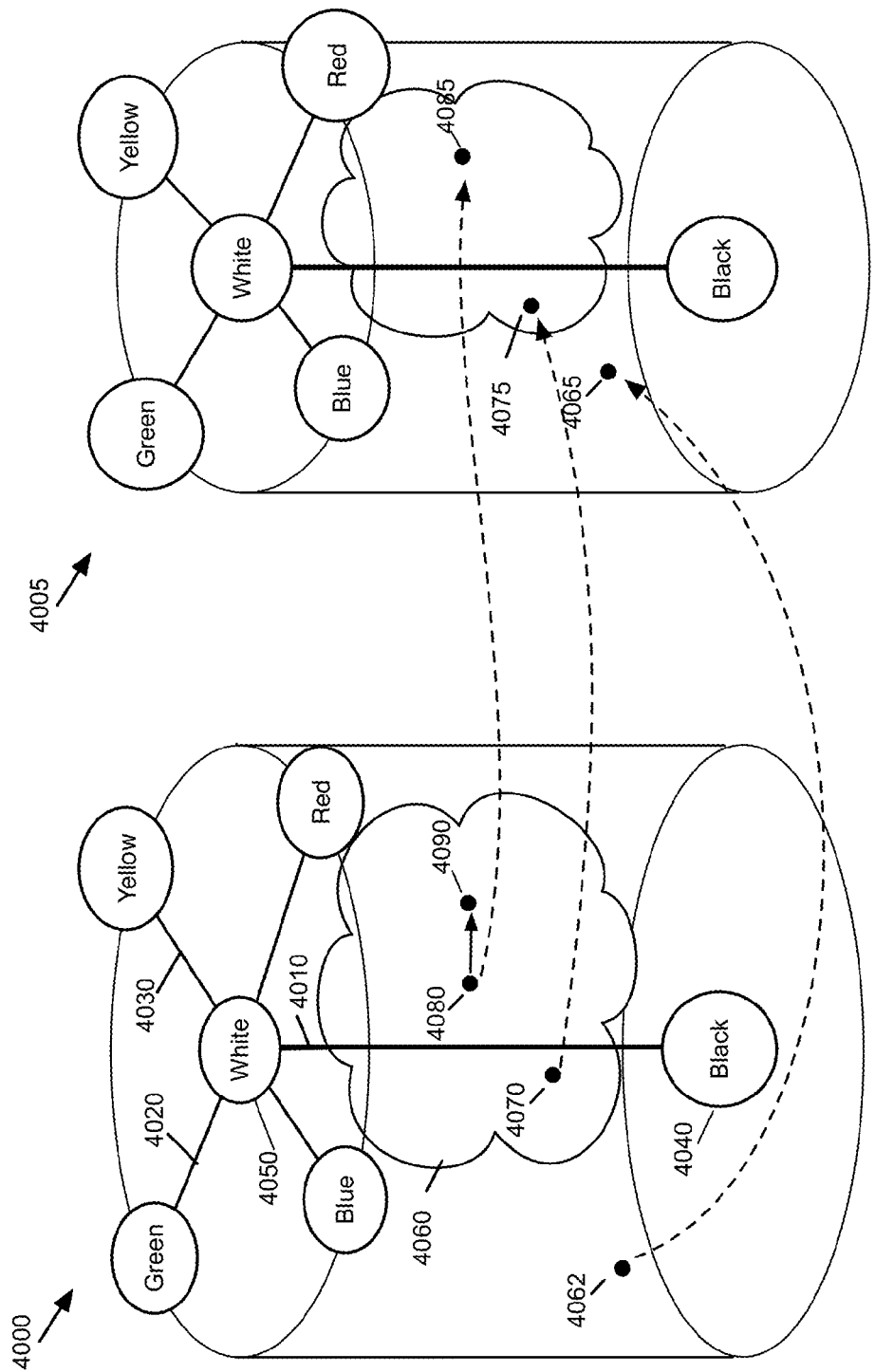
FIG. 40 illustrates an example of generating a color space transform for a custom face balance operation.

FIG. 40 illustrates an example skin balance operation for an image that is performed by the image editing application of some embodiments. In some embodiments, the application first converts the color values of the image from the color space in which the color values are defined (e.g., an RGB color space) to a YCC color space (e.g., a YIQ color space) before performing a skin balance operation. The conversion from the RGB color space to the YIQ color space can be performed by first applying a gamma of approximately ¼ on the color values in the RGB color space and then applying a three by three matrix to convert the color values to the YIQ color space. As shown, the color space 4000 represents a YCC color space to which the color values of the image are converted. This particular color space is defined along three axes: an axis 4020 that represents a range of red and green color values, an axis 4030 that represents a range of blue and yellow color values, and a vertical axis 4010 that represents a range of different shades of grays (i.e., a range of luminance values), where the bottom location 4040 represents a black color and a top location 4050 represents a white color. The lighter a color is, the further the color appears from the bottom of this color space cylinder 4000.

The area 4060 represents all the color values of the image. Although the area 4060 is shown to be located in one small region in the color space 4000, the color values of some other images may occupy many different regions of the color space 4000. When the user selects a location on the image using the skin balance UI control, the application retrieves the color values of the pixel that corresponds to the selected location. In this figure, color 4080 represents the color of the pixel that corresponds to the location identified by the white balance UI control.

In some embodiments, the application defines two different ideal skin colors: one being the ideal skin color under daylight condition, and the other being the ideal skin color under artificial light condition. The application of some embodiments perform an analysis on the image to detect whether the image was being captured under daylight or artificial light, and selects the corresponding ideal skin color for this operation.

The application identifies an ideal skin color 4090 within the YCC color space 4000. The application then determines a color space transform based on the difference between the ideal skin color values 4090 and the retrieved color values 4080. In some embodiments, the color space transform maps each color in the color space 4000 to another color in a warped color space. The color space transform adjusts the color values in a way that essentially squeezes the color space from all angle toward the white/black axis 4010. In other words, the application performs a larger adjustment to color values with higher saturation (i.e., color values that are farther away from the white/black axis 4010) and performs a smaller adjustment to color values with lower saturation (i.e., color values that are closer to the white/black axis 4010). In some embodiments, the application does not adjust color values that are located along the white/black axis 4010 (i.e., different shades of gray colors).

Color space 4005 in FIG. 40 represents a color space after the color space 4000 has been transformed by the color space transform. As shown, the color 4080 in the color space 4000 is mapped to the color 4085 in the color space 4005, color 4070 in the color space 4000 is mapped to the color 4075 in the color space 4005, and another color 4062 in the color space 4000 is mapped to the color 4065 in the color space 4005. As shown, color 4062 is farther away from the virtual axis 4010 than color 4070 in the color space 4000. Thus, color 4062 is pulled a larger distance (i.e., a larger color adjustment) than color 4070. In some embodiments, the application adjusts the skin balance of the image based on the selected location by applying this color space transform to each pixel in the image.

The custom skin balance control 3925 offers many benefits. One of the benefits is the ability to allow the user to specify an area of skin color in an image (especially when there are more than one person in the image) to be the subject of the skin balance operation so that the colors of the selected skin will be adjusted to the ideal skin colors. Another benefit of the custom skin balance control 3925 is related to the skin-tone UI control 356 described above by reference to FIG. 3 and the on-image UI controls 2025 and 2030 described above by reference to FIG. 20.

As described above by reference to FIGS. 6 and 20, the skin-tone UI control 356 and the on-image UI controls 2025 and 2030 improves the skin-tone colors by adjusting the color temperature of an image based on the defined skin-tone colors. In some embodiments, the application defines the skin-tone colors to be a range of color values within a color space. As described above, the range of color values are broadly defined to cover the average skin-tone colors of a person. However, due to the different conditions (e.g., lighting conditions, color casts, etc.) in which an image was captured, the colors of the face of the person-of-interest in the image may not fall within that range of color values defined by the application as skin-tone colors. The person-of-interest is a person of whom the user thinks as the subject in the image. In that case, the application may adjust color values of the image based on colors of some other objects (e.g., faces of people other than the person-of-interest). The custom skin balance UI control 3925 allows the user to specify the face of the person-of-interest in the image such that (1) the colors of the face of the person-of-interest will be balanced (i.e., adjusted to become the ideal face colors) and (2) the color temperature of the image will be adjusted based on the colors of the face of the person-of-interest when the user manipulates the skin-tone UI control 356 or the on-image UI controls 2025 and 2030. Specifically, once the user has performed a skin balance operation on an image, instead of using the pre-defined range of color values as skin-tone colors, the application uses the ideal skin colors as skin-tone colors for all subsequent skin-tone adjustments on the image.

Figure 41:
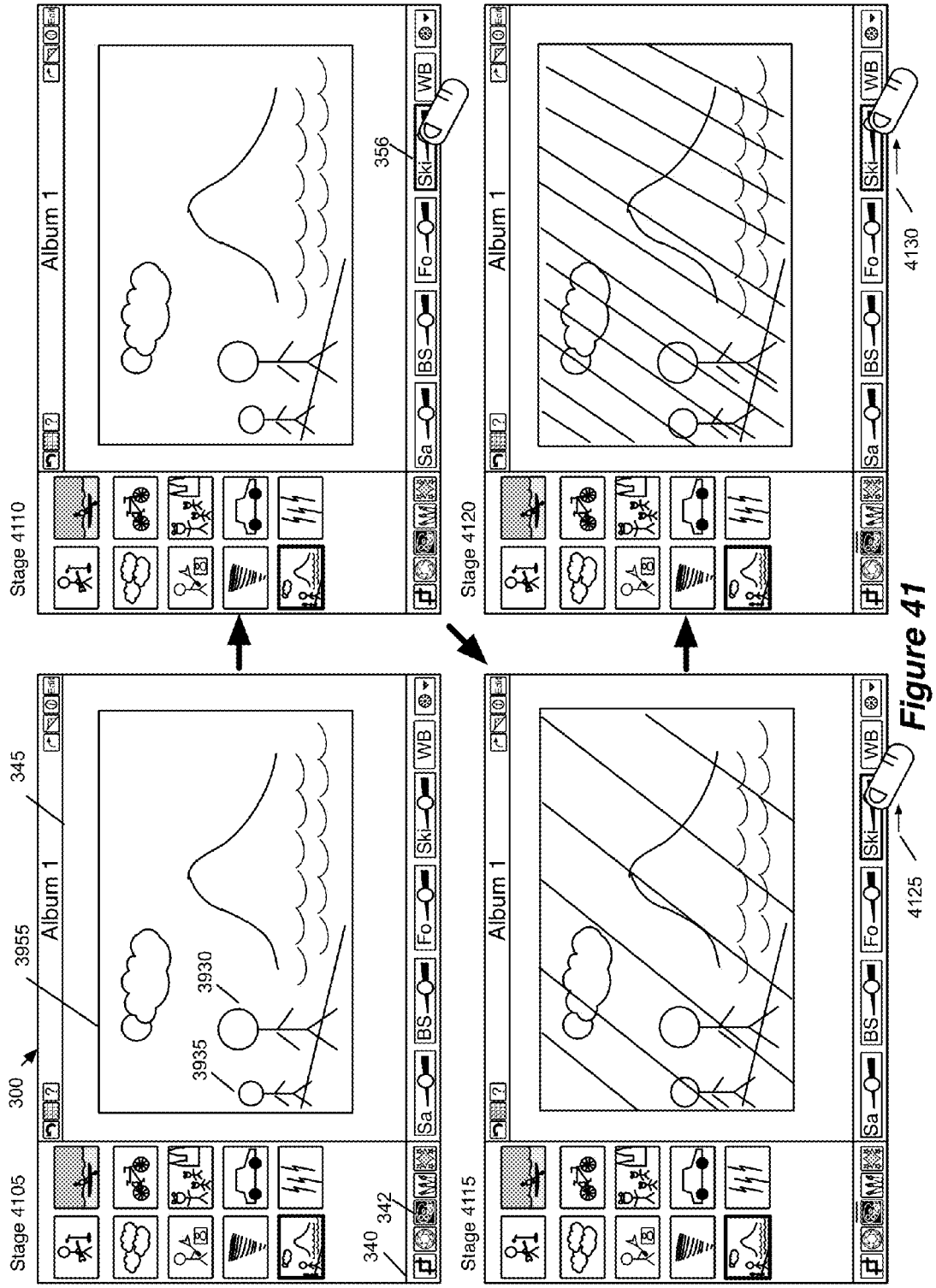
FIG. 41 illustrates an example of adjusting the color temperature of an image based on an average skin-tone color through the GUI of an image editing application of some embodiments.

FIG. 41 illustrates an example of adjusting the colors of only some but not all faces in an image by using the skin-tone UI control 356. Specifically, FIG. 41 illustrates the skin-tone color adjustment operation at four different stages 4105, 4110, 4115, and 4120.

The first stage 4105 is identical to the first stage 3905 of FIG. 39. As shown, the user has selected the image 3955 to be displayed in the image display area 345. As mentioned above, the image 3955 is a photo of a person 3930 standing in the foreground and another person 3935 standing in the background. In this example, the person in the foreground 3930 is the person-of-interest. Due to the condition (e.g., lighting condition, color cast, etc.) under which the image 3955 was captured, the colors of the two persons' faces appear to be very different. Specifically, the facial colors of the person 3935 fall within the range of color values defined by the application as skin-tone colors while the facial colors of the person 3930 fall outside the range of color values defined by the application as skin-tone colors. The image 3955 also shows a mountain and a sea on the right side of the image.

As shown, the user has selected the selectable UI item 342 from the tool bar 340 for adjusting colors of the image 3955, as indicated by the highlighting of the selectable UI item 342. The second stage 4110 illustrates the GUI 300 after the user has selected the skin-tone UI control 356, as indicated by the highlighting of the skin-tone UI control 356. The selection of the skin-tone UI control 356 may be performed by performing a gesture (e.g., placing, pointing, or tapping a finger) at a location on a device having a touch or near touch sensitive screen that displays the skin-tone UI control 356, or by placing a cursor at the skin-tone UI control 356 and providing an input (e.g., clicking on the cursor controlling device, pressing a hot key, etc.).

The third stage 4115 illustrates the GUI 300 after the user has begun to improve the skin-tone colors of the image by moving the knob of the skin-tone UI control 356 to the right, as indicated by the arrow 4125. In some embodiments, the user can move the knob of the skin-tone UI control 356 by dragging the user's finger (or dragging a cursor) to a different location. Based on the adjustment to the skin-tone UI control 356, the application adjusts the color temperature of the image 3955 based on the pre-defined skin-tone colors, as indicated by the diagonal lines across the image 3955.

The fourth stage 4120 illustrates the GUI 300 after the user has further adjusted the skin-tone colors of the image by moving the knob of the skin-tone UI control 356 further to the right, as indicated by the arrow 4130. As shown, the image 3955 in this stage 4120 is shown to be even more adjusted than the image in the third stage 4115, as indicated by the higher density of the diagonal lines across the image 3955.

Figure 42:
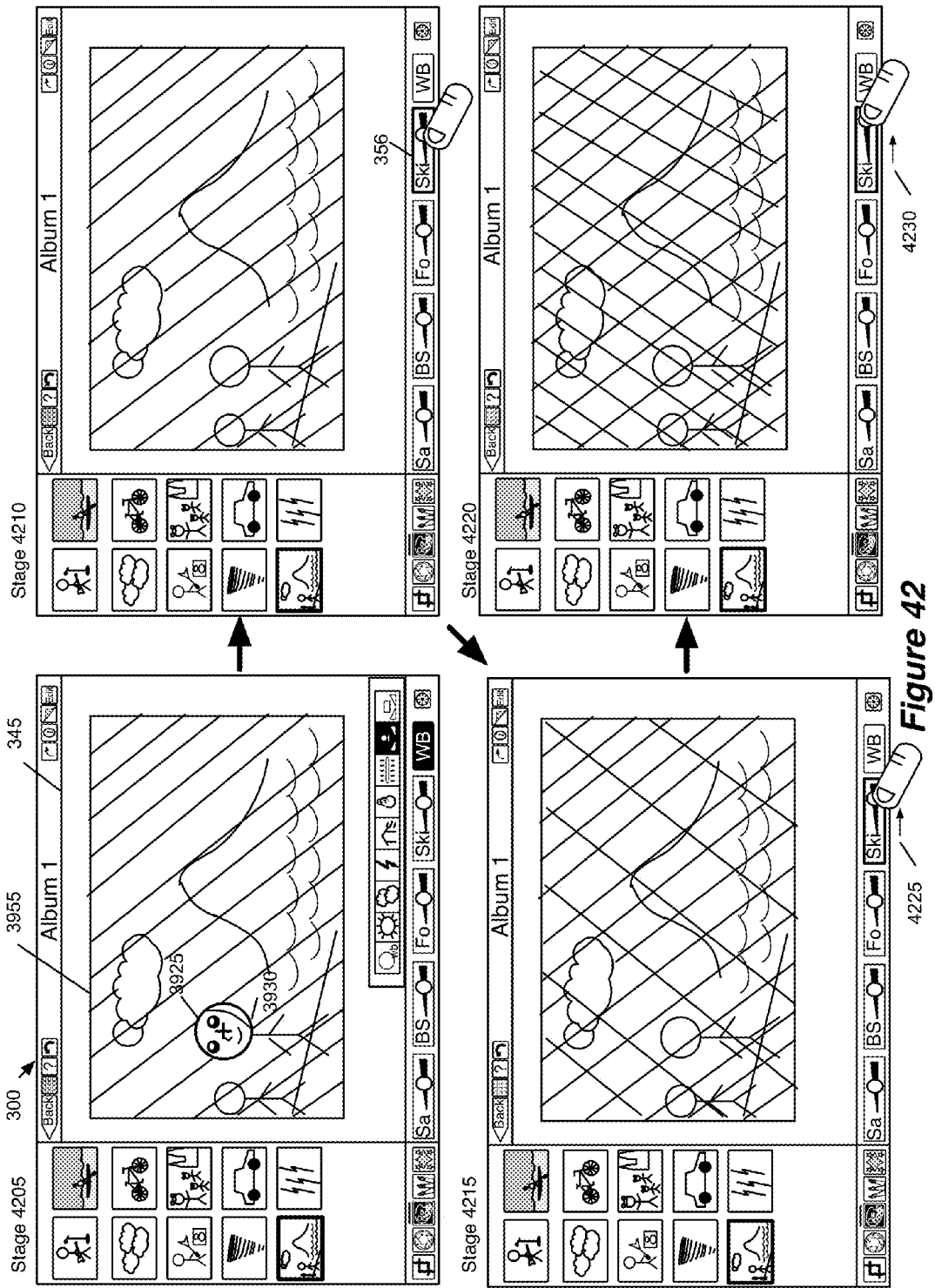
FIG. 42 illustrates an example of adjusting the color temperature of an image based on an ideal skin-tone color through the GUI of an image editing application of some embodiments.

As shown in the example illustrated in FIG. 41, the colors of the image may not be adjusted based on the skin colors of the person-of-interest by solely using the skin-tone UI control 356 or the on-image UI controls 2025 and 2030 because the colors of the face of the person-of-interest may not fall within the range of color values that was pre-defined by the application. FIG. 42 illustrates the same operation that was performed in FIG. 41, except that the user has selected the face of the person in the foreground 3930 using the skin balance UI tool 3925 before adjusting the skin-tone colors of the image. Specifically, FIG. 42 illustrates the skin-tone color adjustment operation at four different stages 4205, 4210, 4215, and 4220.

The first stage 4205 is after the fourth stage 4120 of FIG. 41. As shown, the user has just completed a skin balance operation by using the skin balance UI control 3925. Specifically, the user used the skin balance UI control 3925 to select the face of the person 3930 in the foreground for the skin balance operation. As a result, the colors of the face of the person 3930 have been adjusted to the ideal skin colors that are defined by the image.

The second stage 4210 illustrates the GUI 300 after the user has selected the skin-tone UI control 356, as indicated by the highlighting of the skin-tone UI control 356. The selection of the skin-tone UI control 356 may be performed by performing a gesture (e.g., placing, pointing, or tapping a finger) at a location on a device having a touch or near touch sensitive screen that displays the skin-tone UI control 356, or by placing a cursor at the skin-tone UI control 356 and providing an input (e.g., clicking on the cursor controlling device, pressing a hot key, etc.).

The third stage 4215 illustrates the GUI 300 after the user has begun to adjust the skin-tone colors of the image by moving the knob of the skin-tone UI control 356 to the right, as indicated by the arrow 4225. In some embodiments, the user can move the knob of the skin-tone UI control 356 by dragging the user's finger (or dragging a cursor) to a different location. Since the user has performed a skin balance operation on the image, the application uses the range of values defined as the ideal skin-tone colors, instead of using the range of values that is defined as regular skin-tone colors, for adjusting the color temperature of the image 3955. As a result of the user's input through the skin-tone UI control 356, the color values of the image have been adjusted based on the color of the face of the person in the foreground, as indicated by the 45 degree diagonal lines across the image 3955.

The fourth stage 4220 illustrates the GUI 300 after the user has further improved the skin-tone colors of the image by moving the knob of the skin-tone UI control 356 further to the right, as indicated by the arrow 4230. As shown, the image 3955 in this stage 4220 are shown to be even more adjusted than the image in the third stage 4215, as indicated by the higher density of the 45 degree diagonal lines across the image 3955.

The GUIs of the image editing application illustrated in the figures described above are illustrated under an assumption that the device on which the image editing application has a screen large enough to display the GUIs. However, some of the devices on which the image editing application may have limited screen sizes to display UI items the way the items are displayed in larger screens of larger devices. Also, the larger screens of the larger devices may be deemed limited when the devices are held in different orientations (e.g., portrait). In some embodiments, the image editing application displays different sets of different UI items at different instances in time to accommodate to the limited screen spaces.

Figure 43:
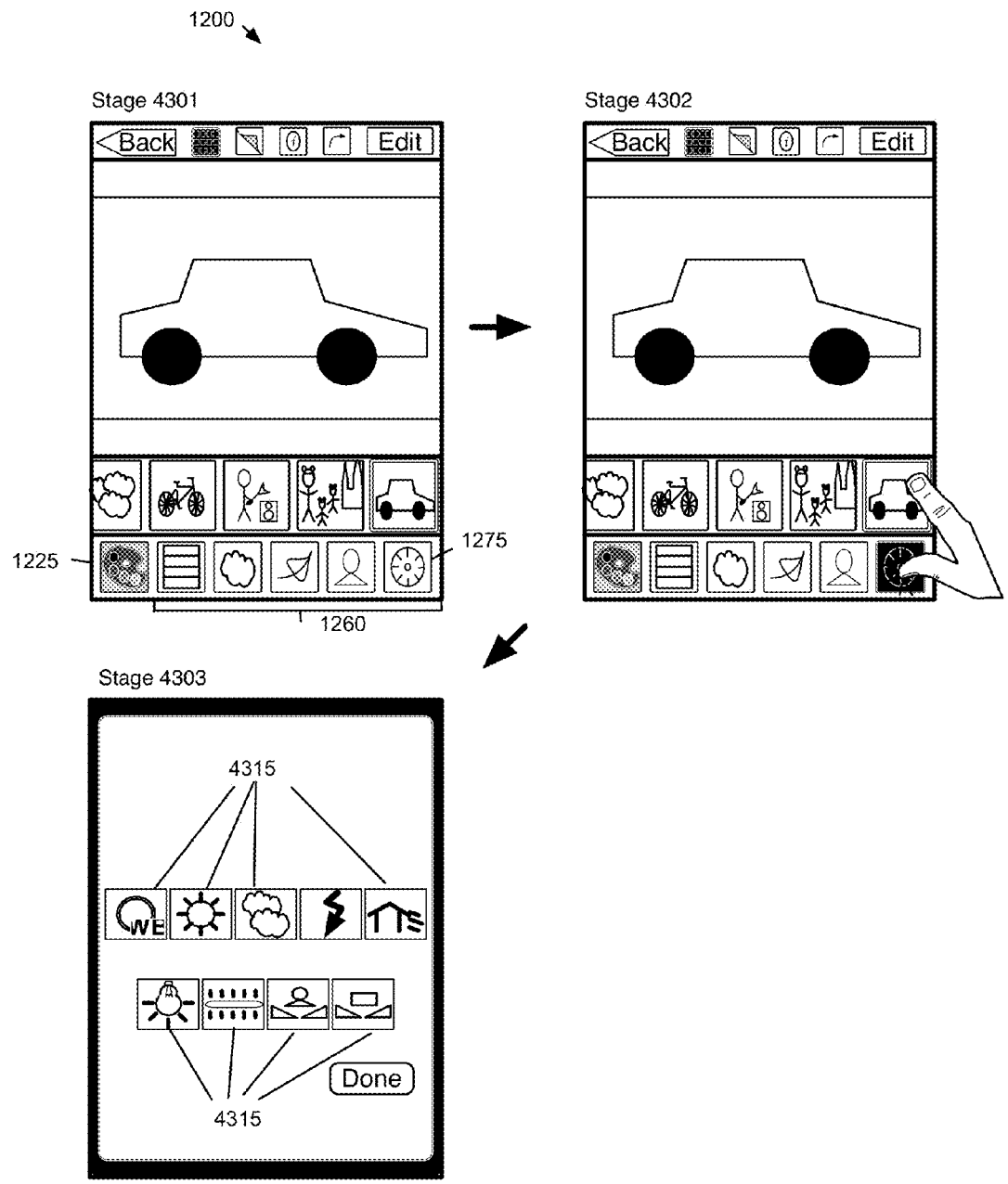
FIG. 43 illustrates an example of invoking a set of color balance tools through a different GUI of an image editing application of some embodiments FIG. 44 conceptually illustrates a process of some embodiments for performing a custom color balance operation on an image.

FIG. 43 conceptually illustrates an example of invoking a set of color balance tools through GUI 1200 of some embodiments at three different stages 4301, 4302, and 4303. The first stage 4301 is identical to the sixth stage 1206 of FIG. 12. As shown, the tool navigation pane 1225 in the GUI 1200 includes a set of color adjustment tools 1260. The set of color adjustment tools 1260 includes a UI item 1275 for invoking a set of color balance tools.

The second stage 4302 illustrates that the user has selected the UI item 1275. In some embodiments, the user can select the UI item 1275 by performing a gesture (e.g., placing, pointing, or tapping a finger) at a location on a device having a touch or near touch sensitive screen that displays the UI item 1275. As a result of the selection, a set of UI items 4315 representing the set of color balance tools appears on the GUI 1200, as shown in the third stage 4303. In some embodiments, the set of UI items lay over the entire GUI 1200, as shown in this third stage 4303. In other embodiments, the set of UI items 4315 only occupy a portion of the screen so the user can still view the image on the GUI. Although not shown here, the user can invoke any one of the color balance tools (including the custom white balance tool and custom face balance tool) by selecting one of the UI items 4315.

Figure 44:
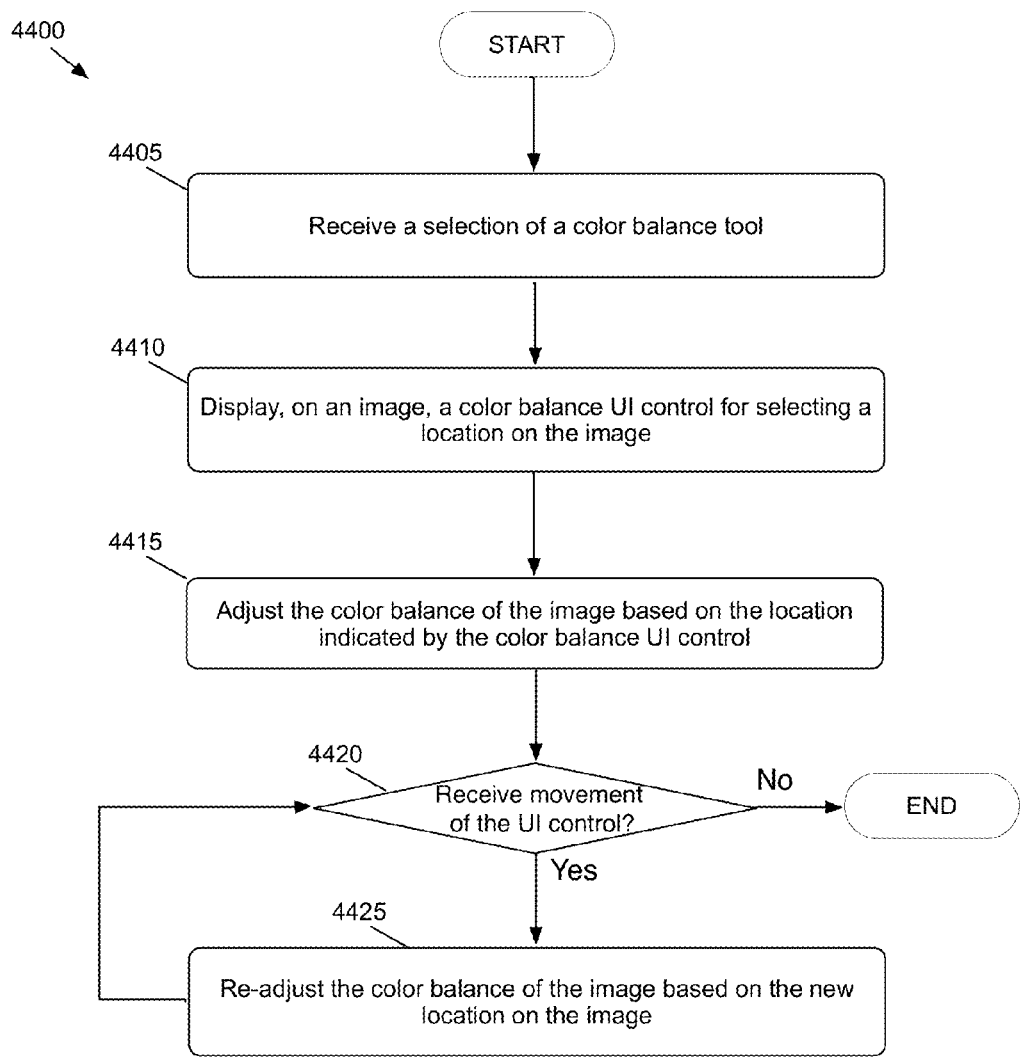

FIG. 44 conceptually illustrates a process 4400 for performing a color balance operation on an image as shown in FIGS. 41 and 42. In some embodiments, the process is performed by an image editing application. The process begins by receiving (at 4405) a selection of a color balance tool. In some embodiments, the color balance tool may be a custom white balance tool or a custom skin balance too. Other embodiments may provide additional color balance tool.

Next, the process displays (at 4410) on an image a color balance UI control for selecting a location on the image. In some embodiments, the process displays the color balance UI control in a default area on the image (e.g., the center of the image). In some other embodiments, the process performs a detection algorithm (e.g., face detection algorithm) and places the color balance UI control in an area on the image that corresponds to a specific feature (e.g., a person's face).

Different embodiments implement the color balance UI control differently. In some embodiments, the color balance UI control includes a closed boundary (e.g., a rectangle, an ellipse, etc.) with an indicator within the closed boundary to precisely indicate a location on the image. In some embodiments, the color balance UI control may appear like the color balance UI control 3925 in FIG. 39. In some of these embodiments, the color balance UI control also zooms-in (i.e. magnifies) the portion of the image that is inside the closed boundary. The zoomed-in version provides better precision in selecting a location on the image.

The process then adjusts (at 4415) the color balance of the image based on the location indicated by the color balance UI control. In some embodiments, the adjustment involves defining an algorithm or a mathematical equation for changing the color values of the pixel that corresponds to the selected location to a particular set of pre-defined color values (e.g., color values for a white color, color values for a gray color, color values for the pre-defined ideal skin-tone color). The process then applies the same algorithm or mathematical equation to all the pixels in the image.

In some embodiments, the process provides a preview of the adjusted image by displaying an adjusted version of the portion of the image that is outside the closed boundary of the color balance UI control. In these embodiments, the portion of the image inside the closed boundary of the color balance UI control remains unchanged in order to illustrate the difference between the edited and unedited versions of the image.

Next, the process determines (at 4420) whether any movement of the color balance UI control has been received. If a movement of the color balance UI control is received, the process re-adjusts (at 4425) the color balance of the image based on the new location of the color balance UI control. The process will cycle through operations 4420-4425 until no more movements are received. If no movement on the color balance UI control is received, the process ends.

Figure 45:
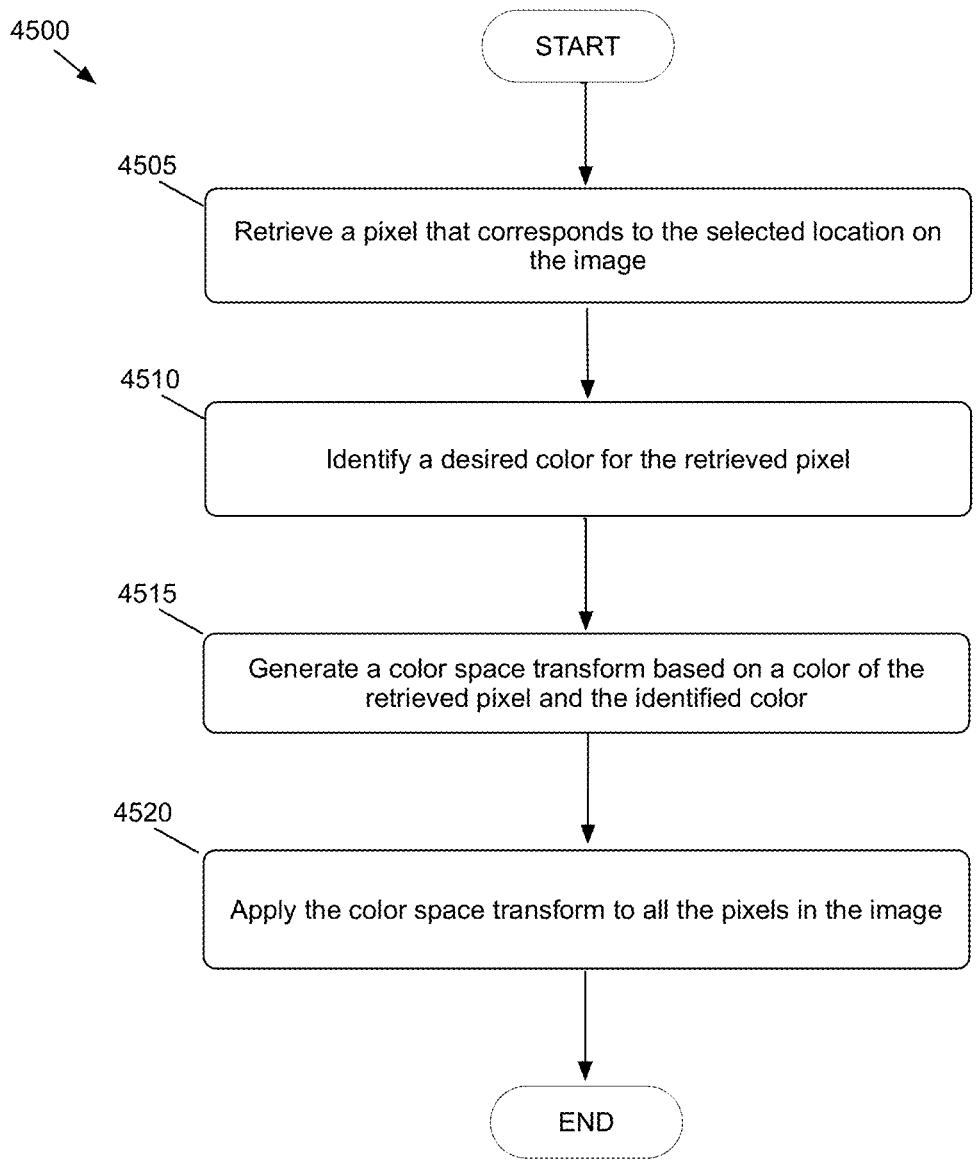
FIG. 45 conceptually illustrates a process of some embodiments for generating a color space transform for a custom color balance operation.

FIG. 45 conceptually illustrates a process 4500 for performing a color balance operation on an image. In some embodiments, the process 4500 is performed by an image editing application during operations 4415 and 4425 of process 4400 after the user has selected a location on the image through the color balance UI control. The process begins by retrieving (at 4505) a pixel that corresponds to the selected location on the image. The process then identifies (at 4510) a desired color within a color space for the retrieved pixel. In some embodiments, when the user has selected a custom white balance control tool at operation 4405 of process 4400, the process identifies a gray color that is closest to the color of the retrieved pixels within the color space. The operation of identifying this gray color is described above by reference to FIG. 38. When the user has selected a custom skin balance tool at operation 4405 of process 4400, the process identifies a pre-defined ideal skin color that is closest to the color of the retrieved pixel in the color space. In some embodiments, the application has pre-defined several sets of ideal skin colors for different conditions (e.g., a set of ideal skin colors for daylight and a set of ideal skin colors for artificial light). In these embodiments, the process performs an analysis to determine the condition under which the image was captured and identifies a corresponding ideal skin color.

Next, the process determines (at 4515) a color space transform based on the color of the retrieved pixel and the identified color. In some embodiments, the color adjustment operation involves a specific color transform algorithm or a mathematical equation. After determining the color adjustment operation, the process applies (at 4520) the color space transform to all the pixels of the image. Then the process ends.

Figure 46:
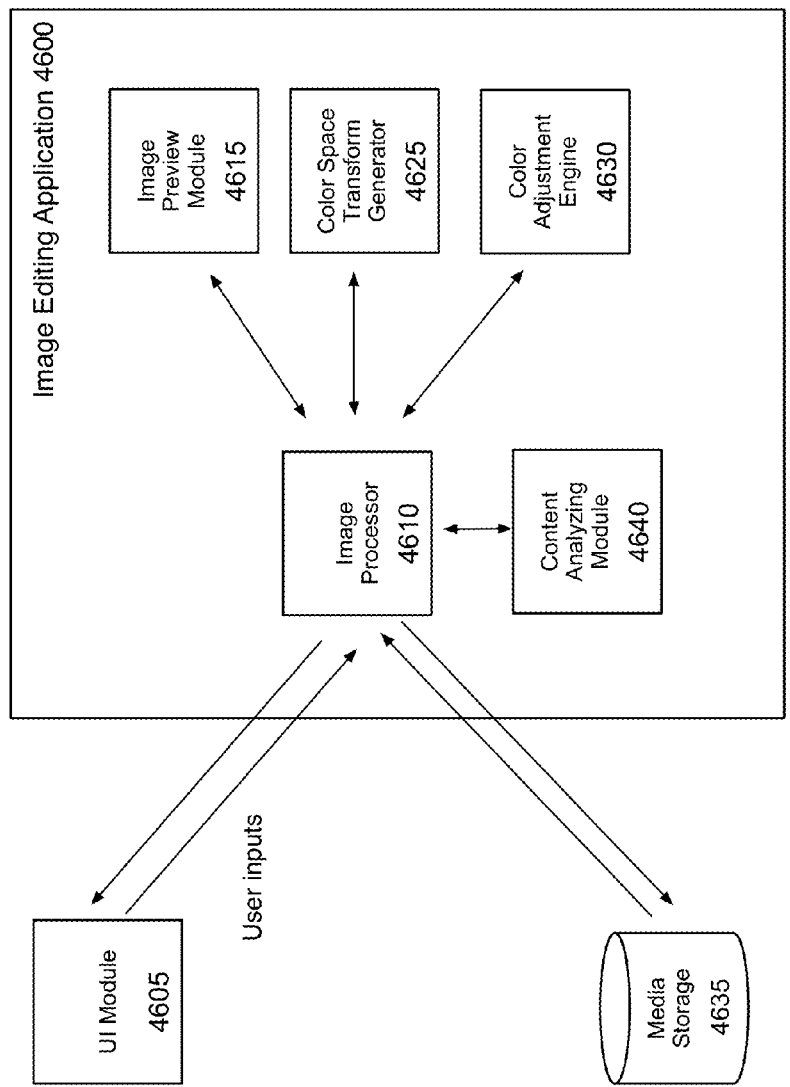
FIG. 46 conceptually illustrates a software architecture of an image editing application of some embodiments.

FIG. 46 illustrates an image editing application 4600 of some embodiments that performs the color balancing operation of an image. In some embodiments, the image editing application 4600 performs the processes 4400 and 4500. As shown in FIG. 46, the image editing application 4600 includes an image processor 4610, an image preview module 4615, a color space transform generator 4625, a content analyzing module 4640, and a color adjustment module 4630.

When the UI module 4605 receives a user's selection of a color balance tool (e.g., a custom white balance tool, a custom skin balance tool, etc.), the UI module 4605 passes the information of the selection to the image processor 4610. The color balance UI control module 4610 then displays a color balance UI control on the image. In some embodiments, the image processor 4610 displays the color balance UI control at a default location for every image (e.g., at the center of the image). In some other embodiments, the color balance UI control module 4610 sends the image to the content analyzing module 4640 to perform a feature detection operation (e.g., a face detection operation) on the image and displays the color balance UI control at the location where the feature is detected (e.g., at a person's face on the image). The image processor 4610 then retrieves the color values of the pixel that corresponds to the location of the color balance UI control, and passes information about the color values to the color space transform generator 4625.

In some embodiments, the color space transform generator 4625 performs the process 4500 of FIG. 45. Specifically, the color space transform generator 4625 retrieves the color values of the pixel that corresponds to the location of the color balance UI control. The color space transform generator then identifies an established baseline color (e.g., a gray color, an ideal skin color, etc.) that is associated with the color balance tool selected by the user. The color space transform generator 4625 determines a color adjustment that would change the color values of the pixel in the image to the identified established baseline color. The color space transform generator 4625 then generates a color space transform based on the determined color adjustment. In some embodiments, the color space transform is a M by M matrix (e.g., a 3 by 3 matrix) that is generated based on the determined color adjustment. In some embodiments, the color space transform takes each color defined within the color space and outputs a different color using the determined color value adjustment.

The color space transform generator 4625 then passes the generated color space transform to the image processor 4610. The image processor 4610 then sends the image and the color space transform to the color adjustment engine 4630. The color adjustment engine applies the color space transform to all the pixels in the image and sends the adjusted image back to the image processor 4610. The image processor stores the adjusted image in the media storage 4635.

In some embodiments, the image editing application provides a real-time preview of the edited image to the user. In these embodiments, the image processor 4610 sends the edited image to the image preview module 4615. Different embodiments use different techniques to provide a preview to the user. In some embodiments, the image preview module 4615 displays an edited version of the portion of the image outside of the color balance UI control while displaying the unedited version of the portion of the image inside the color balance UI control. This way, the user can easily see the differences between the edited and unedited version in real-time. In other embodiments, only the portion of the image that is inside the color balance UI control gets edited and the portion of the image outside the color balance UI control remains unedited. Yet in other embodiments, the whole image gets edited.

When a user changes the location of the color balance UI control, the UI module 4605 passes information about the new location of the color balance UI control to the image processor 4610. The image processor 4610 then retrieves the color values of the pixel that corresponds to the new location and passes the color values to the color space transform generator 4625. The color space transform generator 4625 generates a new color space transform based on the received color values and sends the generated color space transform back to the image processor 4610. The image processor 4610 then sends the image and the color space transform to the color adjustment engine 4630 to re-adjust the image. The color adjustment engine 4630 applies the color space transform to the image and sends the adjusted image to the image processor 4610.

IV. Image Viewing, Editing, and Organization Application

Figure 47:
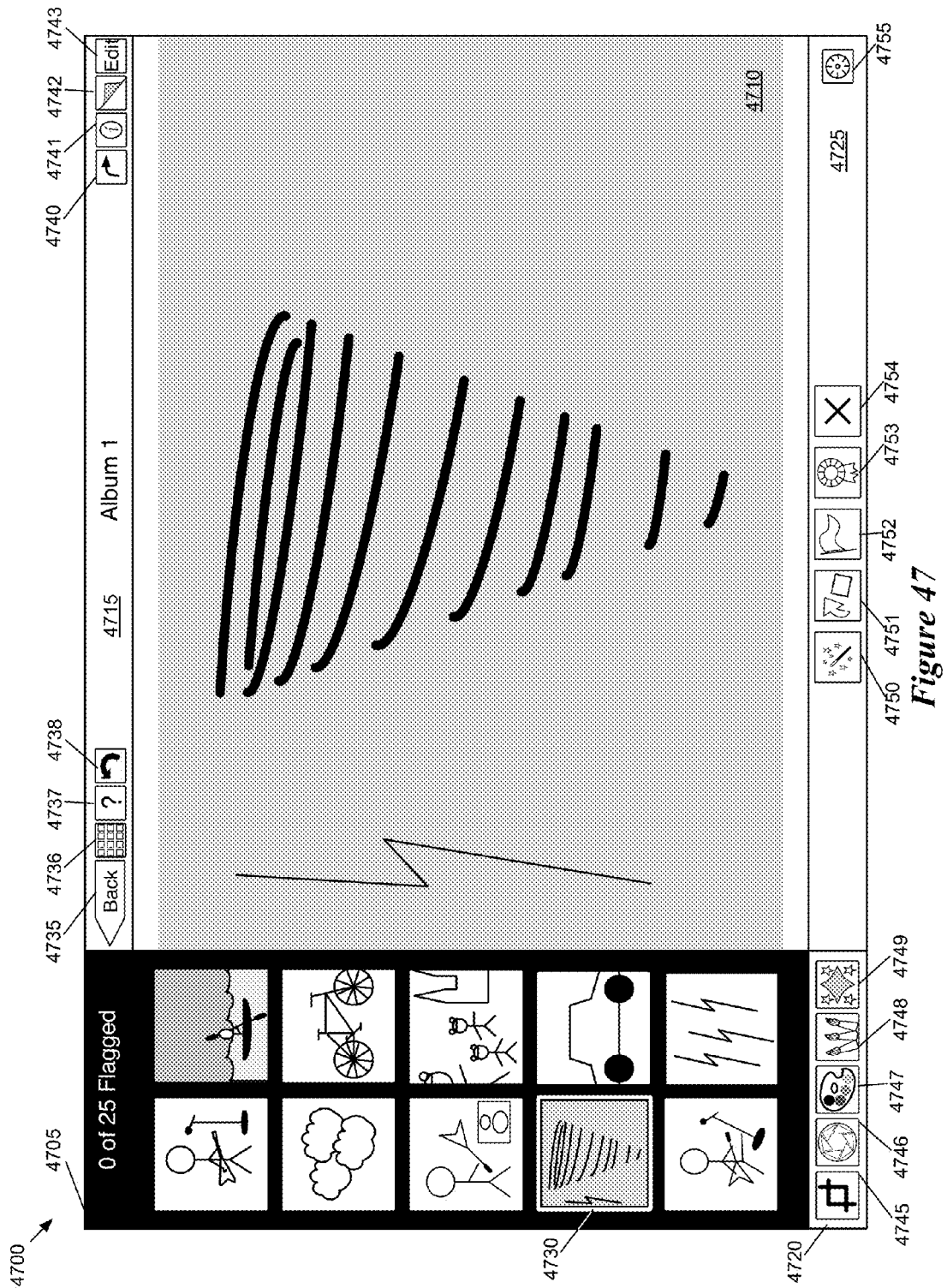
FIG. 47 illustrates an example GUI of an image editing application of some embodiments.
Figure 48:
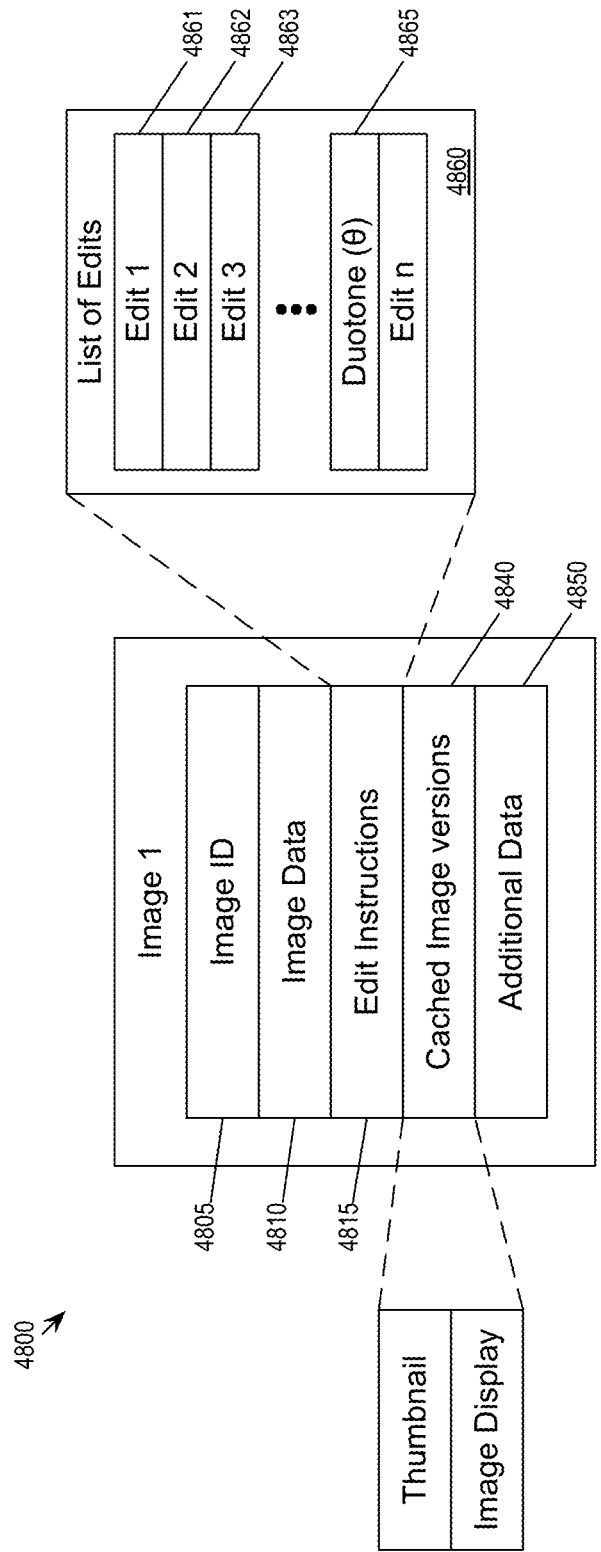
FIG. 48 conceptually illustrates an image data structure of some embodiments.

The above-described figures illustrated various examples of the GUI of an image viewing, editing, and organization application of some embodiments. FIG. 47 illustrates a detailed view of a GUI 4700 of some embodiments for viewing, editing, and organizing images. The GUI 4700 will be described in part by reference to FIG. 48, which conceptually illustrates a data structure 4800 for an image as stored by the application of some embodiments.

The data structure 4800 includes an image ID 4805, image data 4810, edit instructions 4815, cached versions 4840 of the image, and any additional data 4850 for the image. The image ID 4805 is a unique identifier for the image, which in some embodiments is used by the collection data structures to refer to the images stored in the collection. The image data 4810 is the actual full-size pixel data for displaying the image (e.g., a series of color-space channel values for each pixel in the image or an encoded version thereof). In some embodiments, this data may be stored in a database of the image viewing, editing, and organization application, or may be stored with the data of another application on the same device. In some embodiments, this additional application is another image organization application that operates on the device, on top of which the image viewing, editing, and organization operates.

Thus, the data structure may store a pointer to the local file associated with the application or an ID that can be used to query the database of another application. In some embodiments, once the application uses the image in a journal or makes an edit to the image, the application automatically makes a local copy of the image file that contains the image data.

The edit instructions 4815 include information regarding any edits the user has applied to the image. In this manner, the application stores the image in a non-destructive format, such that the application can easily revert from an edited version of the image to the original at any time. For instance, the user can apply a saturation effect to the image, leave the application, and then reopen the application and remove the effect at another time. The edits stored in these instructions may be crops and rotations, full-image exposure and color adjustments, localized adjustments, and special effects, as well as other edits that affect the pixels of the image. Some embodiments store these editing instructions in a particular order, so that users can view different versions of the image with only certain sets of edits applied.

In some embodiments, the edit instructions 4815 are implemented as a list 4860 of edit operations. The list 4860 includes edit operations such as edits 4861, 4862, 4863, and 4865. Each edit operation in the list 4860 specifies the necessary parameters for carrying out the edit operation. For example, the edit operation 4865 in the list 4860 specifies an edit to the image that applies a saturation effect with color selection parameter θ.

In some embodiments, the list 4860 records the sequence of edit operations undertaken by the user in order to create the final edited image. In some embodiments, the list 4860 stores the edit instructions in the order that the image editing application applies the edits to the image in order to generate an output image for display, as some embodiments define a particular order for the different possible edits provided by the application. For example, some embodiments define saturation effect as one of the edit operations that are to be applied later than other edit operations such as crop and rotation, full-image exposure, and color adjustment. The list 4860 of some of these embodiments would store the edit instruction for the saturation effect in a position (i.e., edit 4865) that would be applied later than some of the other edit operations (e.g., edits 4861-1363).

The cached image versions 4840 store versions of the image that are commonly accessed and displayed, so that the application does not need to repeatedly generate these images from the full-size image data 4810. For instance, the application will often store a thumbnail for the image as well as a display resolution version (e.g., a version tailored for the image display area). The application of some embodiments generates a new thumbnail for an image each time an edit is applied, replacing the previous thumbnail. Some embodiments store multiple display resolution versions including the original image and one or more edited versions of the image.

Finally, the image data structure 4800 includes additional data 4850 that the application might store with an image (e.g., locations and sizes of faces, etc.). In some embodiments, the additional data can include Exchangeable image file format (Exif) data, caption data, shared image data, tags on the image or any other types of data. Exif data includes various information stored by the camera that are captured the image such as camera settings, GPS data, timestamps, etc. Caption is a user-entered description of the image. Tags are information that the application enables the user to associate with an image such as marking the image as a favorite, flagged, hidden, etc.

One of ordinary skill in the art will recognize that the image data structure 4800 is only one possible data structure that the application might use to store the required information for an image. For example, different embodiments might store additional or less information, store the information in a different order, etc.

Returning to FIG. 47, the GUI 4700 includes a thumbnail display area 4705, an image display area 4710, a first toolbar 4715, a second toolbar 4720, and a third toolbar 4725. The thumbnail display area 4705 displays thumbnails of the images in a selected collection. Thumbnails are small representations of a full-size image, and represent only a portion of an image in some embodiments. For example, the thumbnails in thumbnail display area 4705 are all squares, irrespective of the aspect ratio of the full-size images. In order to determine the portion of a rectangular image to use for a thumbnail, the application identifies the smaller dimension of the image and uses the center portion of the image in the longer direction. For instance, with a 1600×1200 pixel image, the application would use a 4700×1200 square. To further refine the selected portion for a thumbnail, some embodiments identify a center of all the faces in the image (using a face detection algorithm), then use this location to center the thumbnail portion in the clipped direction. Thus, if the faces in the theoretical 1600×1200 image were all located on the left side of the image, the application would use the leftmost 4700 columns of pixels rather than cut off 200 columns on either side.

After determining the portion of the image to use for the thumbnail, the image-viewing application generates a low resolution version (e.g., using pixel blending and other techniques) of the image. The application of some embodiments stores the thumbnail for an image as a cached version 4840 of the image. Thus, when a user selects a collection, the application identifies all of the images in the collection (through the collection data structure), and accesses the cached thumbnails in each image data structure for display in the thumbnail display area.

The user may select one or more images in the thumbnail display area (e.g., through various touch interactions described above, or through other user input interactions). The selected thumbnails are displayed with a highlight or other indicator of selection. In thumbnail display area 4705, the thumbnail 4730 is selected. In addition, as shown, the thumbnail display area 4705 of some embodiments indicates a number of images in the collection that have been flagged (e.g., having a tag for the flag set to yes). In some embodiments, this text is selectable in order to display only the thumbnails of the flagged images.

The application displays selected images in the image display area 4710 at a larger resolution than the corresponding thumbnails. The images are not typically displayed at the full size of the image, as images often have a higher resolution than the display device. As such, the application of some embodiments stores a cached version 4840 of the image designed to fit into the image display area. Images in the image display area 4710 are displayed in the aspect ratio of the full-size image. When one image is selected, the application displays the image as large as possible within the image display area without cutting off any part of the image. When multiple images are selected, the application displays the images in such a way as to maintain their visual weighting by using approximately the same number of pixels for each image, even when the images have different aspect ratios.

The first toolbar 4715 displays title information (e.g., the name of the collection shown in the GUI, a caption that a user has added to the currently selected image, etc.). In addition, the toolbar 4715 includes a first set of GUI items 4735-1238 and a second set of GUI items 4740-1243.

The first set of GUI items includes a back button 4735, a grid button 4736, a help button 4737, and an undo button 4738. The back button 4735 enables the user to navigate back to a collection organization GUI, from which users can select between different collections of images (e.g., albums, events, journals, etc.). Selection of the grid button 4736 causes the application to move the thumbnail display area on or off of the GUI (e.g., via a slide animation). In some embodiments, users can also slide the thumbnail display area on or off of the GUI via a swipe gesture. The help button 4737 activates a context-sensitive help feature that identifies a current set of tools active for the user and provides help indicators for those tools that succinctly describe the tools to the user. In some embodiments, the help indicators are selectable to access additional information about the tools. Selection of the undo button 4738 causes the application to remove the most recent edit to the image, whether this edit is a crop, color adjustment, etc. In order to perform this undo, some embodiments remove the most recent instruction from the set of edit instructions 4815 stored with the image.

The second set of GUI items includes a sharing button 4740, an information button 4741, a show original button 4742, and an edit button 4743. The sharing button 4740 enables a user to share an image in a variety of different ways. In some embodiments, the user can send a selected image to another compatible device on the same network (e.g., WiFi or Bluetooth network), upload an image to an image hosting or social media website, and create a journal (i.e., a presentation of arranged images to which additional content can be added) from a set of selected images, among others.

The information button 4741 activates a display area that displays additional information about one or more selected images. The information displayed in the activated display area may include some or all of the Exif data stored for an image (e.g., camera settings, timestamp, etc.). When multiple images are selected, some embodiments only display Exif data that is common to all of the selected images. Some embodiments include additional tabs within the information display area for (i) displaying a map showing where the image or images were captured according to the GPS data, if this information is available and (ii) displaying comment streams for the image on any photo sharing websites. To download this information from the websites, the application uses the object ID stored for the image with the shared image data and sends this information to the website. The comment stream and, in some cases, additional information, are received from the website and displayed to the user.

The show original button 4742 enables the user to toggle between the original version of an image and the current edited version of the image. When a user selects the button, the application displays the original version of the image without any of the editing instructions 4815 applied. In some embodiments, the appropriate size image is stored as one of the cached versions 4840 of the image, making it quickly accessible. When the user selects the button again 4742 again, the application displays the edited version of the image, with the editing instructions 4815 applied.

The edit button 4743 allows the user to enter or exit edit mode. When a user has selected one of the sets of editing tools in the toolbar 4720, the edit button 4743 returns the user to the viewing and organization mode, as shown in FIG. 47. When the user selects the edit button 4743 while in the viewing mode, the application returns to the last used set of editing tools in the order shown in toolbar 4720. That is, the items in the toolbar 4720 are arranged in a particular order, and the edit button 4743 activates the rightmost of those items for which edits have been made to the selected image.

The toolbar 4720, as mentioned, includes five items 4745-1249, arranged in a particular order from left to right. The crop item 4745 activates a cropping and rotation tool that allows the user to align crooked images and remove unwanted portions of an image. The exposure item 4746 activates a set of exposure tools that allow the user to modify the black point, shadows, contrast, brightness, highlights, and white point of an image. In some embodiments, the set of exposure tools is a set of sliders that work together in different combinations to modify the tonal attributes of an image. The color item 4747 activates a set of color tools that enable the user to modify the saturation and vibrancy, as well as color-specific saturations (e.g., blue pixels or green pixels) and white balance. In some embodiments, some of these tools are presented as a set of sliders. The brushes item 4748 activates a set of enhancement tools that enable a user to localize modifications to the image. With the brushes, the user can remove red-eye and blemishes, and apply or remove saturation and other features to localized portions of an image by performing a rubbing action over the image. Finally, the effects item 4749 activates a set of special effects that the user can apply to the image. These effects include duotone effect, grainy effect, gradients, tilt shifts, non-photorealistic desaturation effects, grayscale effects, various filters, etc. In some embodiments, the application presents these effects as a set of items that fan out from the toolbar 4725.

As stated, the UI items 4745-1249 are arranged in a particular order. This order follows the order in which users most commonly apply the five different types of edits. Accordingly, the editing instructions 4815 are stored in this same order, in some embodiments. When a user selects one of the items 4745-1249, some embodiments apply only the edits from the tools to the left of the selected tool to the displayed image (though other edits remain stored within the instruction set 4815).

The toolbar 4725 includes a set of GUI items 4750-1254 as well as a settings item 4755. The auto-enhance item 4750 automatically performs enhancement edits to an image (e.g., removing apparent red-eye, balancing color, etc.). The rotation button 4751 rotates any selected images. In some embodiments, each time the rotation button is pressed, the image rotates 90 degrees in a particular direction. The auto-enhancement, in some embodiments, comprises a predetermined set of edit instructions that are placed in the instruction set 4815. Some embodiments perform an analysis of the image and then define a set of instructions based on the analysis. For instance, the auto-enhance tool will attempt to detect red-eye in the image, but if no red-eye is detected then no instructions will be generated to correct it. Similarly, automatic color balancing will be based on an analysis of the image. The rotations generated by the rotation button are also stored as edit instructions.

The flag button 4752 tags any selected image as flagged. In some embodiments, the flagged images of a collection can be displayed without any of the unflagged images. The favorites button 4753 allows a user to mark any selected images as favorites. In some embodiments, this tags the image as a favorite and also adds the image to a collection of favorite images. The hide button 4754 enables a user to tag an image as hidden. In some embodiments, a hidden image will not be displayed in the thumbnail display area and/or will not be displayed when a user cycles through the images of a collection in the image display area. As discussed above by reference to FIG. 48, many of these features are stored as tags in the image data structure.

Finally, the settings button 4755 activates a context-sensitive menu that provides different menu options depending on the currently active toolset. For instance, in viewing mode the menu of some embodiments provides options for creating a new album, setting a key photo for an album, copying settings from one photo to another, and other options. When different sets of editing tools are active, the menu provides options related to the particular active toolset.

One of ordinary skill in the art will recognize that the image viewing and editing GUI 4700 is only one example of many possible graphical user interfaces for an image viewing, editing, and organizing application. For instance, the various items could be located in different areas or in a different order, and some embodiments might include items with additional or different functionalities. The thumbnail display area of some embodiments might display thumbnails that match the aspect ratio of their corresponding full-size images, etc.

V. Electronic Systems

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 49:
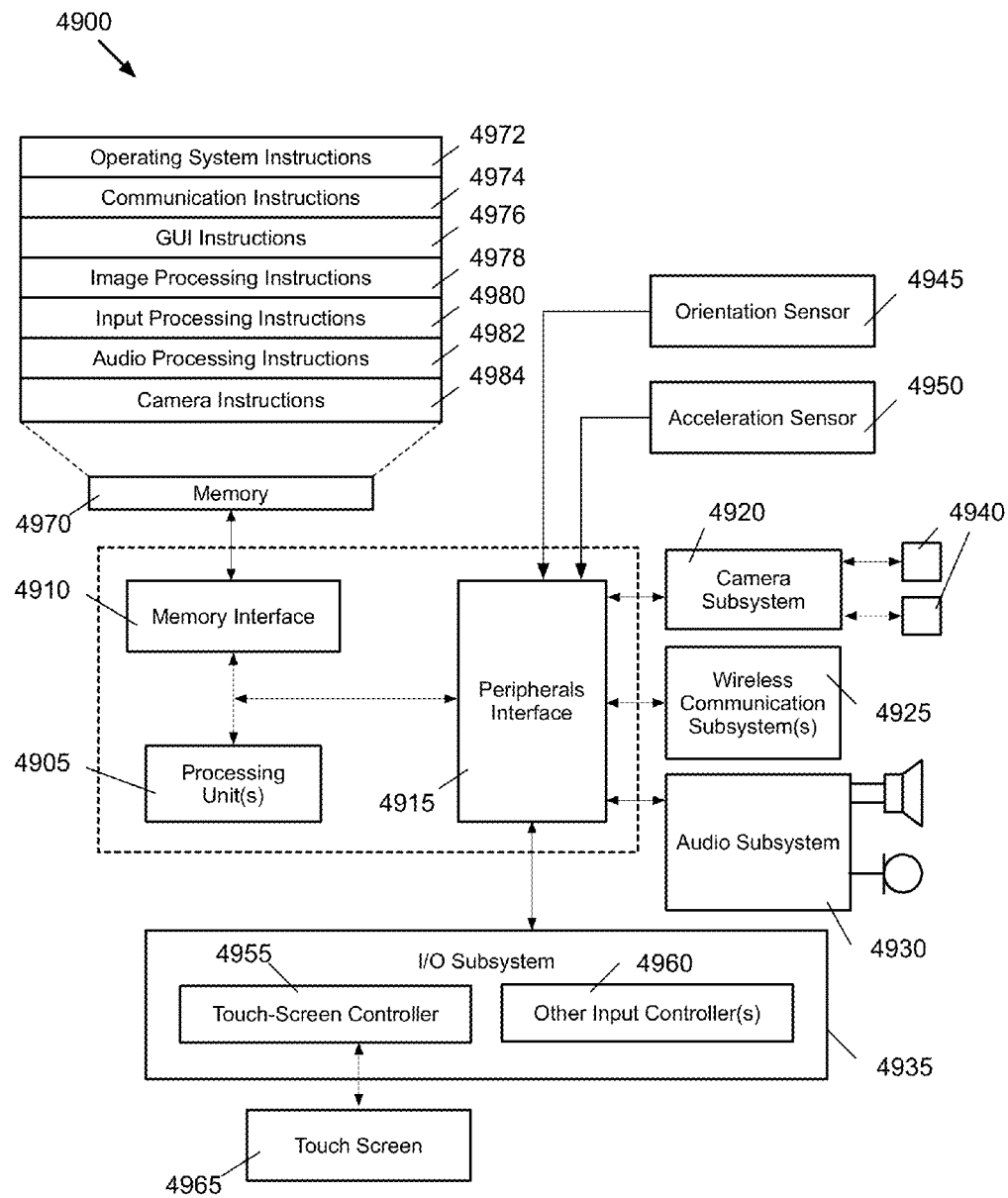
FIG. 49 conceptually illustrates a hardware architecture of a device of some embodiments on which an image editing application is executed.

The image editing and viewing applications of some embodiments operate on mobile devices. FIG. 49 is an example of an architecture 4900 of such a mobile computing device. Examples of mobile computing devices include smartphones, tablets, laptops, etc. As shown, the mobile computing device 4900 includes one or more processing units 4905, a memory interface 4910 and a peripherals interface 4915.

The peripherals interface 4915 is coupled to various sensors and subsystems, including a camera subsystem 4920, a wireless communication subsystem(s) 4925, an audio subsystem 4930, an I/O subsystem 4935, etc. The peripherals interface 4915 enables communication between the processing units 4905 and various peripherals. For example, an orientation sensor 4945 (e.g., a gyroscope) and an acceleration sensor 4950 (e.g., an accelerometer) are coupled to the peripherals interface 4915 to facilitate orientation and acceleration functions.

The camera subsystem 4920 is coupled to one or more optical sensors 4940 (e.g., a charged coupled device (CCD) optical sensor, a complementary metal-oxide-semiconductor (CMOS) optical sensor, etc.). The camera subsystem 4920 coupled with the optical sensors 4940 facilitates camera functions, such as image and/or video data capturing. The wireless communication subsystem 4925 serves to facilitate communication functions. In some embodiments, the wireless communication subsystem 4925 includes radio frequency receivers and transmitters, and optical receivers and transmitters (not shown in FIG. 49). These receivers and transmitters of some embodiments are implemented to operate over one or more communication networks such as a GSM network, a Wi-Fi network, a Bluetooth network, etc. The audio subsystem 4930 is coupled to a speaker to output audio (e.g., to output different sound effects associated with different image operations). Additionally, the audio subsystem 4930 is coupled to a microphone to facilitate voice-enabled functions, such as voice recognition, digital recording, etc.

The I/O subsystem 4935 involves the transfer between input/output peripheral devices, such as a display, a touch screen, etc., and the data bus of the processing units 4905 through the peripherals interface 4915. The I/O subsystem 4935 includes a touch-screen controller 4955 and other input controllers 4960 to facilitate the transfer between input/output peripheral devices and the data bus of the processing units 4905. As shown, the touch-screen controller 4955 is coupled to a touch screen 4965. The touch-screen controller 4955 detects contact and movement on the touch screen 4965 using any of multiple touch sensitivity technologies. The other input controllers 4960 are coupled to other input/control devices, such as one or more buttons. Some embodiments include a near-touch sensitive screen and a corresponding controller that can detect near-touch interactions instead of or in addition to touch interactions.

The memory interface 4910 is coupled to memory 4970. In some embodiments, the memory 4970 includes volatile memory (e.g., high-speed random access memory), non-volatile memory (e.g., flash memory), a combination of volatile and non-volatile memory, and/or any other type of memory. As illustrated in FIG. 49, the memory 4970 stores an operating system (OS) 4972. The OS 4972 includes instructions for handling basic system services and for performing hardware dependent tasks.

The memory 4970 also includes communication instructions 4974 to facilitate communicating with one or more additional devices; graphical user interface instructions 4976 to facilitate graphic user interface processing; image processing instructions 4978 to facilitate image-related processing and functions; input processing instructions 4980 to facilitate input-related (e.g., touch input) processes and functions; audio processing instructions 4982 to facilitate audio-related processes and functions; and camera instructions 4984 to facilitate camera-related processes and functions. The instructions described above are merely exemplary and the memory 4970 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 49 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 49 may be split into two or more integrated circuits.

B. Computer System

Figure 50:
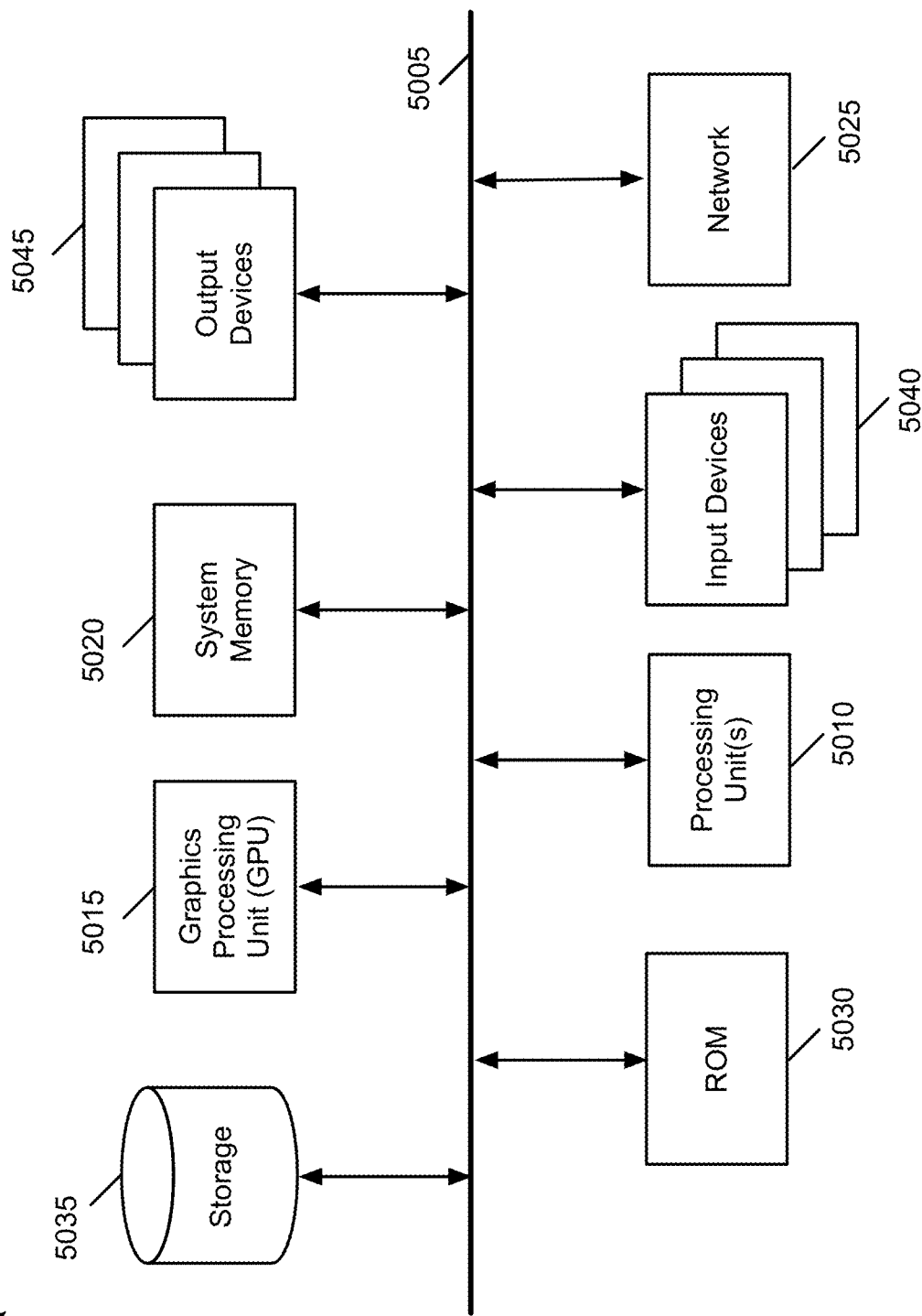
FIG. 50 conceptually illustrates an electronic system with which some embodiments of the invention are implemented.

FIG. 50 conceptually illustrates another example of an electronic system 5000 with which some embodiments of the invention are implemented. The electronic system 5000 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 5000 includes a bus 5005, processing unit(s) 5010, a graphics processing unit (GPU) 5015, a system memory 5020, a network 5025, a read-only memory 5030, a permanent storage device 5035, input devices 5040, and output devices 5045.

The bus 5005 collectively represents all system, peripheral, and chipset buses that communicatively connect the numerous internal devices of the electronic system 5000. For instance, the bus 5005 communicatively connects the processing unit(s) 5010 with the read-only memory 5030, the GPU 5015, the system memory 5020, and the permanent storage device 5035.

From these various memory units, the processing unit(s) 5010 retrieves instructions to execute and data to process in order to execute the processes of the invention. The processing unit(s) may be a single processor or a multi-core processor in different embodiments. Some instructions are passed to and executed by the GPU 5015. The GPU 5015 can offload various computations or complement the image processing provided by the processing unit(s) 5010. In some embodiments, such functionality can be provided using CoreImage's kernel shading language.

The read-only-memory (ROM) 5030 stores static data and instructions that are needed by the processing unit(s) 5010 and other modules of the electronic system. The permanent storage device 5035, on the other hand, is a read-and-write memory device. This device is a non-volatile memory unit that stores instructions and data even when the electronic system 5000 is off. Some embodiments of the invention use a mass-storage device (such as a magnetic or optical disk and its corresponding disk drive) as the permanent storage device 5035.

Other embodiments use a removable storage device (such as a floppy disk, flash memory device, etc., and its corresponding drive) as the permanent storage device. Like the permanent storage device 5035, the system memory 5020 is a read-and-write memory device. However, unlike storage device 5035, the system memory 5020 is a volatile read-and-write memory, such a random access memory. The system memory 5020 stores some of the instructions and data that the processor needs at runtime. In some embodiments, the invention's processes are stored in the system memory 5020, the permanent storage device 5035, and/or the read-only memory 5030. For example, the various memory units include instructions for processing multimedia clips in accordance with some embodiments. From these various memory units, the processing unit(s) 5010 retrieves instructions to execute and data to process in order to execute the processes of some embodiments.

The bus 5005 also connects to the input and output devices 5040 and 5045. The input devices 5040 enable the user to communicate information and select commands to the electronic system. The input devices 5040 include alphanumeric keyboards and pointing devices (also called "cursor control devices"), cameras (e.g., webcams), microphones or similar devices for receiving voice commands, etc. The output devices 5045 display images generated by the electronic system or otherwise output data. The output devices 5045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 50, bus 5005 also couples electronic system 5000 to a network 5025 through a network adapter (not shown). In this manner, the computer can be a part of a network of computers (such as a local area network ("LAN"), a wide area network ("WAN"), or an Intranet, or a network of networks, such as the Internet. Any or all components of electronic system 5000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures (including FIGS. 16, 17, 19, 26, 28, 36, 44, and 45) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

In addition, controls for setting the single adjustment value used to perform different image editing operations are shown as slider controls in FIGS. 3, 4, 6, 7, 9, 14, 15, 20, 21, 22, 23, 24, 31, 32, 33, 34, and 35. The sliders of such embodiments provide a visual indication of a setting value as a knob is slid along the slider to set a value for the slider. However, in some embodiments, the slider controls shown in any of those figures could be replaced with any other control capable of receiving a value (e.g., a single value), such as a vertical slider control, a pull down menu, a value entry box, an incremental tool activated by keyboard keys, other range related UI controls (e.g., dials, buttons, number fields, and the like), etc. Similarly, the slider controls of those figures are either depicted as being set with a finger gesture (e.g., placing, pointing, tapping one or more fingers) on a touch sensitive screen or simply shown in a position without any indication of how they were moved into position. One of ordinary skill in the art will understand that the controls of FIGS. 3, 4, 6, 7, 9, 14, 15, 20, 21, 22, 23, 24, 31, 32, 33, 34, and 35 can also be activated and/or set by a cursor control device (e.g., a mouse or trackball), a stylus, keyboard, a finger gesture (e.g., placing, pointing, tapping one or more fingers) near a near-touch sensitive screen, or any other control system in some embodiments. Thus, one of ordinary skill in the art would understand that the invention is not to be limited by the foregoing illustrative details, but rather is to be defined by the appended claims.

What is claimed is:

1. A non-transitory machine readable medium storing a computer program for adjusting color values of an image represented in a color space, the image comprising a set of pixels, each pixel comprising a set of color values, the computer program comprising sets of instructions for execution by at least one processing unit, the sets of instructions for:
displaying a plurality of user interface (UI) items, each UI item associated with a different pre-defined type of content in a plurality of pre-defined types of content;
receiving an adjustment to a particular UI item in the plurality of UI items for adjusting color values of an image, the particular UI item associated with a pre-defined type of content in the plurality of pre-defined types of content;
identifying a subset of pixels having color values that fall within a range of color values associated with the pre-defined type of content associated with the particular UI item based on the received adjustment to the particular UI item; and
performing a color adjustment operation on the identified subset of pixels based on the received adjustment to the particular UI item.

2. The non-transitory machine readable medium of claim 1, wherein the UI item is a range slider.

3. The non-transitory machine readable medium of claim 1, wherein the plurality of pre-defined types of content comprises sky, foliage, and human skin.

4. The non-transitory machine readable medium of claim 1, wherein the plurality of pre-defined types of content comprises a blue color, a green color, and a skin-tone.

5. The non-transitory machine readable medium of claim 1, wherein the identified pixels do not form a contiguous region in the image.

6. The non-transitory machine readable medium of claim 1, wherein the color adjustment operation comprises one of an operation for adjusting saturation of the identified subset of pixels, an operation for adjusting brightness of the identified subset of pixels, and an adjustment for adjusting contrast of the identified subset of pixels.

7. The non-transitory machine readable medium of claim 1, wherein the range of color values is defined in a color space different from the color space in which the color values of the image are defined, wherein the set of instructions for identifying the subset of pixels comprises a set of instructions for converting the color values of the image to the color space in which the range of color values is defined.

8. The non-transitory machine readable medium of claim 7, wherein the color adjustment operation is performed in the converted color space.

9. The non-transitory machine readable medium of claim 1, wherein the color adjustment operation is performed in a color space in which the color values of the image are defined.

10. A method of adjusting color values of an image represented in a color space, the image comprising a set of pixels, each pixel comprising a set of color values, the method comprising:
providing a plurality of user interface (UI) controls, each UI control associated with a different type of content in a plurality of pre-defined types of content, each UI control for receiving an input for adjusting color values of an image that are associated with a corresponding pre-defined type of content;
by a computer, providing a pixel segregator for identifying a subset of pixels with color values that fall within a pre-defined range of color values associated with the pre-defined type of content associated with a UI control that receives an input based on the received adjustment to the UI control item that receives the input; and
by the computer, providing a color adjuster for adjusting the color values of the identified subset of pixels based on the received adjustment to the UI control that receives the input.

11. The method of claim 10, wherein the plurality of pre-defined types of content comprises sky.

12. The method of claim 10, wherein the plurality of pre-defined types of content comprises foliage.

13. The method of claim 10, wherein the range of color values is defined in an opponent color space different than the color space in which the color values of the image are defined, the method further comprising providing a color space converter for converting the color values of the image to the opponent color space.

14. The method of claim 13, wherein the color adjuster adjusts the color values of the identified subset of pixels in the opponent color space.

15. A non-transitory machine readable medium storing a program which when executed by at least one processing unit provides a graphical user interface (GUI) for editing an image, the GUI comprising:

a display area for displaying an image; and
a color adjustment tool for:
   displaying a plurality of user interface (UI) items, each UI item associated with a different pre-defined type of content in a plurality of pre-defined types of content;
   receiving an adjustment to a particular UI item for adjusting color values of the displayed image, the particular UI item associated with a pre-defined type of content in the plurality of pre-defined types of content;
   identifying, based on the pre-defined type of content associated with the particular UI item, a set of pixels that need their color values adjusted; and
   adjusting color values of the identified set of pixels based on the received adjustment to the particular UI item.

16. The non-transitory machine readable medium of claim 15 comprises a range slider.

17. The non-transitory machine readable medium of claim 16, wherein the adjustment to the particular UI item causes a knob on the slider to move along the slider.

18. The non-transitory machine readable medium of claim 17, wherein the color adjustment tool adjusts color values of the identified set of pixels based on a distance that the knob has moved along the slider.

19. A method of adjusting color values of an image represented in a color space, the image comprising a set of pixels, each pixel comprising a set of color values, the method comprising:
   displaying a plurality of user interface (UI) items, each UI item associated with a different pre-defined type of content in a plurality of pre-defined types of content;
   by a computer, receiving an adjustment to a particular UI item in the plurality of UI items for adjusting color values of an image, the particular UI item associated with a pre-defined type of content in the plurality of pre-defined types of content;
   identifying a subset of pixels having color values that fall within a range of color values associated with the pre-defined type of content associated with the particular UI item based on the received adjustment to the particular UI item; and
   performing a color adjustment operation on the identified subset of pixels based on the received adjustment to the particular UI item.

20. The method of claim 19 further comprising defining an amount of color adjustment to apply to the identified subset of pixels based on the received adjustment to the particular UI item.

21. The method of claim 19, wherein the plurality of pre-defined types of content comprises sky, foliage, and human skin.

22. An apparatus comprising:
   a set of processing units for executing sets of instructions; and
   a non-transitory machine readable medium storing a program which when executed by at least one of the processing units adjusts color values of an image represented in a color space, the image comprising a set of pixels, each pixel comprising a set of color values, the program comprising sets of instructions for execution by at least one processing unit, the sets of instructions for:
      providing a display area for displaying a plurality of user interface (UI) items, each UI item associated with a different pre-defined type of content in a plurality of pre-defined types of content;
      providing a particular UI control in the plurality of UI controls for receiving an adjustment for adjusting color values of an image, wherein the particular UI control is associated with a pre-defined type of content in the plurality of pre-defined types of content;
      providing a pixel segregator for identifying a subset of pixels with color values that fall within a pre-defined range of color values associated with the pre-defined type of content associated with the particular UI control based on the received adjustment to the particular UI control; and
      providing a color adjuster for adjusting the color values of the identified subset of pixels based on the received adjustment to the particular UI control.

23. The apparatus of claim 22, wherein the range of color values are defined in an opponent color space different than the color space in which the color values of the image are defined, the program further comprising a set of instructions for providing a color space converter for converting the color values of the image to the opponent color space.

24. The apparatus of claim 22, wherein the color adjuster adjusts the color values of the identified subset of pixels based on the received adjustment to the particular UI control in the opponent color space.

* * * * *